(12) United States Patent
Hirano et al.

(10) Patent No.: US 8,774,039 B2
(45) Date of Patent: Jul. 8, 2014

(54) COMMUNICATION SYSTEM, MOBILE TERMINAL, NETWORK NODE, AND BASE STATION APPARATUS

(75) Inventors: Jun Hirano, Kanagawa (JP); Mohana Dhamayanthi Jeyatharan, Singapore (SG); Chan Wah Ng, Singapore (SG); Chun Keong Benjamin Lim, Singapore (SG)

(73) Assignee: Panasonic Corporation, Osaka (JP)

( * ) Notice: Subject to any disclaimer, the term of this patent is extended or adjusted under 35 U.S.C. 154(b) by 163 days.

(21) Appl. No.: 13/377,783

(22) PCT Filed: Jun. 11, 2010

(86) PCT No.: PCT/JP2010/003906
§ 371 (c)(1),
(2), (4) Date: Feb. 29, 2012

(87) PCT Pub. No.: WO2010/146816
PCT Pub. Date: Dec. 23, 2010

(65) Prior Publication Data
US 2012/0155313 A1    Jun. 21, 2012

(30) Foreign Application Priority Data

Jun. 17, 2009   (JP) ................................. 2009-144033
Mar. 8, 2010    (JP) ................................. 2010-050056

(51) Int. Cl.
*H04J 1/16*   (2006.01)
*H04W 48/14*  (2009.01)
(52) U.S. Cl.
CPC .................................... *H04W 48/14* (2013.01)
USPC ........................................ 370/252; 370/338

(58) Field of Classification Search
USPC .................. 370/216–228, 241–252, 310–350
See application file for complete search history.

(56) References Cited

U.S. PATENT DOCUMENTS 7,519,368 B2 *   4/2009   Lim et al. ...................... 455/436
7,953,406 B2 *   5/2011   Itamiya et al. ................ 455/424
(Continued)

FOREIGN PATENT DOCUMENTS

JP    2003-249939    9/2003
WO    2007/137765   12/2007
(Continued)

OTHER PUBLICATIONS

International Search Report dated Sep. 14, 2010.

(Continued)

*Primary Examiner* — Kan Yuen
(74) *Attorney, Agent, or Firm* — Dickinson Wright PLLC

(57) ABSTRACT

Disclosed is a technique for enabling a mobile terminal, which is capable of using a plurality of communication routes for communication with a correspondent node, to select an appropriate communication route to communicate with the correspondent node. According to the technique, the mobile terminal (UE/MN 313B) requests a predetermined network node (P-GW 317) to detect whether or not the correspondent node (CN 318B) exists in the same domain. The P-GW monitors a packet sent from the CN to the UE/MN and, when detecting the packet, determines whether or not the CN exists in the same domain. In the case of determining that the CN exists in the same domain, the P-GW reports information that the CN exists in the same domain, to the UE/MN. The UE/MN selects an interface used for communicating with the CN, based on the reported determination result.

20 Claims, 25 Drawing Sheets

(56) References Cited

U.S. PATENT DOCUMENTS

| | | | |
|---|---|---|---|
| 2004/0213181 | A1 | 10/2004 | Grech |
| 2005/0088994 | A1 | 4/2005 | Maenpaa |
| 2008/0285492 | A1 | 11/2008 | Vesterinen |
| 2008/0285518 | A1 | 11/2008 | Dutta |
| 2009/0073935 | A1 | 3/2009 | Xia |
| 2009/0168698 | A1 | 7/2009 | Weniger |
| 2009/0264155 | A1* | 10/2009 | Nakayama et al. ............ 455/561 |
| 2010/0027509 | A1 | 2/2010 | Velev |
| 2010/0091707 | A1 | 4/2010 | Janneteau |
| 2010/0214982 | A1 | 8/2010 | Hirano |
| 2010/0265818 | A1* | 10/2010 | Chen et al. ................... 370/217 |
| 2010/0290402 | A1 | 11/2010 | Backman |
| 2010/0315992 | A1 | 12/2010 | Turanyi |
| 2011/0110309 | A1* | 5/2011 | Bennett ........................ 370/328 |

FOREIGN PATENT DOCUMENTS

| | | |
|---|---|---|
| WO | 2008/071276 | 6/2008 |
| WO | 2008/104132 | 9/2008 |
| WO | 2008/116494 | 10/2008 |
| WO | 2008/134394 | 11/2008 |
| WO | 2009/044539 | 4/2009 |
| WO | 2009/084989 | 7/2009 |
| WO | 2009/097914 | 8/2009 |

OTHER PUBLICATIONS

K. Aso, et al., "Proposal on MobileIPv6 extension for using multiple interfaces by mobile node," The Institute of Electronics, Information and Communication Engineers, IEICE Technical Report, Jun. 2006, pp. 25-30, with English abstract.

K. Aso, et al., "A proposal for mobile node with multiple interfaces," The Institute of Electronics, Information and Communication Engineers, IEICE Technical Report, Sep. 2005, pp. 125-130, with English abstract.

D. Johnson, et al., "Mobility Support in IPv6," Network Working Group, RFC 3775, Category: Standards Track, Jun. 2004, pp. 1-165, p. 7, Line 32.

S. Gundavelli, et al., "Proxy Mobile IPv6," Network Working Group, RFC 5213, Category: Standards Track, Aug. 2008, pp. 1-92, p. 7, Line 35.

3GPP TS 23.402 V8.3.0, "3$^{rd}$ Generation Partnership Project; Technical Specification Group Services and System Aspects; Architecture enhancements for non-3GPP accesses (Release 8)," Sep. 2008, pp. 1-190, p. 8, Line 3.

R. Wakikawa, et al., "Multiple Care-of Addresses Registration draft-ietf-monami6-multiplecoa-10.txt," MEXT Working Group, Internet-Draft, Intended status: Standards Track, Nov. 4, 2008, pp. 1-41, p. 8, Line 7.

R. Hinden, at al., "IPv6 Global Unicast Address Format," Network Working Group, RFC 3587, Obsoletes: 2374, Category: Informational, Aug. 2003, pp. 1-5, p. 8, Line 10.

H. Soliman, "Mobile IPv6 Support for Dual Stack Hosts and Routers," Network Working Group, RFC 5555, Category: Standards Track, Jun. 2009, pp. 1-41, p. 8, Line 13.

Japanese Office Action dated Mar. 4, 2014.

* cited by examiner

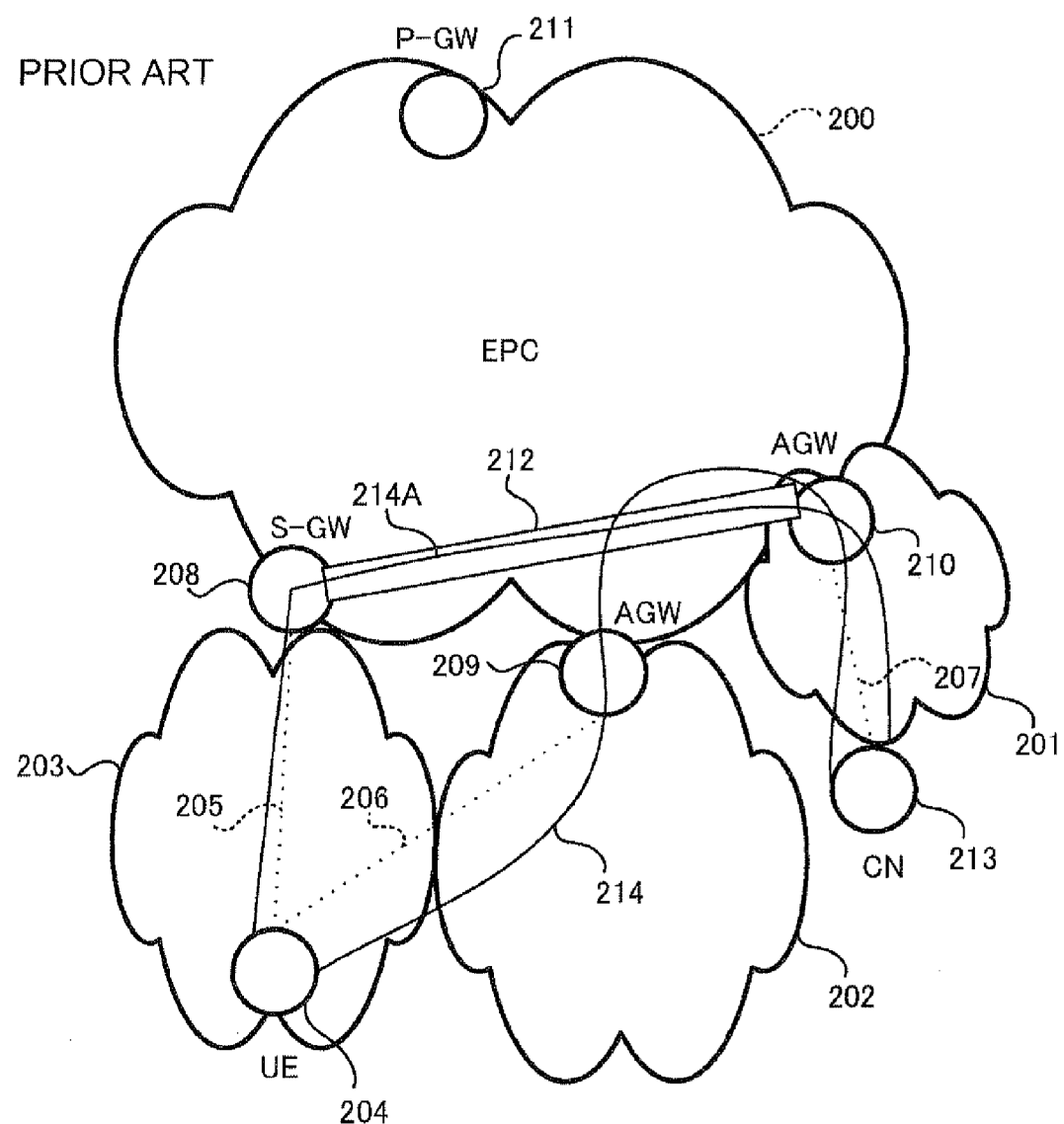

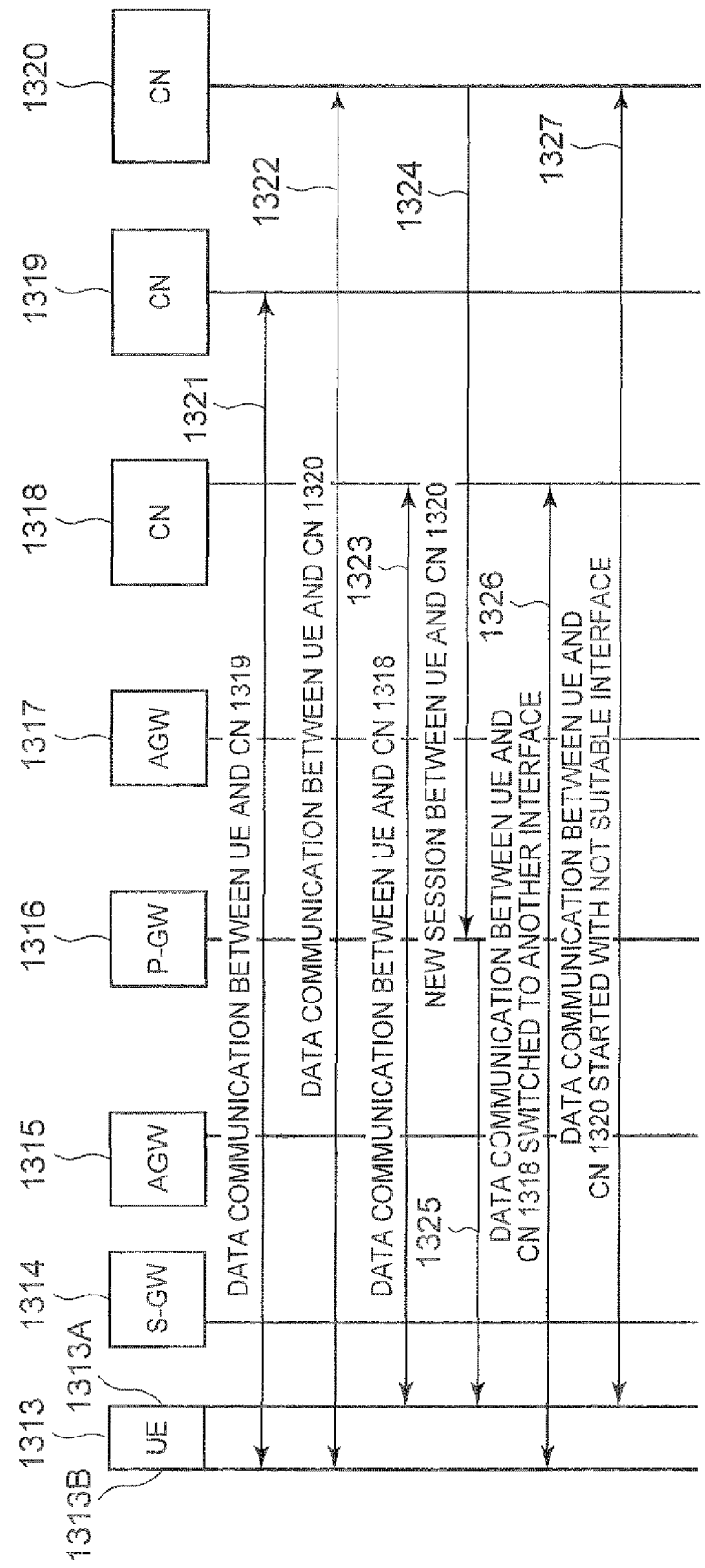

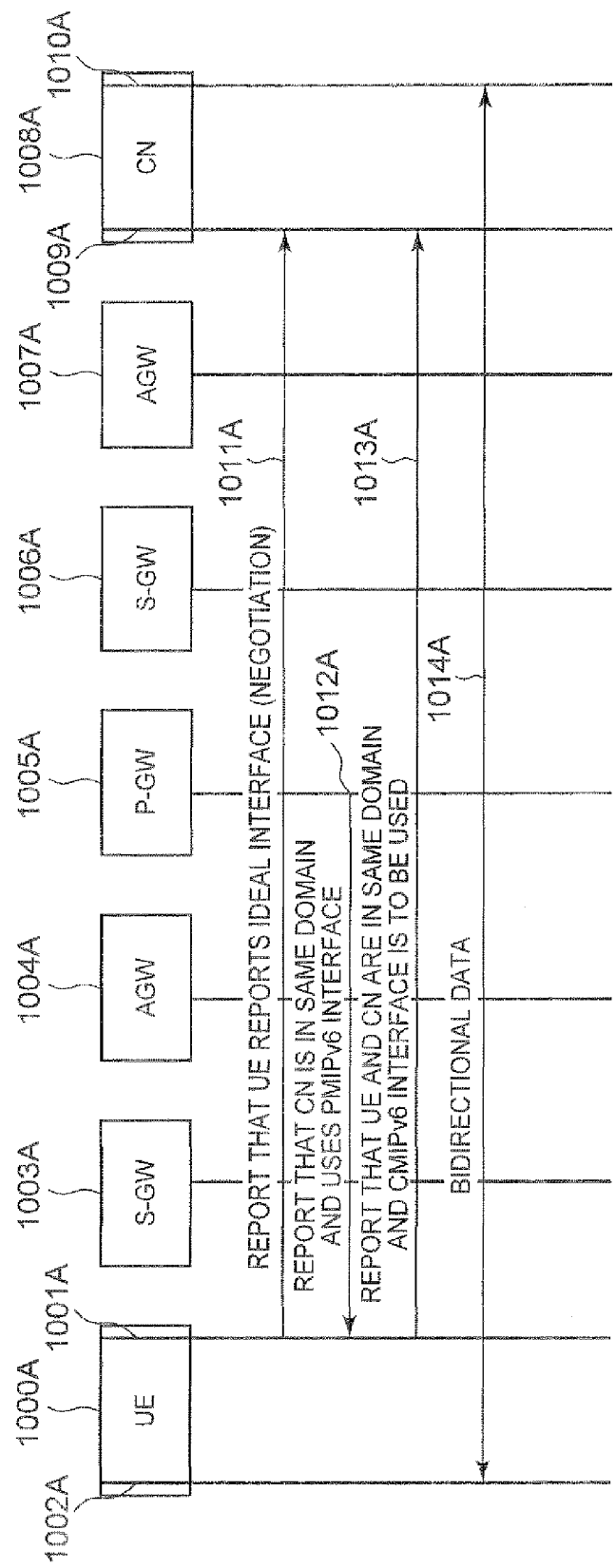

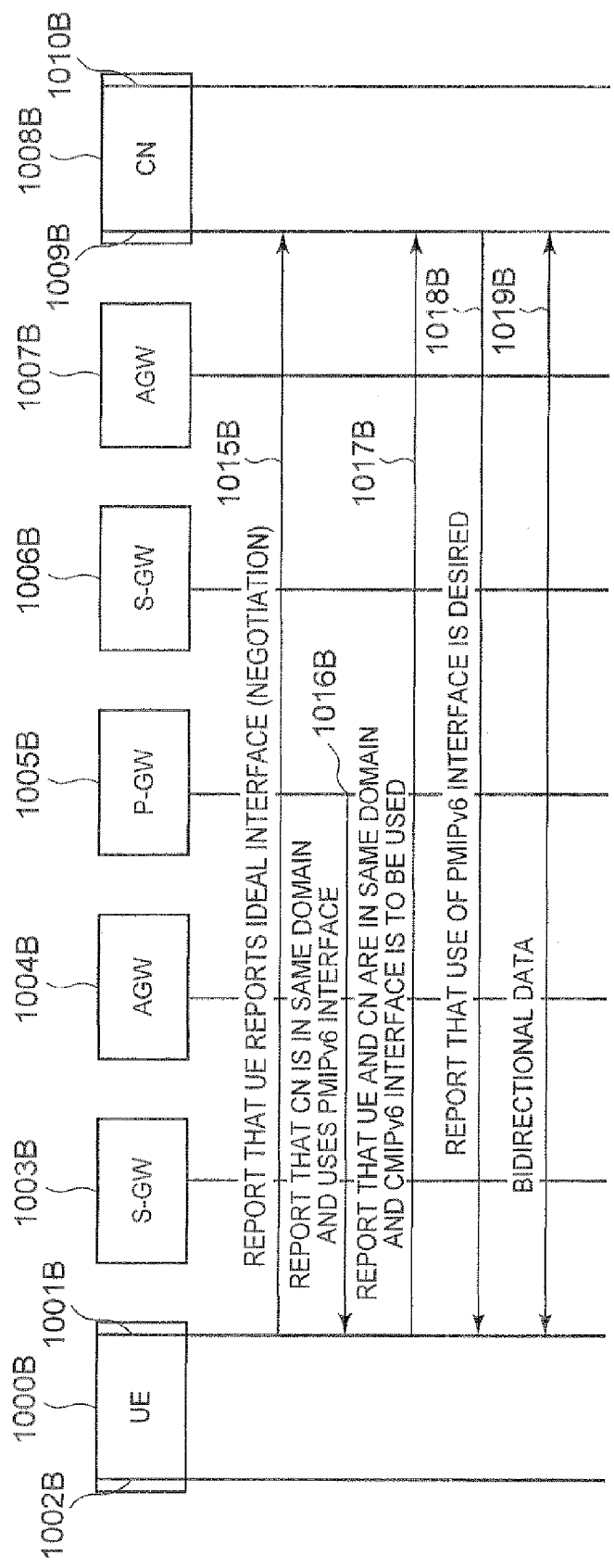

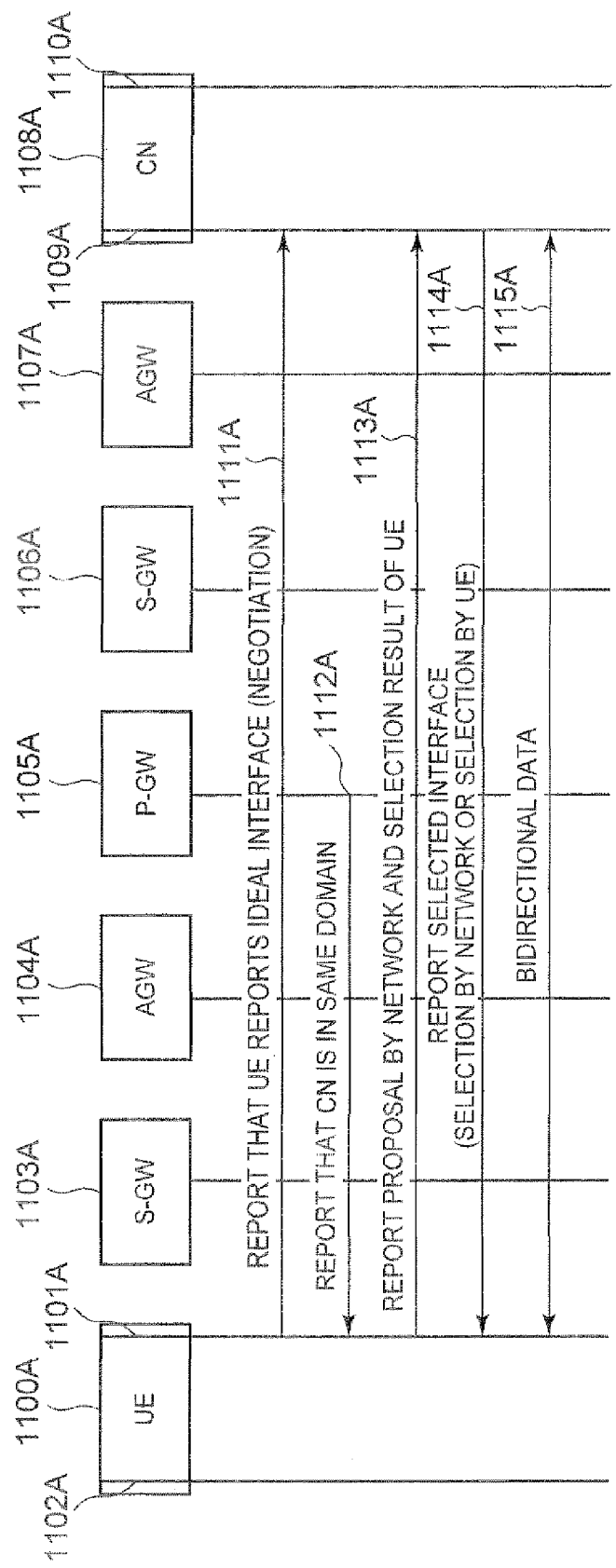

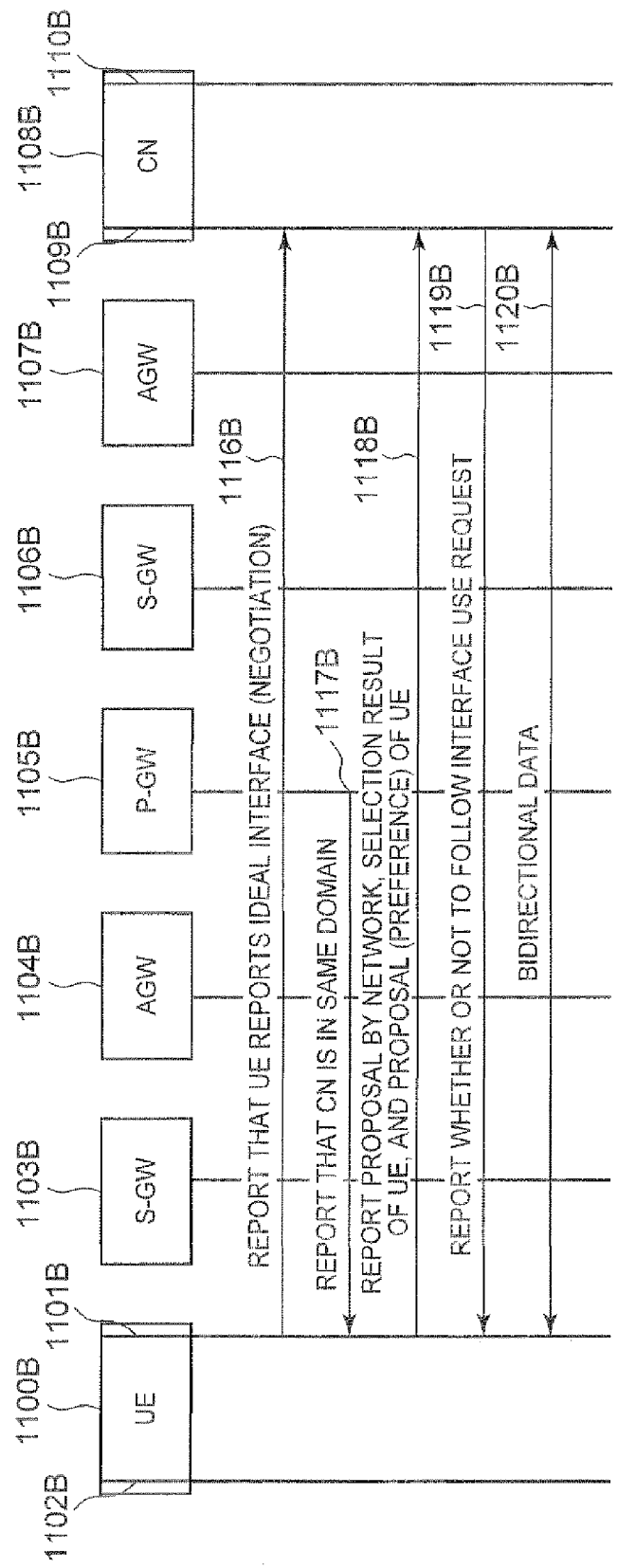

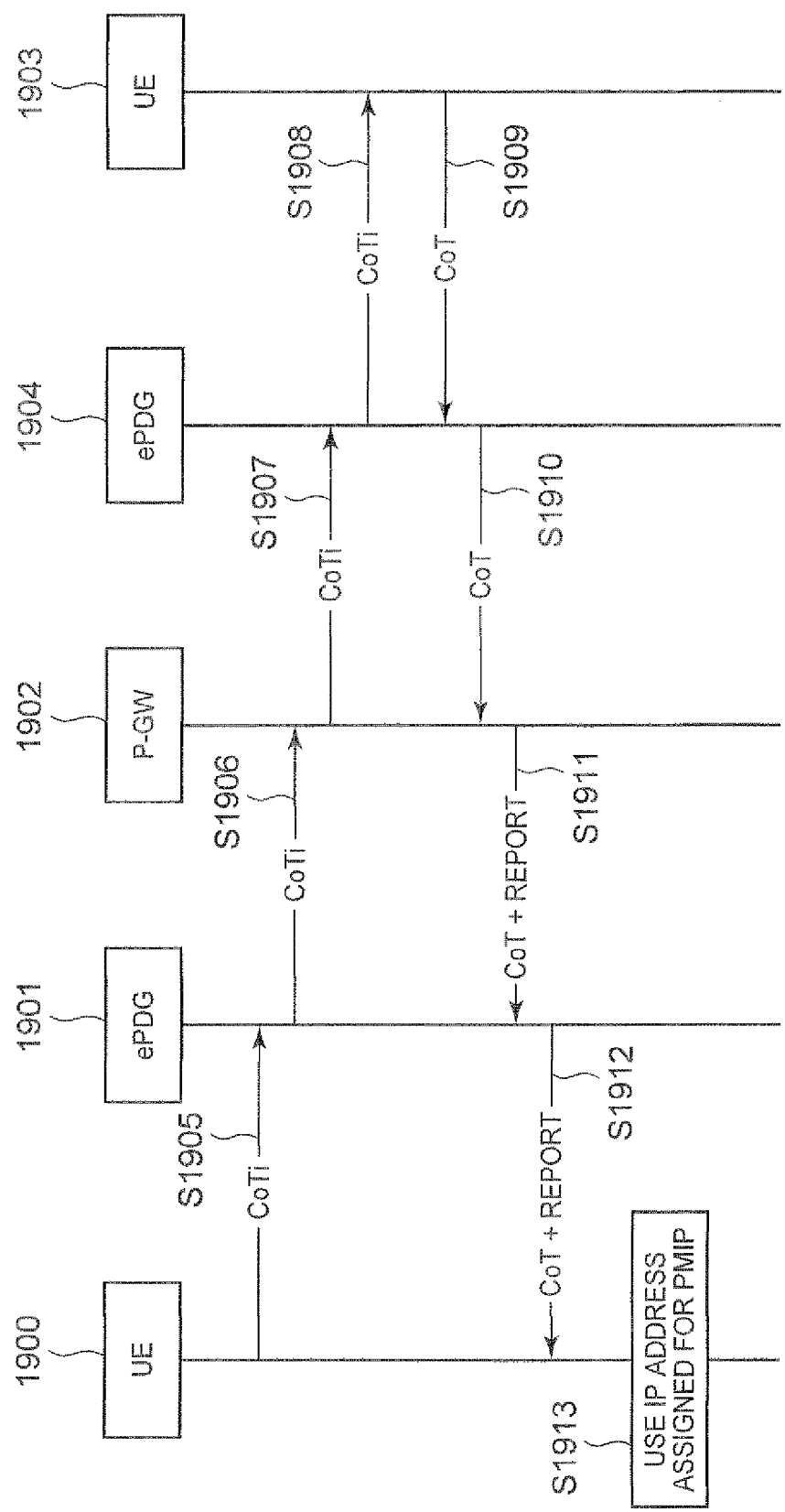

COMMUNICATION SYSTEM, MOBILE TERMINAL, NETWORK NODE, AND BASE STATION APPARATUS

TECHNICAL FIELD

The present invention relates to a communication system, a mobile terminal, a network node, and a base station apparatus for a communication technique that uses IP (Internet Protocol). The present invention especially relates to a communication system, a mobile terminal, a network node, and a base station apparatus for achieving optimized or efficient communication for a mobile terminal having a plurality of interfaces in a network-based local mobility management domain.

BACKGROUND ART

Currently, a large number of devices communicate with each other using IP. To provide mobility support to a mobile device, IETF (Internet Engineering Task Force) defines mobility support in IPv6 in the following Non-patent Document 1.

In Non-patent Document 1, mobility support is realized by introducing a home agent (HA) into a home network. A mobile node registers a care-of address (CoA) acquired in a foreign link, with the home agent using a BU (binding update) message. The BU enables the home agent to create a binding between the care-of address and a home address (HoA) which is a long-term address acquired in a home link.

The home agent has a function of receiving (intercepting) a message destined for the home address of the mobile node, and forwarding the packet to the care-of address of the mobile node by use of packet encapsulation (setting a packet as a payload of a new packet, also known as packet tunneling).

One problem with MIPv6 (Mobile IPv6) is that, in order to change a network connection point or in the case where a lifetime of a binding expires, a MN needs to send an update to at least one HA and CN (Correspondent Node). This puts a high load of signaling to a radio access network, especially on a fast moving MN. Besides, in the case where the MN uses RO (Route Optimization) with the CN, RR (Return Routability) and BU message transmission need to be performed at the time of network connection change, which causes an increase in average handoff time at the time of network connection change.

Thus, a significant time is spent in a handoff process in a session relating to a flow or a connection, as a result of which an increased end-to-end delay, jitter, or packet loss of media packets could occur. Such an end-to-end delay, jitter, and packet loss are undesirable for an application of high immediacy such as VoIP (Voice over IP), multimedia streaming, and video streaming. Moreover, a packet loss is undesirable for a flow of transmitting important text/data information. In a data application that establishes a session according to TCP (Transmission Control Protocol), too, a packet loss causes a decrease in TCP throughput or bandwidth efficiency in a radio access network in particular.

To solve such problems with MIPv6, a network-based local mobility management (NetLMM) protocol is currently receiving attention. In the network-based local mobility management protocol, the problems concerning MN signaling are completely resolved at least in a local domain. In addition, by enabling the MN to reliably identify the same prefix by such a network-based mechanism, the delay due to the handoff process can be reduced. In the network-based mechanism, there is no need for the MN to perform an address update in the CN, and reachability of the MN is maintained by network-based signaling executed in a local mobility anchor (LMA).

The NetLMM (Network-based Local Mobility Management) Working Group of IETF develops a protocol for providing mobility management for the MN using a network-based method in which mobility management is carried out in a manner transparent to the MN. Network-based local mobility management means that mobility of a node in a topologically localized network segment is managed not by the mobile node itself but by a network entity. To achieve network-based mobility management transparent to the MN, the MN is required to be able to identify the same prefix in the local domain. This prefix needs to be obtained from a router at a higher position in a routing hierarchy (desirably on a default routing path of every MN in the local domain) so as to benefit from local mobility management. The router which serves as a root of the prefix needs to have information about reachability to the prefix (prefix-based route), and eventually this prefix-based route needs to be created by the network entity.

A network-based local mobility management protocol standardized by the NetLMM Working Group is PMIPv6 (Proxy Mobile IPv6) disclosed in the following Non-patent Document 2. PMIPv6 is mainly designed to provide a normal IPv6 host (without a CMIPv6 (Client Mobile IPv6) stack) with a mobility management service in a local part of a network. CMIPv6 is realized by MIPv6 (Mobile IPv6) disclosed in Non-patent Document 1 and DSMIPv6 (Dual Stack Mobile IPv6) disclosed in Non-patent Document 6 which is an extension of MIPv6 to support IPv4. For example, in the case where the MN exists in a foreign PMIPv6 domain and identifies the same prefix in the local domain via an interface, there is no need for the MN to perform global binding registration with one or more home agents or one or more CNs. This is also effective for a node having a CMIPv6 stack. Moreover, in the case where the MN having a mobility management capability moves to the home domain, the MN can continue to identify the home network prefix/home prefix, with there being no need to execute location registration.

According to PMIPv6, a LMA (Local Mobility Anchor) has two functions. That is, the LMA supports both PMIPv6 operations and MIPv6 operations. Since the LMA has a functional capability of a HA, the LMA is hereafter also referred to as a LMA/HA. In PMIPv6, in the case where the MN connects to a PMIPv6 domain, the MN provides a network access identifier (NAI) during connection, to a MAG (Mobile Access Gateway). The MAG is a router for performing proxy local registration with the LMA on behalf of a directly connected MN or a MN under management. The NAI is passed to an AAA (Authentication, Authorization and Accounting) server for authentication.

When the AAA server authenticates the network connection of the MN, the AAA server sends a response to report an authentication success, to the MAG. The AAA server also provides a LMA address and a specific MN profile (e.g. an address configuration mode, a special policy to be applied to the MN while moving in the local domain), to the MAG. Having acquired these MN parameters, the MAG sends a PBU (Proxy BU) to the LMA. The MAG acquires a unique prefix associated with a connected MN interface from a PBA (Proxy BA), and then serves as a home link or a local home link (in the case of a visited domain). The PBU (or local registration) executed by the MAG is the same as the BU in MIPv6 except for a "P" flag indicating that this is a proxy BU.

As a result of executing the PBU, reachability regarding the MN is generated in the LMA. Basically, the LMA has a reachability state for a unique prefix (a prefix unique to each MN) of the MN acquired in the PMIPv6 domain. A reachable address associated with this unique prefix is an address of the MAG. The MN configures an address using the unique prefix received in the PMIPv6 is domain, in a stateful or stateless address configuration mode. Since each MN acquires a unique prefix, a prefix-based cache in the LMA makes the MN reachable.

Every data packet reaching the LMA is tunneled to the MAG connected to the MN. Conversely, every data packet reaching the MAG from the MN is tunneled to the LMA. A neighbor cache table in the MAG includes a binding between a PMIPv6 local address of the MN and a link layer address used to transmit a packet to the MN. The PMIPv6 local address is an address obtained from the unique prefix provided to the MN in the local domain.

PMIPv6 disclosed in Non-patent Document 2 provides multihoming support, in addition to a transparent proxy mobility service. Here, a MN having a plurality of interfaces (multi-interface MN) is connectable to the PMIPv6 domain via all interfaces. The MN is capable of moving in the domain without executing mobility-related signaling, with there being no need for a change in a layer 3 protocol in a protocol stack. Multihoming is basically supported by the LMA assigning a unique prefix to each interface of the MN and maintaining a PMIPv6 binding related to each interface of the MN as an independent mobility session. In a PMIPv6 multi-homing protocol, in addition to assigning a unique prefix to each interface at the time of initial connection, there is a need to maintain the assigned prefixes and sessions established using these prefixes without adversely affecting session quality (QoS: Quality of Service) when the MN having the plurality of interfaces moves in the local domain, to thereby provide completely transparent mobility management.

The multihoming support is also discussed in the MEXT (Mobility Extensions) Working Group of IETF. This Working Group is intended to enable a mobile node to configure different care-of addresses using one or more interfaces, and also enable the mobile node to receive a packet destined for a single long-term address (home address) via all interfaces or care-of addresses. This method is described in detail in the following Non-patent Document 3.

The technology disclosed in Non-patent Document 3 is discussed with regard to 3GPP (3rd Generation Partnership Project), but is also applicable to other public networks (e.g. 3GPP2, WiMAX Forum, Broadband Forum).

3GPP seeks application to a global heterogeneous architecture including various types of radio access networks (i.e. all networks connectable to an EPC (Evolved Packet Core network)), such as a wireless local area network (WLAN), a cellular network, a third generation network (3G network), and a wireless WAN (wide area network).

The global heterogeneous architecture is typically called a PLMN (Public Land Mobile Network), and is effective in realizing seamless mobility during vertical handoff or during simultaneous access through different access technologies. The global heterogeneous architecture is also effective in supporting different types of application services having very high QoS (e.g. real time video, VoIP, information-critical data, and so on).

Non-patent Document 3 discloses, with regard to connection by a MN via a 3G access network, that PMIPv6 is not only a GPRS (General Packet Radio System) tunneling protocol (GTP) but also a primary mobility management protocol for managing mobility. The use of MIPv6 through 3G access is restricted, and MIPv6 is used only for sending a de-registration BU when returning to a home or when executing a dynamic bootstrapping function to attain secure association with a HA. The MN can use MIPv6, PMIPv6, or MIPv4 through other access such as WiMAX access or WLAN access. For example, a mobility management mechanism when the MN connects to a 3GPP core network through WiMAX may be any of MIPv4, MIPv6, and PMIPv6, and a mobility management mechanism when the MN connects to the 3GPP core network through WLAN access may be any of MIPv6 and PMIPv6. Even when such a wide range of technologies are available as a mobility management mechanism, the system is restricted to the use of a specific mobility management mechanism through a current access technology type.

It will become necessary in the future that a MN having a plurality of interfaces of different types moves in a 3GPP network and performs simultaneous connection via different types of interfaces to attain multihoming advantages (e.g. load sharing, load balancing, fault tolerance, reachability, preference setting). Here, mobility of the interfaces may be managed by different mobility management protocols.

Since there are two main mobility management protocols, namely, MIPv6 (i.e. CMIPv6) and PMIPv6, in 3GPP these protocols will be developed in a mixed manner in the future. As an example, a MN having a plurality of interfaces manages all interfaces in one access domain, while a network using the PMIPv6 mechanism completely handles mobility of the MN having the plurality of interfaces in another access domain. Moreover, in a variable manner in some access regions, mobility of an interface of a CN having a plurality of interfaces is managed by the network, while mobility of another interface of the CN is managed by the MN itself. Such different management is performed using, for instance, a preference of the MN based on route optimization and/or a preference of the network based on load balancing.

In 3GPP disclosed in Non-patent Document 3, a mobility management mechanism relating to network connection of a MN through a specific access technology may be determined by static configuration or dynamic configuration. In the static configuration, for example, a mobility management mode relating to a specific interface of a mobile node may be pre-configured, where the MN obtains this information beforehand or the network reports this information upon connection so as to prevent a change of the determined mobility mode type. A specific mobility mode via an interface is determined based on an access technology type and a roaming agreement. Meanwhile, in the case of using the dynamic configuration mode, it is possible for the MN or user equipment (UE) to negotiate for a suitable mobility mode used via an interface connected to a specific access network. Note that the terms UE and MN are interchangeable and both denote a mobile terminal in this description.

PRIOR ART DOCUMENT

Patent Document

Patent Document 1: United States Patent Application Publication No. 2004/0213181
Patent Document 2: United States Patent Application Publication No. 2005/0088994
Patent Document 3: United States Patent Application Publication No. 2008/0285518
Patent Document 4: International Application Publication No. WO2007/137765
Patent Document 5: International Application Publication No. WO2008/104132
Patent Document 6: International Application Publication No. WO2008/134394

Patent Document 7: United States Patent Application Publication No. 2008/0285492

Patent Document 8: International Application Publication No. WO2009/097914

Patent Document 9: International Application Publication No. WO20091084989

Non-Patent Document

Non-patent Document 1: Johnson, D. B., Perkins, C. E., and Arkko, J., "Mobility Support in IPv6", Internet Engineering Task Force Request For Comments 3775, June 2004

Non-patent Document 2: Gundavelli, S., et al., "Proxy Mobile IPv6", Internet Engineering Task Force (IETF) Internet Engineering Task Force Request For Comments 5213, August 2008

Non-patent Document 3: "3rd Generation Partnership Project; Technical Specification Group Services and System Aspects; Architecture enhancements for non-3GPP accesses", 3GPP TS 23.402, V8.3.0, September 2008

Non-patent Document 4: Wakikawa, et al., "Multiple care-of addresses Registration", Internet Engineering Task Force Draft: draft-ietf-monami6-multiplecoa-10.txt, November 2008

Non-patent Document 5: Hinden, et al., "IPv6 Global Unicast Address Format", Internet Engineering Task Force (IETF) Internet Engineering Task Force Request For Comments 3587, August 2003

Non-patent Document 6: Soliman, et al., "Mobile IPv6 Support for Dual Stack Hosts and Routers", Internet Engineering Task Force (IETF) Internet Engineering Task Force Request For Comments 5555, June 2009

Conventional techniques have a problem that the UE does not have sufficient information for selecting which interface is to be used in order to achieve efficient communication (route optimization or efficient mobility management for reducing signaling messages) with the CN. In detail, the conventional techniques have a problem that, when the UE selects a proper interface or mobility mode for communicating with the CN, the UE is unable to specify a location of the CN and a state (CMIPv6 state, PMIPv6 state, static mobility configuration mode, dynamic mobility configuration mode, and the like) of the CN and select an interface to be used by the UE based on these information.

The following describes the problem in the case where a CN having a plurality of interfaces (multi-interface CN) is connected to a 3GPP EPC via an access network and restricted to the use of a specific mobility management mechanism via an interface.

This problem is described below, with reference to FIGS. 1A and 1B. A main cause of the problem lies in that the MN does not know an accurate location of the CN and so is unable to reliably recognize which interface is to be used for communication with the CN in order to achieve route optimization and efficient mobility management.

Efficient mobility management mentioned here means that data communication with the CN is performed so as to reduce the amount of signaling with the CN. In this description, it is assumed that the CN has a function of executing RR and also implements a MIPv6 stack. It is so stated if the CN is a simple IPv6 host.

In FIG. 1A, a UE 104 has two interfaces connectable to an EPC 100 via an access network 103 and an access network 102. For example, the access network 103 is a 3G access network such as a LTE (Long Term Evolution), network, whereas the access network 102 is a WiMAX access network. The UE 104 is also connected to a S-GW (Serving Gateway) 108 by an access link 105, and connected to an AGW (Access Gateway) 109 by an access link 106.

The S-GW 108 and the AGW 109 both implement a function of a MAG. A P-GW 111 is a mobility anchor for managing mobility of the UE 104. The P-GW (also referred to as LMA/HA) 111 has substantially same functions as the above-mentioned LMA/HA, and is a mobile IPv6 home agent of the UE 104.

Moreover, the UE 104 configures one MIPv6 home address. For instance, this home address is obtained from the P-GW 111 using a dynamic bootstrapping mechanism or any other access technology-specific mechanism.

Mobility of the UE 104 for a 3G interface is managed by the PMIPv6 mechanism, whereas mobility of the UE 104 for a WiMAX interface is managed by the CMIPv6 mechanism. The mobility management mode assigned to each interface of the UE 104 is unchangeable and static. That is, due to the static configuration of the mobility mode assignment in 3GPP, the UE 104 cannot change the mobility mode assigned to each interface. A home network prefix (i.e. a prefix assigned in the PMIPv6 mode) that can be identified via the 3G interface is a MIPv6 home prefix of the UE 104. The LMA/HA 111 has a multihoming function, and is capable of maintaining both a PMIPv6 binding and a CMIPv6 binding. The LMA/HA 111 is also capable of performing prefix-based search (PMIPv6 cache) and address-based search (CMIPv6 cache) while placing an equal priority or weighting condition, and sending a packet to the UE 104.

When the UE 104 performs CMIPv6 registration with the LMA/HA 111 for the WiMAX interface, the bindings of home type and away type are used simultaneously. It is considered that the UE 104 can execute CMIPv6 using a MoNAMI6 (Mobile Nodes and Multiple Interfaces in IPv6) function described in Non-patent Document 4. However, it is obvious to a person skilled in the art that, instead of the simultaneous bindings in the LMA/HA 111, the UE 104 only needs to perform the PMIPv6 binding in the P-GW 111 without performing the CMIPv6 registration with the P-GW 111. The same scenario can be realized even when the UE 104 merely uses the WiMAX interface for route optimization with the CN.

Suppose, in this structure, the UE 104 has a data communication session with a CN 112. The CN 112 is operable in the PMIPv6 mode or the CMIPv6 mode. The domain 100 may be a home domain of the CN 112, or may not be a home domain of the CN 112. In the case where a node uses the PMIPv6 mobility management mode, a home domain of the node is a domain in which a LMA for assigning a home network prefix is located. In the case where a node uses the CMIPv6 mechanism, a home domain of the node is a domain in which a home agent of the node is located.

The CN 112 activates one interface which is a WiMAX interface. This WiMAX interface is connected to an AGW 110 by an access link 107. A WiMAX access network to which the CN 112 is connected is an access network 101 shown in FIG. 1A.

In the case where the domain 100 is the home domain of the CN 112 and the mobility is managed by the PMIPv6 mechanism, the UE 104 can only recognize an address of the CN 112 and cannot obtain information about a location to which the CN 112 is connected, which poses a significant problem. It is impossible to determine whether or not the CN 112 is located in the same domain as the UE 104, by merely comparing a prefix of the IPv6 address of the CN 112 and a prefix of the IPv6 address (home address) of the UE 104.

In the case of referencing to a routing prefix hierarchical structure as disclosed in Non-patent Document 5, there is a possibility that the UE 104 cannot recognize a routing prefix-related hierarchy or prefix division, and cannot determine whether or not the CN 112 is connected to the same domain by the comparison. Since information for determining whether or not the CN 112 is located in the same domain as the UE 104 is unavailable, in the case where the UE 104 sends a data packet to the CN 112 using, for example, the 3G interface, a routing path of the data packet is a path indicated by a message 126. That is, the data packet to the CN 112 is tunneled from the S-GW 108 to the P-GW 111 and decapsulated by the P-GW 111, and then further encapsulated to be destined for the AGW 110 and reaches the CN 112.

This path of the message 126 basically has two drawbacks. The first drawback is that the packet is encapsulated twice and passes through two tunnels. The second drawback is that, since the prefixes of the UE 104 and the CN 112 both have the P-GW 111 as a root, the data packet needs to be routed via the P-GW 111, which is not a completely optimized route. In the case where the UE 104 uses the WiMAX interface operating in the CMIPv6 mode to communicate with the CN 112, on the other hand, redundant routing can be prevented without any type of tunneling being included in the routing path of the data packet, if the CN 112 can switch the mobility mode to CMIPv6.

In the case where the CN 112 uses MIPv6 to manage its mobility and is connected to the home domain 100 in various scenarios, the address used for sending the data packet to the CN 112 is a care-of address of the CN 112 (provided that RO is executed with the CN 112). When the UE 104 uses the 3G interface, the routing path of the packet is as indicated by a message 127 in FIG. 1A if a prefix of the care-of address of the CN 112 is acquired from the AGW 110.

The UE 104 sends the data packet using the 3G interface, without knowing whether or not the CN 112 exists in the same management domain under the same mobility anchor (the P-GW 111). In such a case, the data packet is first encapsulated by the S-GW 108 to the P-GW 111, and passes through ingress filtering. The packet is appropriately sent from the P-GW 111 and reaches the current address of the CN 112. The prefix of the current address has the AGW 110 as a root, so that the data packet from the P-GW 111 is directly delivered without being further tunneled to the CN 112. Hence, the message 127 indicating the routing path of the data packet in this case has only one tunneling.

However, in the case where the UE 104 uses the WiMAX interface to communicate with the CN 112, a more optimized route can be established because both end points of the communication flow use addresses obtained from prefixes possessed by nearest routers (access routers) (or prefixes having the access routers as a root). In other words, the routing path of the data packet is not optimized in the case where the UE 104 uses the 3G interface to communicate with the CN 112. When the CN 112 is in the CMIPv6 mode, the problem arises in the case where the LMA/HA 11 is not the home agent of the CN 112.

The same problem in another scenario is described next, with reference to FIG. 1B. Suppose a CN 122 is connected to another management domain (EPC) 125 different from a domain (EPC) 120 of a UE 113. The assumption applied to the UE 104 in FIG. 1A is also applied here. Basically, the UE 113 is connected to the EPC 120 via both a 3G interface and a WiMAX interface, and communicates with the CN 122. The CN 122 may operate using the PMIPv6 mode, or operate using the MIPv6 mobility management mode. A home domain of the CN 122 may be the domain 120 or a domain other than the domain 120.

To describe the problem related to the present invention, it is assumed first that the CN 122 uses the PMIPv6 mobility management mechanism and the home domain of the CN 120 is the domain 120. This scenario is a plausible scenario in the case of communication via a 3GPP home network, where a home network prefix (HNP) is referenced to during foreign roaming by a global mechanism such as a PMIPv6 operation.

In principle, a PBU/PBA performed by a foreign domain with a LMA in a home domain enables a roaming UE to constantly identify a HNP, in the foreign domain. This mechanism is disclosed in detail in Non-patent Document 3. In such a scenario, an address of the CN 122 is likely to be similar to an address of the UE 113. Suppose the CN 122 exists in the same domain as the UE 113. In the case where the UE 113 uses the WiMAX interface, the UE 113 uses the CMIPv6 mobility management mechanism. A data path in this case is as indicated by a message 128. For the CN 122 located in the foreign domain 125, however, there is no need to achieve route optimization using the CMIPv6 mechanism. This being the case, the use of the CMIPv6 interface (i.e. the WiMAX interface) to achieve route optimized communication with the CN 122 causes an increase in mobility signaling to the UE 113. Since a P-GW 121 is a router at an exit of the domain 120, the data packet reaches the CN 122 through the same routing path regardless of which interface is used by the UE 113. In the case where the UE 113 selects the CMIPv6 interface, mobility management signaling (RR and BU) needs to be performed when the UE 113 moves to change connection to a new access router, as a result of which efficient mobility management becomes impossible.

In the case where the home domain of the CN 122 is not the domain 120 but the domain 125, the above-mentioned problem also occurs when the CN 122 uses PMIPv6 mobility management. The above-mentioned problem equally occurs in the case where the CN 120 uses MIPv6 and the home domain of the CN 122 is the domain 120, and in the case where the CN 122 uses MIPv6 and the home domain of the CN 122 is not the domain 120. Merely analyzing such simple scenarios demonstrates that the problem arises when the UE 113 does not have information about the CN 122 for selecting an ideal interface in order to achieve route optimized communication or efficient mobility management.

Information used by the UE 113 for selecting the ideal interface in order to perform route optimized communication through efficient mobility management signaling with the CN 122 is not necessarily limited to information about the location of the CN. The same problem can be seen in the case where the UE does not have information about some kind of operation mechanism of the network or in the case where the UE does not have information about characteristics of the CN. This type of problem is described next.

The problem related to the present invention is described below, with reference to FIGS. 2A and 2B. A problem in the case where inter-MAG route optimization (inter-MAG RO) is performed in a network is described with reference to FIG. 2A. A problem in the case where a CN uses the PMIPv6 mobility mode which is unchangeable according to a network policy is described with reference to FIG. 2B.

In FIG. 2A, a UE 204 has two interfaces (a 3G interface and a WiMAX interface) that are connected to respective gateways (a S-GW 208 and an AGW 209). The assumption applied to the UE 104 in FIG. 1A is also applied in FIG. 2A (description is omitted).

Basically, the UE 204 uses the PMIPv6 mechanism through the 3G interface, and uses the CMIPv6 mechanism through the WiMAX interface. A P-GW 211 is a home agent of the UE 204. The UE 204 has a data communication session with a CN 213. For example, the CN 213 may operate in the PMIPv6 mode even if the CN 213 implements a MIPv6 stack and a home domain of the CN 213 is a domain (EPC) 200. The P-GW 211 is also a home mobility anchor of the CN 213.

Suppose the UE 204 determines to use the WiMAX interface to communicate with the CN 213 but, before completing RR, the UE 204 sends a data packet to the CN 213 using the 3G interface. This data packet is tunneled from the S-GW 208 to the P-GW 211, and then tunneled from the P-GW 211 to an AGW 210.

Note that a network structure may implement an inter-MAG route optimization mechanism so as to provide route optimization support for a legacy IPv6 node (a node incapable of mobility management, a node incapable of RO signaling) in the future. Suppose the domain 200 implements such inter-MAG RO. When the first data packet is sent to the CN 213, the P-GW 211 may specify a MAG (i.e. the S-GW 208) sending the data packet and a MAG (i.e. the AGW 209) receiving the data packet, and request these MAGs to form an inter-MAG tunnel. Here, the P-GW 211 can specify the related MAGs forming the tunnel end points, from a PMIPv6 binding cache table held in the P-GW 211. It is clear that such a tunnel 212 in FIG. 2A is formable by a pre-shared key provided from a third party (e.g. the P-GW 211) and a dynamic key generation mechanism such as an inter-MAG (the S-GW 208 and the AGW 209) RR mechanism.

There is a possibility that the UE 204, without knowing that the tunnel 212 is in operation, uses the CMIPv6 interface to communicate with the CN 213, after completing the RR process. In this case, when the CN 213 switches to the CMIPv6 mode, a resulting routing path is as indicated by a message 214. Meanwhile, in the case where the UE 204 uses the 3G interface to communicate with the CN 213, the routing path indicated by the message 214 changes to a routing path 214A. Thus, the UE 214 which cannot accurately recognize that a route optimization mechanism is in operation in a network configured for an IPv6 host in particular will end up selecting a mobility management mode unfavorable for communication with the CN 213 (a mobility management mode in which efficient mobility management cannot be achieved). This raises a need to execute further mobility management signaling with the CN 213 using the CMIPv6 mode (i.e. the WiMAX interface), leading to a decrease in mobility management efficiency. As mentioned earlier, in the CMIPv6 mode, appropriate binding registration with the CN 213 needs to be performed in the case of an access router change, which causes an increase in signaling load.

A problem in the case where a CN 226 is located in the same domain as a UE 218 but uses the PMIPv6 mode which is unchangeable is described with reference to FIG. 2B. A P-GW 222 has a PMIPv6 binding for the CN 226. The following describes an operation in a structure shown in FIG. 2B, to illustrate the problem related to the present invention.

The UE 218 is the same as the UE 104, and the same assumption as the UE 104 is applied to the UE 218. A home domain of the CN 226 is a domain 215. In the case where the UE 218 uses the CMIPv6 interface (i.e. the WiMAX interface) to communicate with the CN 226, a routing path of a data packet is as indicated by a message 228. Provided that the UE 218 completes the RR process with the CN 226, a destination address of the data packet from the UE 218 to the CN 226 is an address of the CN 226, and the data packet is delivered via a P-GW 222, resulting in a non-optimized route. Such a route is generated because the CN 226 operates in the PMIPv6 mode.

Since the CN 226 is unable to change to the CMIPv6 mode, it is clearly impossible to benefit from route optimization even in the case where the UE 218 uses the CMIPv6 mode (i.e. the WiMAX interface). If the CN 226 can switch to the CMIPv6 mode, then an optimized route indicated by a message 227 is possible. Thus, the UE 218, without knowing the state of the CN 226, will end up selecting an unfavorable interface for communication with the CN 226. In the case where the UE 218 uses the 3G interface, on the other hand, the network performs mobility management signaling, so that a large amount of mobility management signaling transmission/reception can be avoided. As described above, though complete RO cannot be achieved in this scenario regardless of which interface is used, an increase in mobility management signaling can be reliably suppressed when the UE 218 uses the 3G interface. That is, the 3G interface is an optimal interface.

Patent Document 1 discloses a method of determining whether or not a UE updates a current location/address by a plurality of BUs, or a method of determining whether or not a UE reports a current address to a previous access router (an access router connected before connection change) by a single BU. Basically, the previous access router is specified as an anchor point to which the BU is sent. In which entity the current location of the UE is to be updated is determined based on, for example, the number of peer nodes with which the UE communicates, traffic between the peer nodes, a signaling amount or a traffic load between the UE and an access router and/or a peer node, a lower layer state, a mobile node state, and a handover frequency. Hence, the technique disclosed in Patent Document 1 solves a problem relating to frequent binding update signaling that needs to be performed when the UE communicates with a lot of peer nodes and also requires optimization.

However, in the BU signaling reduction process, route optimization is canceled out because the data packet reaches from the previous access router. If a BU is sent from the current access router to an old access router at a distance of a plurality of hops, formation of a direct path (optimized path) is hindered. Moreover, a location to which a BU is sent is not determined per peer node. There is an instance where the current location of the UE is not updated in all peer nodes, while there is also an instance where the current location of the UE is updated in all peer nodes. The technique disclosed in Patent Document 1 is intended to solve a problem of signaling reduction for a fast moving UE. However, even when the technique disclosed in Patent Document 1 is combined, it is impossible to actually achieve RO and efficient mobility management.

A method described in Patent Document 2 is intended to achieve efficient mobility management and route optimization of a UE having a single interface through the use of a hybrid-type mobility management method in the case where a CN exists outside a local domain in which the UE is located. In detail, in the local domain, the UE is not involved in mobility-related signaling, and a network completely manages mobility. A prefix identified in the local domain is held constant, and a network proxy maintains a routing path about this prefix. Patent Document 2 further discloses that mobility of the UE in the local domain is completely managed by a proxy entity such as a cellular access point (CAP). The prefix obtained in the local domain is acquired from a local mobility anchor. In the local domain, the UE does not perform any mobility signaling, and needs to provide a current address to a peer node such as a CN or a HA only in the case where the current address is different from a home address. In the method disclosed in Patent Document 2, even if two interfaces are connected, there is no difference depending on which interface is used because both interfaces use the same mobility mode, with there being no confusion about which interface is to be selected.

A method disclosed in Patent Document 3 is a method whereby a LMA assists in a route optimization process between IPv6 hosts connected to the same local domain or between IPv6 hosts connected to different local domains in which PMIPv6 is implemented. In particular, in the method disclosed in Patent Document 3, the LMA first specifies which of two MAGs is involved in a tunneling process in a routing path of a data packet, thereby achieving route optimization. After making this specification, the LMA requests these MAGs to form an inter-MAG tunnel. This method assists in route optimization only in the case where caches of both ends of the communication flow are available in the LMA. Besides, this method is designed to particularly support a legacy IPv6 host.

The method disclosed in Patent Document 3 does not support route optimization in such a complex scenario where a UE uses a different mobility management mode via each interface and specifies a proper mode usable for communication with a CN even in the different mobility management mode. Moreover, this method involves the use of a cache entry in the LMA to perform route optimization, and so route optimization cannot be assisted in the case where there is no available cache entry in the LMA.

Patent Document 4 describes a route optimization mechanism that achieves both location privacy and route optimization. A method employed for achieving route optimization is, for example, a method whereby a UE specifies a HA used by a CN and bootstraps in the HA. This shortens a routing path of a data packet.

The technique described in Patent Document 4, however, fails to achieve complete RO. Moreover, though selecting one of a plurality of by a very sophisticated technology is similar to a process of selecting a better route, it is not equivalent to selecting an ideal interface for a better route. Furthermore, the mechanism discussed in Patent Document 4 does not relate to selection of an ideal mobility mode and interface in a static configuration condition in order to achieve RO and efficient mobility management with a CN.

Patent Document 5 discloses a method for achieving RO in a pure PMIPv6 environment. This method is intended to achieve RO and benefit from efficient management in PMIPv6. In the method described in Patent Document 5, a MAG realizes the RR process to establish a tunnel. Tunnel end points of the tunnel are a MAG directly connected to a UE and a MAC directly connected to a CN. The MAG builds the tunnel based on an attribute forwarded by context transfer from a previous MAG (MAG before connection change).

However, the method disclosed in Patent Document 5 is not ideal in the case where the UE and the CN are located in the same local domain, though it is effective in the case where the UE and the CN exist in independent domains and are both away from their home domains. Besides, though the use of a pure MIPv6 mechanism (not tunneling related to the MIPv6 mechanism based on RO) in a local domain is effective in the case where the UE is capable of realizing the CMIPv6 mechanism, tunneling for RO is not disclosed in Patent Document 5. In addition, inter-MAG RO is not efficient in the case where the UE and the CN exist in independent domains and also exist in their home domains. Such an environment where inter-MAG RO is available is sufficient for the normal PMIPv6 mechanism, but Patent Document 5 fails to disclose even inter-MAG RO. In the case where the UE and the CN are both in the PMIPv6 mode, only inter-MAG RO is efficient. In the case where the UE or the CN is in the CMIPv6 mode, on the other hand, inter-MAG RO is unusable, and only an option enables a state where a proper mobility management mode about a peer node for optimized communication can be identified.

Patent Document 6 discloses a method for achieving route optimization without RR signaling being executed by a peer node. The method disclosed in Patent Document 6 is intended to achieve RO without excessive mobility management signaling executed in the MIPv6 mechanism.

However, the method disclosed in Patent Document 6 is focused on RO in MIPv6, and there is no need to specify or select one of different interfaces for communication with a CN. One method disclosed in Patent Document concerns the case where both the UE and the CN have the same HA. The HA passes a current address of the CN to the UE, and also passes a current care-of address of the UE to the UE, as a result of which the UE and the CN can directly communicate with each other. Such a method is possible in the case where all caches (binding caches of both the UE and the CN) are available in the HA, but is not applicable in the case where the binding of the CN is unavailable in the HA.

Patent Document 6 also discloses another method in the case where the UE and the CN belong to different HAs and the HAs of the UE and the CN exchange binding caches to thereby achieve RO between the UE and the CN. In this method, the HA of the UE passes the cache of the UE to the HA of the CN while the HA of the CN passes the cache of the CN to the HA of the UE, and eventually the HA of the UE passes the cache of the CN to the UE while the HA of the CN passes the cache of the UE to the CN.

In this method, however, infrastructure support is necessary, and all relevant bindings need to be available in the HA. This does not solve a problem in the case where a node having a plurality of interfaces has a rigid mobility management mode assigned to each interface and communicates with a CN having a different type of restriction or domain location.

The above discussion about the operations in the conventional techniques demonstrates that the conventional art fails to provide a sufficient method for enabling a UE having a plurality of interfaces each of which uses a different mobility management mode to select a proper interface. The methods disclosed in the conventional art fail to achieve end-to-end RO and efficient mobility management for communication with a CN, in any of a scenario where inter-MAG RO is supported and a scenario where inter-MAG RO is not supported.

Moreover, according to the methods disclosed in the conventional art, upon selecting a proper interface or mobility mode for communicating with the CN, the UE cannot specify the location of the CN, and also cannot specify the state of the CN (e.g. CMIPv6 state, PMIPv6 state, static mobility configuration mode, dynamic mobility configuration mode, and so on).

3GPP also examines another scenario supported by a femtocell (also called a femto base station or Home enhanced Node B (Home eNB or HeNB)) for use in a home environment or a small-to-medium business environment. For example, the femtocell is managed by a small cellular base station connected to a network of a service provider via broadband (e.g. a digital subscriber line), and supports a mobile phone in a home or business environment. The femtocell allows the service provider to extend its service coverage indoors, especially where access would otherwise be limited or unavailable.

The concept of the femtocell introduces a function or a normal base station, but provides an extension so as to realize a simpler function-equipped structure. By introducing a small base station that utilizes power or backhaul through an existing resource of a user, a cellular operator can attain a wider network range without an increase in network installation cost.

The use of the femtocell also has an advantage that the user can attain an environment equivalent to a perfect cellular mobile network, with extremely low power. This remarkably increases battery life of an existing terminal. Moreover, in the concept of the femtocell, a cellular radio network of a mobile device is used, and so a user of the mobile device has an option of not supporting a radio access technology (e.g. WiMAX) in the mobile device.

A notable feature of the femtocell in 3GPP is that it uses a local IP address (LIPA). The LIPA allows the UE to directly access another device having an IP function in the femtocell, through IP. Traffic between the UE and the other device having the IP function by direct access is expected not to pass through an EPC.

FIG. 13 is a network configuration diagram explaining a situation where a femtocell is located in 3GPP. In FIG. 13, a subscriber of a UE 1350 sets up the femtocell as a home network 1301. A base station (a HeNB 1352) provided by a network operator of the subscriber manages the home network 1301. The HeNB 1352 has a plurality of links to a foreign network (i.e. a cellular link 1353 to a S-GW 1304 to access an EPC 1355, a DSL link 1356 to a service provider 1357). In an actual industrial application, the cellular link 1353 is assumed to be a logical link passing through the physical DSL link 1356. Though the base station HeNB 1352 for managing the DSL link 1356 to the service provider is shown in FIG. 13, the HeNB 1352 is assumed to be connectable to a DSL router for managing the DSL link 1356.

A mobility anchor (a P-GW 1358) in the EPC 1355 functions as an anchor point of the UE 1350. The P-GW 1358 has a plurality of links to a foreign network (i.e. a dedicated operator link 1359 to another operator network EPC 1360, a dedicated data link 1361 to the Internet 1362). In an actual industrial application, operators have several dedicated operator links 1359 with each other.

The service provider 1357 has a dedicated service link 1363 to the Internet 1362. Correspondent nodes (CNs 1364 to 1366) are each a terminal having a communication session with the UE 1350. The UE 1350 is capable of communicating with the CN using one or both of the cellular link 1353 and the DSL link 1356. In an actual industrial application, the CNs 1364 to 1366 are assumed to be each a mobile terminal as with the UE 1350. A method whereby the UE 1350 acquires a plurality of IP addresses to communicate with the CNs 1364 to 1366 is described in the following example.

The UE 1350 currently uses only the cellular radio network. The UE 1350 connects to the HeNB 1352, and accesses the EPC 1355 to receive a service. The P-GW 1358 assigns an IP address (3G.IP.UE1350, hereafter also referred to as 3G.IP) used by the UE 1350 to access the EPC 1355. Likewise, the HeNB 1352 having a P-GW function assigns an IP address (HN.IP.UE1350, hereafter also referred to as HN.IP) for receiving a local breakout service in the home network 1351, to the UE 1350.

The HeNB 1352 forwards/receives a packet to/from 3G.IP, via the cellular network 1353. The HeNB 1352 equally forwards/receives a packet to/from HN.IP, via the DSL link 1356. Thus, the UE 1350 can use either 3G.IP or HN.IP, in order to communicate with the CNs 1364 to 1366.

The scenario shown in FIG. 13 has the same problem as the above-mentioned scenarios, in that the UE 1350 does not have sufficient information for determining which link is to be used for communicating with the CN 1366. In the case where the UE 1350 selects a sub-optimal communication route to the CN 1366, there is a possibility that the UE 1350 experiences service degradation.

For example, suppose the UE 1350 and the CN 1366 are actually located in the same domain (i.e. the home network). In this case, the UE 1350 communicates with the CN 1366 using the cellular link 1353, and a communicated packet returns to the home network 1351 via the EPC 1355. Note that an increase in the number of routing hops between the UE 1350 and the CN 1366 means a delay of the packet from the UE 1350 to the CN 1366 (and vice versa).

A method disclosed in Patent Document 12 relates to a scenario where a UE can acquire a different IP address used for EPC access to a local breakout service. Based on which application is hosted, the UE determines which IP address is associated with the application. For example, the UE initiates VoIP (Voice over IP) hosted by a P-GW in a local breakout service. In such a case, the UE associates an IP address acquired for local breakout, with a VoIP session.

This conventional technique disclosed in Patent Document 12 is based on an assumption that the UE already knows where the application is hosted, and so is a reasonable method in the case where an application server is static. In the case where the application server (i.e. mobile terminal) is moving, however, information as to where the application is hosted is not necessarily accurate. Therefore, the assumption of the conventional technique that the UE has prior knowledge of where the application is hosted does not apply to the problem related to the present invention.

A method disclosed in Patent Document 13 is a method whereby a LMA detects that a communication route between two MNs can be optimized. The LMA accordingly instructs MAGs connected with the MNs to form and optimize a route therebetween. This conventional technique is based on an assumption that, in the case where each MN is connected to a different LMA, the LMA knows which IP address range is handled by the LMA. Therefore, the conventional technique disclosed in Patent Document 13 is usable in that the LMA creates a trigger, but it is also mentioned that practical realization may be impossible as each LMA is required to exchange information about the LMA. Particularly in a scenario where each mobile node subscriber is related to a different cellular operator, the solution by the conventional technique has little applicability.

A method disclosed in Patent Document 14 relates to a scenario where a MN has two active links (i.e. a foreign link using a care-of address and a home link using a home address) to a HA. The MN sends a message to the HA via each link, in order to test routing cost (i.e. time delay). Based on the routing cost in each link, the MN selects the lowest routing cost for communicating with the HA. Testing each of the plurality of links of the MN allows the MN to recognize the cost of each link and determine which link is optimal.

However, there is a possibility of a significant increase in network signaling load when the MN sends a packet via each link in order to check routing cost. On the other hand, one of the preferred embodiments of the present invention is intended to allow a terminal to determine which link is optimal, without a need to send a packet via each link in order to check routing cost. It is clear from the above description of the operations in the conventional techniques that the techniques disclosed in the conventional art all fail to enable a terminal to select an optimal communication route from a plurality of communication routes available in the terminal.

SUMMARY OF THE INVENTION

To solve the above-mentioned problems, the present invention has an object of solving the problems that occur in the case where a UE does not have sufficient information for selecting which interface is to be used in order to achieve efficient communication with a CN.

To solve the above-mentioned problems, the present invention has an object of at least improving the problems and the drawbacks in the conventional art described above. In particular, the present invention has an object of enabling a UE having a plurality of interfaces each of which uses a different mobility management mechanism, to select an appropriate interface and as a result communicate with a CN using an optimal route while maintaining advantages of mobility management. The present invention also has an object of enabling a UE having a plurality of addresses, to select an appropriate address and as a result communicate with a CN using an optimal route while maintaining advantages of mobility management. The present invention further has an object of enabling a terminal to select an optimal communication route from a plurality of communication routes available in the terminal, without a significant increase in signaling load in a network.

To achieve the stated objects, a communication system according to the present invention is a communication system comprising: a mobile terminal connectable to a network-based mobility management domain using a plurality of interfaces that each use a different access technology, and having a plurality of communication routes to a correspondent node with which the mobile terminal communicates; and a network node for performing location management of a terminal connected to the network-based mobility management domain, wherein the network node is configured to monitor a packet sent from the correspondent node to the mobile terminal and, in the case of detecting the packet sent from the correspondent node to the mobile terminal, determine whether or not the correspondent node is connected to the same network-based mobility management domain, and report a result of the determination to the mobile terminal, and wherein the mobile terminal is configured to select a communication route used for communicating with the correspondent node, based on the result of the determination.

According to this structure, a mobile terminal having a plurality of communication routes (a plurality of interfaces or a plurality of addresses) can select an appropriate communication route to communicate with a correspondent node.

Moreover, to achieve the stated objects, a mobile terminal according to the present invention is a mobile terminal connectable to a network-based mobility management domain in which a network node for performing location management of a terminal connected to the network-based mobility management domain is located, and having a plurality of communication routes to a correspondent node with which the mobile terminal communicates, the mobile terminal comprising: a reception unit configured to receive a result of determination of whether or not the correspondent node is connected to the same network-based mobility management domain, in the case where the network node monitors a packet sent from the correspondent node to the mobile terminal and detects the packet sent from the correspondent node to the mobile terminal; and a communication route selection unit configured to select a communication route used for communicating with the correspondent node, based on the result of the determination.

According to this structure, a mobile terminal having a plurality of communication routes (a plurality of interfaces or a plurality of addresses) can select an appropriate communication route to communicate with a correspondent node.

Moreover, to achieve the stated objects, a network node according to the present invention is a network node for performing location management of a terminal connected to a network-based mobility management domain, the network node comprising: a packet monitoring unit configured to, for a mobile terminal connectable to the network-based mobility management domain and having a plurality of communication routes to a correspondent node with which the mobile terminal communicates, monitor a packet sent from the correspondent node, with which the mobile terminal communicates, to the mobile terminal; a determination unit configured to determine whether or not the correspondent node is connected to the same network-based mobility management domain, in the case of detecting the packet sent from the correspondent node to the mobile terminal; and a reporting unit configured to report a result of the determination by the determination unit, to the mobile terminal.

According to this structure, a mobile terminal having a plurality of communication routes (a plurality of interfaces or a plurality of addresses) can select an appropriate communication route to communicate with a correspondent node.

Moreover, to achieve the stated objects, a base station apparatus according to the present invention is a base station apparatus for performing wireless connection with a mobile terminal, the base station apparatus comprising: a packet monitoring unit configured to, for a mobile terminal connected to the base station apparatus and having a plurality of communication routes to a correspondent node with which the mobile terminal communicates, monitor a packet sent from the correspondent node, with which the mobile terminal communicates, to the mobile terminal; a determination unit configured to determine whether or not the correspondent node is connected to the same base station apparatus, in the case of detecting the packet sent from the correspondent node to the mobile terminal; and a reporting unit configured to report a result of the determination by the determination unit, to the mobile terminal.

According to this structure, a mobile terminal having a plurality of communication routes (a plurality of interfaces or a plurality of addresses) can select an appropriate communication route to communicate with a correspondent node.

The present invention having the structures described above achieves the advantageous effect of enabling a UE having a plurality of interfaces each of which uses a different mobility management mechanism, to select an appropriate interface and as a result communicate with a CN using an optimal route while maintaining advantages of mobility management.

BRIEF DESCRIPTION OF THE DRAWINGS

FIG. 2A is a diagram showing a third example of a network structure and a packet flow in the conventional art.

FIG. 3D is a sequence chart showing a third example of a message flow in an embodiment of the present invention.

FIG. 10A is a sequence chart showing a fourth example of a message flow in an embodiment of the present invention.

FIG. 10B is a sequence chart showing a fifth example of a message flow in an embodiment of the present invention.

FIG. 11A is a sequence chart showing a sixth example of a message flow in an embodiment of the present invention.

FIG. 11B is a sequence chart showing a seventh example of a message flow in an embodiment of the present invention.

FIG. 19 is a sequence chart showing an example where a P-GW reports to a UE using RR signaling in an embodiment of the present invention.

DESCRIPTION OF EMBODIMENTS

The following describes embodiments of the present invention with reference to drawings.

In the present invention, a MN selects an ideal interface for communication with a CN, using not only information provided from a network entity but also another criterion for the selection process. The present invention is described below, by way of preferred embodiments of the present invention.

<Embodiment 1: Concept of the Present Invention in the Case where the CN is in the CMIPv6 Mode>

A scenario where the network entity assists the UE in specifying a proper interface to be used in the case where the CN exists in the same domain is described in Embodiment 1 of the present invention.

Figure 3A:
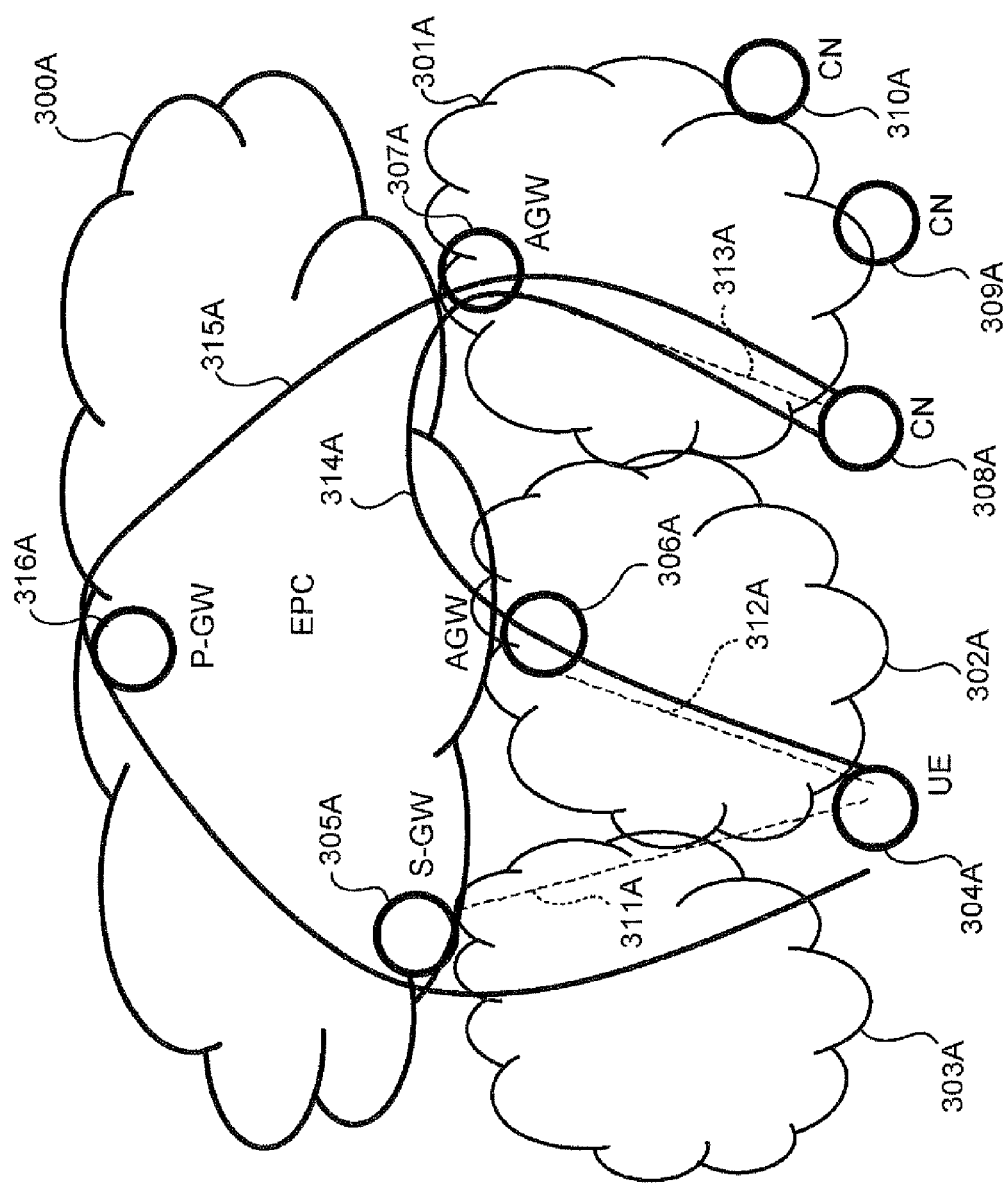
FIG. 3A is a diagram showing a first example of a network structure and a packet flow in an embodiment of the present invention.

The following describes Embodiment 1 of the present invention with reference to FIG. 3A. In FIG. 3A, a UE 304A has two interfaces. For example, the two interfaces of the UE 304A are a 3G LTE interface connected to an E-UTRAN (Evolved Universal Terrestrial Radio Access Network) 303A and a WiMAX interface connected to a WiMAX access network 302A.

The UE 304A is connected to a S-GW 305A via an access link 311A, and connected to an AGW 306A via a link 312A. Mobility of the 3G interface of the UE 304A is managed by the PMIPv6 mechanism, whereas mobility of the WiMAX interface of the UE 304A is managed by the CMIPv6 mechanism. The UE 304A exists in its home domain, a home network prefix (HNP) of PMIPv6 detected via the 3G interface is a MIPv6 home prefix, and a P-GW 316A is a HA of the UE 304A.

For example, the UE 304A communicates with three CNs 308A, 309A, and 310A. The CNs 308A, 309A, and 310A are each a node implementing MIPv6 or DSMIPv6, and capable of achieving optimized route communication through RR signaling with the UE 304A. The CNs 308A, 309A, and 310A are connected to a WiMAX access network 301A. The WiMAX access network 301A and the access networks to which the UE 304A is connected are all connected to the same EPC 300A. In an initial state, the P-GW 316A is a HA of each of the CNs 308A, 309A, and 310A. It may be assumed here that the UE 304A and the CNs 308A, 309A, and 310A belong to the same home domain (Home Public Land Mobile Network (HPLMN)) or use local breakout in a foreign domain (Visited Public Land Mobile Network (VPLMN)). The local breakout is disclosed in Non-patent Document 3.

The following describes an operation sequence according to the present invention and a method for realizing the present invention, through description of an operation in FIG. 3A. In FIG. 3A, suppose the CN 308A starts sending a data packet to the UE 304A first. In a stage before a RR process is executed, the CN 308A knows only a home address of the UE 304A. In the case of sending the data packet, a source address of the data packet is a home address of the CN 308A. Though the CN 308A may send a HoTI message as the first packet, it is assumed here that the first packet is a data packet.

In FIG. 3A, the data packet or data message is indicated by a message 315A. The message 315A is tunneled from the CN 308A to the P-GW 316A. Here, a source address of the tunnel packet is a care-of address of the CN 308A, and a destination address of the tunnel packet is an address of the P-GW 316A.

Having decapsulated the message 315A, the P-GW 316A references to a binding cache to check that a destination address of an internal packet is stored in a PMIPv6 binding and a source address of the internal packet is stored in a CMIPv6 binding. This enables the P-GW 316A to recognize that the peer nodes relating to the data flow are located in the same domain 300A. Alternatively, the P-GW 316A may recognize that the peer nodes relating to the data flow are located in the same domain 300A, on the ground that the message 315A reaches via an ingress interface of the P-GW 316A and is dispatched via the ingress interface of the P-GW 316A. Thus, it is important in the present invention that the P-GW 316A performs a process for specifying the location of the CN 308A.

After performing such detection, the P-GW 316A further tunnels the message 315A to the S-GW 305A, as a result of which the message 315A is sent to the 3G interface of the UE 304A. The P-GW 316A can perform this tunneling because it has a PMIPv6 binding for a HNP of the UE 304A.

The P-GW 316A is capable of embedding a mark or a trigger in a tunneling header when tunneling the message 315A, thereby reporting to the S-GW 305A that the CN 308A exists in the same domain 300A. There are a number of methods for passing such a mark or trigger. For instance, the P-GW 316A may send an explicit message (though described later, the term "explicit" in this description means to report by an independent message not associated with a data packet), or add the mark to a data packet. Other methods will be described later as other embodiments. A method of sending the mark using an existing message will be described later as another embodiment, too.

For example, in the case where the P-GW 316A embeds, in the tunneling header of the message 315A, the mark indicating that the CN 308A exists in the same domain 300A, the S-GW 305A, upon receiving the message 315A in which the mark is embedded, decapsulates the message 315A, and sends the message 315A to the UE 304A using a method specific to E-UTRAN. The S-GW 305A also passes a trigger to the UE 304A by a new message, in order to report the mark received from the P-GW 316A.

If the S-GW 305A knows a MAC (Media Access Control) address of every node on a path between the S-GW 305A and the UE 304A, the new message may be sent as a layer 2 (L2) message. Alternatively, the mark may be sent from the S-GW 305A to the UE 304A by a new layer 3 (L3) message.

Upon detecting the mark sent from the S-GW 305A, the UE 304A recognizes that the CN 308A exists in the same domain 300A, and determines to use the WiMAX interface for data communication with the CN 308A. In the case where the CN 308A exists in the same domain 300A and uses the MIPv6 mechanism, it is effective for the UE 304A to use the WiMAX interface whose mobility is managed by the MIPv6 mechanism.

Here, if the UE 304A has sufficient battery power and a network congestion state of the access network 302A has not reached a saturation level, the UE 304A selects a proper interface (the WiMAX interface in this example) based on information (i.e. the mark indicating that the CN 308A exists in the same domain 300A) provided from the network entity, without changing the determination. Though described later, the term "proper interface" in this description denotes an interface that can achieve route optimization in communication between the UE 304A and the ON 308A, or an interface that can achieve efficient mobility management by preventing excessive signaling message transmission/reception. The proper interface is also referred to as an appropriate interface or an ideal interface.

In the case where the UE 304A and the CN 308A perform bidirectional RR in order to attain an optimal path, a data communication path attained after the bidirectional RR according to the present invention is as indicated by a message 314A in FIG. 3A. In Embodiment 1 of the present invention, the UE 304A determines the ideal interface, and the CN 308A merely accepts the determination by the UE 304A as it is. It is assumed in Embodiment 1 that the CN 308A has flexibility in its mobility management mode, and is not particularly limited with regard to a QoS requirement about a flow. Hence, the CN 308A simply follows the determination made by its correspondent node (i.e. the UE 304A).

<Embodiment 2:Concept of the Present Invention in the Case where the CN is in the PMIPv6 Mode>

Embodiment 2 of the present invention is described below. Embodiment 2 of the present invention is described using the scenario shown in FIG. 3A, too, though a certain change is made to the mobility management mode of the CN 308A in Embodiment 1 of the present invention described above. In Embodiment 2 of the present invention, it is assumed that the CN 308A is in the PMIPv6 mode. All assumptions other than that the CN 308A uses the PMIPv6 mode are the same as those in Embodiment 1 of the present invention described above, and so their description is omitted here.

In Embodiment 2 of the present invention too, when the P-GW 316A reports the location of the CN 308A (i.e. that the CN 308A exists in the same domain 300A) to the UE 304A, the UE 304A starts the RR process. To attain the completely optimized path indicated by the message 314A in FIG. 3A, the CN 308A needs to operate in the MIPv6 mode. In Embodiment 2 of the present invention, however, it is assumed that the CN 308A is in the PMIPv6 mode.

In such a case, upon receiving a RR message from the UE 304A, the CN 308A can perform one of the following two operations. The first operation is that the CN 308A requests the AGW 307A to provide a prefix for configuring a care-of address. This allows the CN 308A to obtain the prefix and configure the care-of address, and as a result execute RR signaling. The second operation is that the ON 308A requests the network to switch the mobility mode to the CMIPv6 mode. The CN 308A can execute one of the first and second operations, in the case where the CN 308A is in the PMIPv6 mode.

Note that, when executing the RR mechanism, the UE 304A may embed a trigger or an option in a mobility header message for RR to request the CN 308A to perform an operation of configuring a care-of address or an operation of switching to the CMIPv6 mode, in order to attain an optimal routing path between the UE 304A and the CN 308A. As an alternative, the P-GW 316A may request the CN 308A to switch the mobility mode to CMIPv6.

<Embodiment 3: Concept of the Present Invention in the Case where the P-GW is not the Home Mobility Anchor of the CN>

Embodiment 3 of the present invention is described below. Embodiment 3 of the present invention is described using the scenario shown in FIG. 3A, too, though a certain change is made to the assumption about the home agent of the CN 308A in Embodiment 1 of the present invention described above. In Embodiment 3 of the present invention, it is assumed that the home agent of the is CN 308A is not the P-GW 316A. All assumptions other than that the home agent of the CN 308A is not the P-GW 316A are the same as those in Embodiment 1 of the present invention described above, and so their description is omitted here.

In Embodiment 3 of the present invention, the home agent of the CN 308A is not the P-GW 316A, and the CN 308A operates in the CMIPv6 mode. The CN 308A is about to send data to the UE 304A, and the RR mechanism is already executed for the UE 304A. Accordingly, the UE 304A has a binding indicating association between a HoA of the CN 308A and a care-of address of the CN 308A. The care-of address of the CN 308A is acquired from the AGW 307A.

A data packet from the CN 308A is transmitted through the path indicated by the message 315A. A source address of the data packet after RR is the care-of address of the CN 308A, and a destination address of the data packet after RR is the home address of the UE 304A. Therefore, the data packet sent from the CN 308A to the UE 304A is received via the ingress interface of the P-GW 316A and dispatched from the ingress interface of the P-GW 316A through tunneling to the S-GW 305A, as indicated by the message 315A.

Moreover, the mark indicating that the CN 308A exists in the same domain 300A is embedded in the message tunneled to the S-GW 305A, as described in Embodiment 1 of the present invention. It is obvious to a person skilled in the art that the UE 304A can register the CMIPv6 binding for the WiMAX interface with the P-GW 316A. In this case, both the PMIPv6 binding and the CMIPv6 binding exist in the P-GW 316A.

In the case where the CMIPv6 binding of the UE 304A is registered with the P-GW 316A, the above-mentioned mark may be directly sent to the UE 304A through tunneling to the UE 304A. Here, the P-GW 316A checks the destination address of the data packet sent from the CN 308A to the UE 304A. Since the data packet is destined for the home address of the UE 304A, the P-GW 316A may tunnel the data packet to a care-of address of the UE 304A. This tunnel has a header or a flag for reporting the mark indicating that the UE 304A and the CN 308A exist in the same domain 300A, and the UE 304A can recognize, from this mark, that the CN 308A exists in the same domain 300A.

In Embodiment 1 of the present invention described above, the P-GW 316A can reference to the binding for the CN 308A to recognize the location of the CN 308A. However, even when the P-GW 316A does not have the binding for the CN 308A, route optimization can be easily achieved between the UE 304A and the CN 308A as in Embodiment 3 of the present invention.

<Embodiment 4: Concept of the Present Invention in the Case where the CN is in a Mobility State>

Embodiment 4 of the present invention is described below. A method of handling mobility of the CN in the case where the CN is in the CMIPv6 mode and moves out of the domain in which the MN exists and then returns to the same domain is described in Embodiment 4 of the present invention.

Figure 3B:
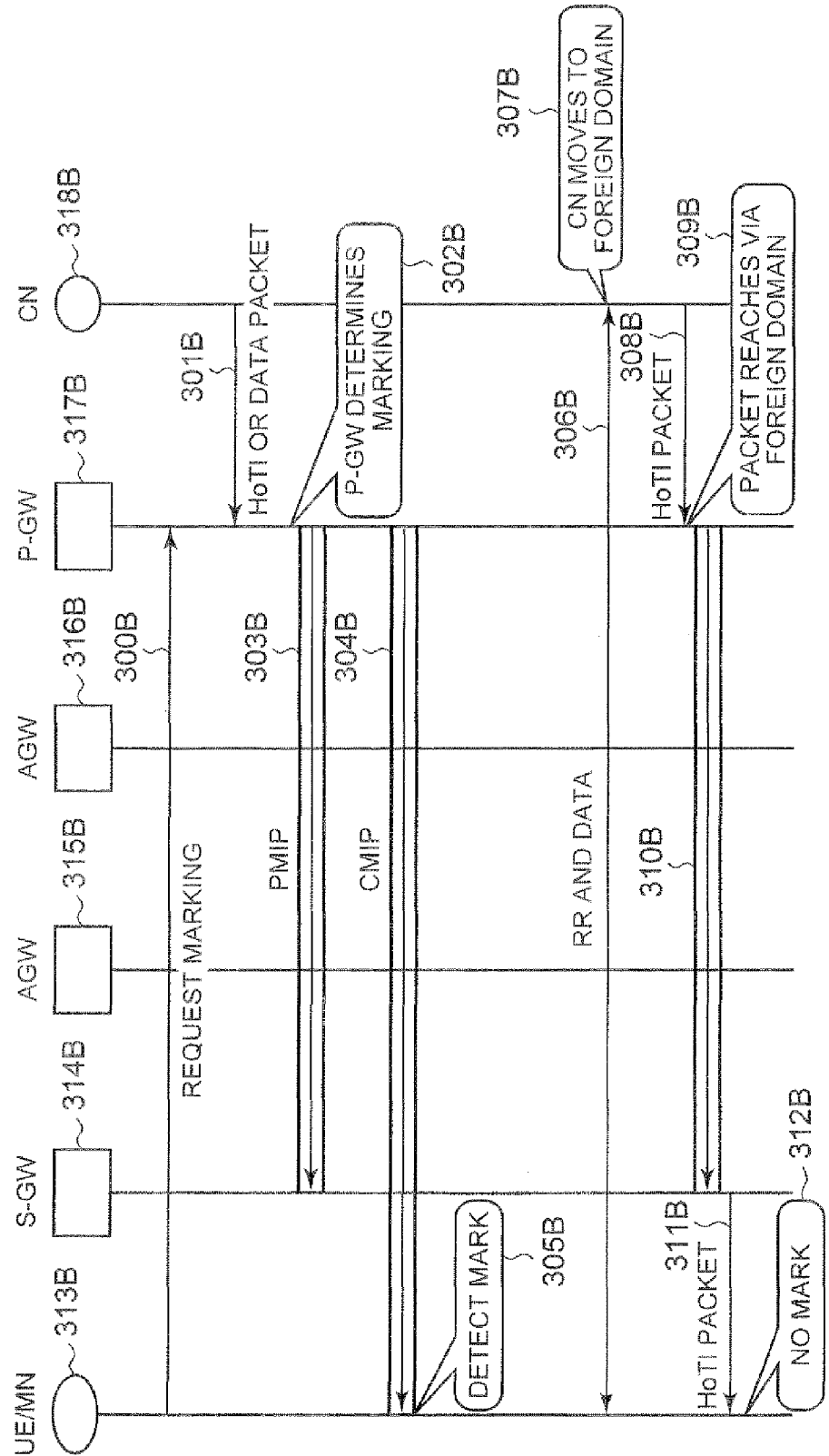
FIG. 3B is a sequence chart showing a first example of a message flow in an embodiment of the present invention.

The following describes Embodiment 4 of the present invention with reference to FIG. 3B. In FIG. 3B, too, a UE (UE/MN) 313B has two interfaces, and is connected to a S-GW 314B via a 3G interface and connected to an AGW 315B via a WiMAX interface. A P-GW 317B is a home agent of the UE 313B. Mobility of the 3G interface is managed by the PMIPv6 mechanism, whereas mobility of the WiMAX interface is managed by the CMIPv6 mechanism. The UE 313B is about to communicate with a CN 318B. In an initial state, the CN 318B exists in the same domain as the UE 313B, and uses the CMIPv6 mechanism.

The UE 313B sends an explicit request message 300B to the P-GW 317B, to request the P-GW 317B to perform an operation for the UE 313B (an operation for enabling the UE 313B to perform better data communication). The request message 300B is used by the UE 313B to request the P-GW 317B to monitor a packet from every CN destined for its home address (MN.HoA/HoA). The request message 300B is also used by the UE 313B to request the P-GW 317B to, for example in the case where the packet reaches from an internal domain (i.e. the same domain in which the UE 313B exists), mark the packet destined for MN.HoA.

Here, the UE 313B may provide a care-of address of the WiMAX interface and an address of every CN, but it is more favorable to provide the HoA is of the UE 313B. In the case where the UE 313B provides the address of every CN, higher band consumption is required for the message 300B, and also larger storage is required for these CN addresses in the P-GW 317B. In the case where the UE 313B provides the care-of address of the WiMAX interface, the P-GW 317B cannot specify the location of the CN 318B until the care-of address of the UE 313B is reported to the CN 318B. Besides, when the care-of address of the UE 313B is not reported to the CN 318B, the P-GW 317B cannot specify the correct location of the CN 318B (i.e. whether the CN 318B exists in the same domain or in a different foreign domain).

It is assumed that a data packet from the CN 318B is destined for the home address of the UE 313B first. It is also assumed that, after the UE 313B sends the message 300B, the CN 318B sends a HoTI or data packet 301B to the UE 313B. This HoTI or data packet is received (intercepted) by the P-GW 317B. The HoTI or data packet 301B is tunneled to the S-GW 314B as indicated by a tunneling message 303B, or directly sent to the UE 313B through tunneling as indicated by a message 304B, as in Embodiment 1 of the present invention.

The P-GW 317B performs a CN location detection process 302B on the packet sent from the CN 318B to the UE 313B. Since the data packet from the CN 318B reaches via the ingress interface, the P-GW 317B inserts the mark indicating that the CN 318B exists in the same domain, in the tunnel indicated by the message 303B or the tunnel indicated by the message 304B. Upon receiving a report message of the mark extracted from the message 303B by the S-GW 314B or receiving the message 304B, the UE 313B performs a detection process 305B of detecting, based on the received mark, that the CN 318B is connected to the same domain. As a result of this detection process 305B, the WiMAX interface is selected for communicating with the CN 318B.

The UE 313 and the CN 318B then execute bidirectional RR, for optimized communication through an optimized route. After a RR signaling exchange 306B, a data packet 306B exchanged between the UE 313B and the CN 318B is transmitted without passing through the P-GW 317B. Note that, in the case where a HoTI message is not destined for the HoA of the UE 313B or a source address of the HoTI message is not set to the HoA of the CN 318B, even the HoTI message is transmitted without passing through the P-GW 317B.

Next, suppose the CN 318B makes a movement 307B of moving out of the domain to another foreign domain. In the case where the CN 318 moves to the foreign domain, the CN 318B needs to newly send a HoTI message 308B to the UE 313B. A destination address of the HoTI message 308B is the care-of address of the UE 313B, and the P-GW 317E receives the HoTI message 308B via an egress interface.

The P-GW 317B can easily specify a HoA associated with the destination address (i.e. the care-of address of the UE 313B), by checking a binding cache entry of the binding (CMIPv6 binding) for the WiMAX interface of the UE 313B. After specifying the HoA of the UE 313B (or before or at the same time as specifying the HoA of the UE 313B), the P-GW 317B executes a comparison process 309B, to specify that the packet is a monitoring target packet and also the packet reaches from the foreign domain.

The HoTI message 308B is destined for the WiMAX interface, so that the P-GW 317B needs to tunnel the HoTI packet 308B to the S-GW 314B. Hence, the HoTI packet is tunneled to the S-GW 314B as indicated by a tunneling message 310B, but the mark indicating that the CN 318B exists in the same domain is not inserted in this tunnel. After decapsulating the tunneling message 310B, the S-GW 311B forwards a HoTI message 311B to the UE 313B.

The UE 313B acquires the HoTI packet from the CN 318B via the 3G interface, but does not receive the mark information about this HoTI packet from the S-GW 314B. This enables the UE 313B to detect that the CN 318B moves to another domain (foreign domain). This being so, the UE 313B determines to use the 3G interface, in order to achieve optimized routing and efficient mobility management. As mentioned earlier, in the case where the CN 318B exists in the foreign domain and also is in the CMIPv6 mode, an ideal path can be attained by using the 3G interface.

In the case where the HoTI message 308B is tunneled to the S-GW 314, the S-GW 314B may dispatch the packet to the UE 313B based on a signed token (token guaranteeing that both the HoA and the CoA for the WiMAX interface are present) provided from the P-GW 317B, or the UE 313B may embed the binding of the HoA and the CoA and register it with the S-GW 314B. In the case where the HoTI message 308B is tunneled to the UE 313B by directly using the CMIPv6 binding and there is no mark in this packet, too, the UE 313B can easily recognize that the CN 318B moves to another foreign domain.

In the present invention, there is an advantageous that the UE 313B does not need to constantly make a request (an inquiry about the location of the CN 318B) to the P-GW 317B. That is, the P-GW 317B can easily detect the location of the CN 318B merely by using the initial parameter provided in the message 300B, and send an appropriate mark or trigger to the UE 313B to thereby allow the UE 313B to select an optimal interface.

Here, suppose the CN 318B which has moved out of the same domain (the domain in which the UE 313B exists) returns to the domain. In such a case, an optimized route can be established again, when the UE 313B recognizes this movement or is reported about this movement.

When the CN 318B exists in the foreign domain, the UE 313B uses the 3G interface. When the CN 318B returns to the same domain, the P-GW 317B detects that the CN 318B returns to the same domain (e.g. by detecting a HoTI message sent from the CN 318B), embeds the mark indicating that the CN 318B exists in the same domain, and reports to the UE 313B.

Having returned to the home domain (the same domain in this example), the CN 318B sends the HoTI message to the UE 313B. This HoTI message is received via the ingress interface of the P-GW 317B, and the P-GW 317B detects that the CN 318B returns to the home domain, and embeds the mark and reports it to the UE 313B using in-band signaling or out-of-band signaling. Upon detecting the mark, the UE 313B switches the communication with the CN 318B to the WiMAX interface, and employs CMIPv6 mobility management, thereby achieving RO with the CN 318B. Note that, though the network entity may provide information about an appropriate interface (which type of interface is appropriate), eventual determination as to which interface is used is made by the UE. The same determination is carried out when the CN 318B uses PMIPv6 and moves from the home domain to another domain. The home domain is the HPLMN of the UE 313B and the CN 318B. When the CN 318B exists in the same domain as the UE 313B, the embedded mark is used to report to the UE 313B that the CN 318B exists in the same domain as the UE 313B. Through the use of a domain or mobility management mode to which the CN 318B belongs, the UE 313B can use an appropriate interface or mobility management mode.

Though the case where the mark is inserted when the CN exists in the same domain and is not inserted when the CN does not exist in the same domain is described here, this may be reversed (i.e. the mark is inserted when the CN exists in the foreign domain and is not inserted when the CN does not exist in the foreign domain), or marks of different meanings may be inserted (i.e. a mark indicating that the CN exists in the same domain is inserted when the CN exists in the same domain, and a mark indicating that the CN exists in the foreign domain is inserted when the CN exists in the foreign domain). An increase in the number of types of marks causes an increase in the amount of information reported, but more detailed states (e.g. a state where inter-MAG RO is present (described later)) can individually be expressed.

<Embodiment 5: Interface Selection Process of the UE in a Transient Condition>

An interface selection process performed by the UE in a process (hereafter referred to as a first transient process) in the case where the UE determines to start communication with a new CN in addition to an existing CN or in a process (hereafter referred to as a second transient process) in the case where the UE determines to start a new session with an existing CN in a situation where the UE has existing sessions with a plurality of CNs is described in Embodiment 5 of the present invention.

Figure 3C:
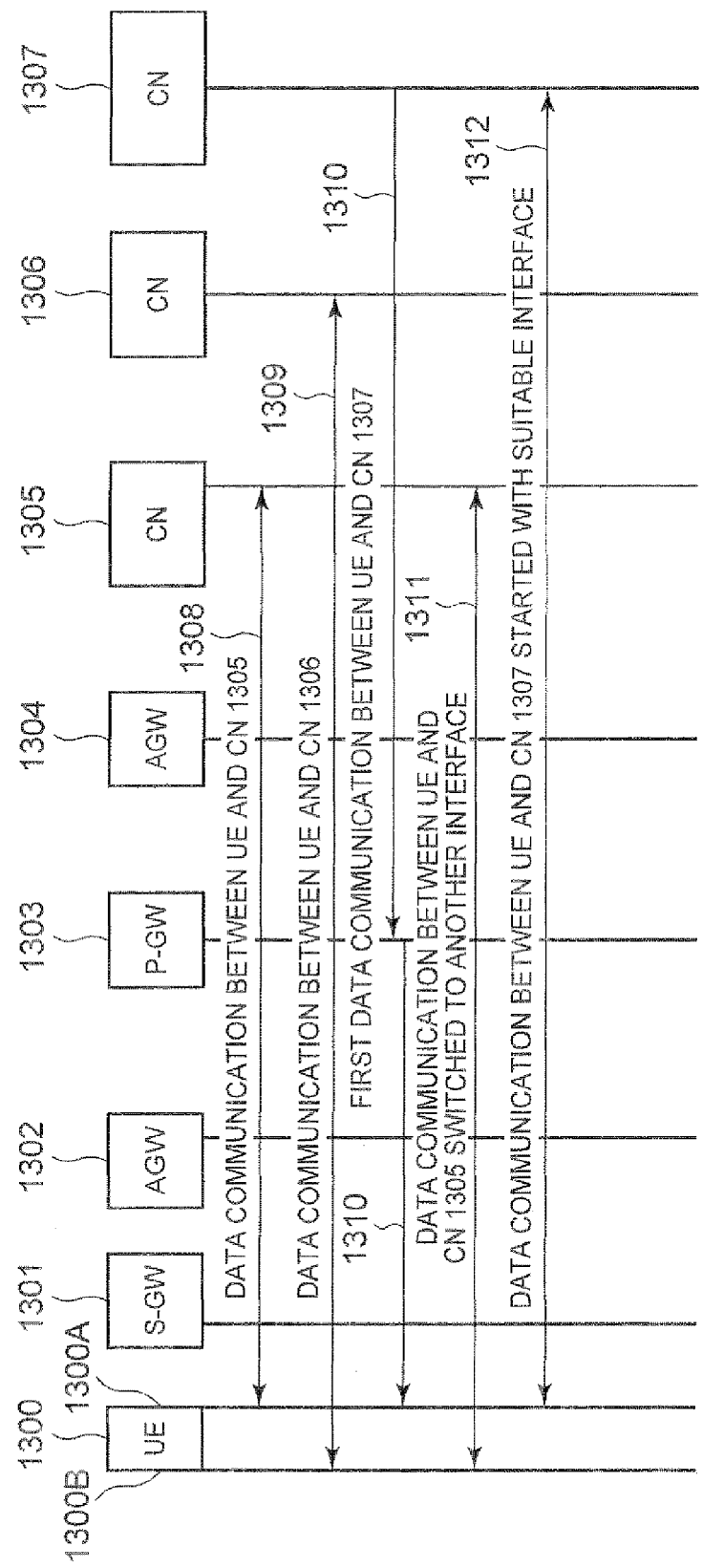
FIG. 3C is a sequence chart showing a second example of a message flow in an embodiment of the present invention.

The following describes a method employed by the UE when selecting an interface for communication, with reference to message sequence charts shown in FIGS. 3C and 3D. The message sequence chart shown in FIG. 3C represents the first transient process, while the message sequence chart shown in FIG. 3D represents the second transient process.

In Embodiment 5 of the present invention, the UE can use various criteria in the determination process for selecting an ideal interface. In FIGS. 3C and 3D, a UE 1300 and a UE 1313 can use, for example, information provided from a network, information or a policy about load balancing, flow characteristics, a flow QoS requirement, and the like as selection criteria, when selecting an interface for a session with a CN. The case where the UE 1300 or 1313 places importance on load balancing in the selection process (interface determination process) can include an instance where the UE 1300 or 1313 places importance only on load balancing (or places importance only on power), an instance where the UE 1300 or 1313 places importance on both power and load balancing, and so on. Though Embodiment 5 of the present invention describes the selection process in the case where the UE 1300 or 1313 takes only a load balancing-related problem into consideration, the same applies to the case of taking a power-related problem into consideration or the case of using other various criteria in interface selection.

The first transient process is described first, with reference to FIG. 3C. The UE 1300 in FIG. 3C has two interfaces such as a LTE interface 1300A and a WiMAX interface 1300B. Mobility of the LTE interface 1300A of the UE 1300 is managed by the PMIPv6 mechanism, whereas mobility of the WiMAX interface 1300B of the UE 1300 is managed by the CMIPv6 mechanism. The LTE interface 1300A of the UE 1300 is connected to a S-GW 1301, and the WiMAX interface 1300B of the UE 1300 is connected to an AGW 1302.

In an initial state, the UE 1300 communicates with a CN 1305 and a CN 1306, and then starts communicating with a CN 1307. The CN 1305 is located in another management domain different from a domain in which the UE 1300 is located, while the CN 1306 is located in the same management domain as the UE 1300.

Since the CN 1305 is located in another management domain, a P-GW 1303 located in the same management domain as the UE 1300 does not embed the mark in the first packet from the CN 1305, based on the operation described in the above embodiment. The UE 1300 accordingly uses the interface (the LTE interface 1300A) managed by PMIPv6, to communicate with the CN 1305. Here, the UE 1300 determines the appropriate interface using only network information (information provided from the network). A data message in the case of communicating with the CN 1305 is a message 1308.

Meanwhile, the P-GW 1303 embeds the mark in the first data packet from the CN 1306 to report that the CN 1306 exists in the same domain, based on the operation described in the above embodiment. The UE 1300 accordingly uses the WiMAX interface 1300B to communicate with the CN 1306. A data message in the case of communicating with the CN 1306 is a message 1309.

Here, the new CN 1307 is about to start communication with the UE 1300, where the CN 1307 is located in a foreign domain different from the domain in which the UE 1300 is located. The first data packet sent from the CN 1307 to the UE 1300 is a message 1310. The message 1310 is received (intercepted) by the P-GW 1303, as shown in FIG. 3C. Since the data packet from the CN 1307 reaches the P-GW 1303 from the foreign domain, the P-GW 1303 tunnels the message 1310 to the S-GW 1301 without embedding the mark, so as to be delivered to the UE 1300. The UE 1300 does not detect the mark for the data packet, and thus recognizes that the CN 1307 is located in the foreign domain.

Having recognized where the CN 1307 is located (i.e. the foreign domain), the UE 1300 starts an interface determination process. Given that the flows of the UE 1300 are already distributed between the interfaces, the UE 300 takes load balancing into consideration in the interface determination process, thereby preventing an access overload in a specific interface.

For example, in the case where the UE 1300 determines to use the LTE interface 1300A to communicate with the CN 1307, the number of flows via WiMAX is one whereas the number of flows via LTE access is two, so that a load via LTE access increases. In such a case, the UE 1300 may avoid an overload of LTE access based on, for instance, access network state information and a UE policy.

If the UE 1300 receives the flow with the CN 1307 via the LTE interface 1300A, the UE 1300 may, for example, determine that an existing flow needs to be switched from LTE access to WiMAX access. For instance, in the case where the flow with the CN 1305 does not have a large average bandwidth and is likely to withstand a delay that can be caused by handoff, the UE 1300 may determine that the flow with the CN 1305 can be switched to the WiMAX interface 1300B, based on a bandwidth, a QoS requirement, and the like. Here, even if the flow with the CN 1305 is switched to the WiMAX interface 1300B, no overload of WiMAX access occurs. Hence, the flow can be easily switched to the WiMAX interface 1300B. Note that there is a possibility according to the CMIPv6 mechanism that a significant handoff delay is caused by RO signaling as a result of switching the flow.

In the case where the data flow with the CN 1305 is switched to via WiMAX access, the resulting data flow with the CN 1305 is as indicated by a message 1311. Having switched the existing flow with the CN 1305, the UE 1300 determines to receive the flow with the CN 1307 via the ideal interface (the LTE interface 1300A). The resulting data flow with the CN 1307 is as indicated by a message 1312. As described above, the UE 1300 employs a method of determining an interface for communicating with a CN based on various conditions such as load balancing.

The second transient process is described next, with reference to FIG. 3D. The UE 1313 in FIG. 3D has two interfaces such as a LTE interface 1313A and a WiMAX interface 1313B. The LTE interface 1313A of the UE 1300 is connected to a S-GW 1314, and mobility of the LTE interface 1313A of the UE 1300 is managed by the PMIPv6 mechanism. The WiMAX interface 1313B of the UE 1300 is connected to an AGW 1315, and mobility of the WiMAX interface 1313B of the UE 1300 is managed by the CMIPv6 mechanism.

The UE 1313 communicates with three CNs 1318, 1319, and 1320. In an initial state, the UE 1313 communicates with the CNs 1319 and 1320. The CNs 1319 and 1320 exist in the same domain as the UE 1313, and the UE 1313 communicates with the CNs 1319 and 1320 using the WiMAX interface 1313B. Data messages indicating the communication between the UE 1313 and the CNs 1319 and 1320 are messages 1321 and 1322.

Here, consider the case where the UE 1313 starts communicating with the new CN 1318. The CN 1318 is located in the same domain as the UE 1313, too. If some kind of congestion occurs in the WiMAX access network, the UE 1313 determines to use the LTE interface 1313A for the flow with the CN 1318. This determination by the UE 1313 is made in consideration of a QoS level for the flow sent from the CN 1318. That is, even when RO is necessary for the flow with the CN 1318, the flow may be determined to be able to tolerate detriments associated with RO, and only load balancing may be taken into consideration in interface selection in relation to a QoS requirement. A data message with the CN 1318 in the case of using the LTE interface 1313A is a message 1323.

Suppose the UE 1313 then starts a new flow (new session) with the CN 1320. In the case where this new flow is sent to a home address of the UE 1313, the flow reaches via a P-GW 1316. The first communication of this new flow is indicated by messages 1324 and 1325.

It is assumed here that a QoS level required for the new flow from the CN 1320 is lower than a QoS level required for the flow with the CN 1318. To maintain load balancing, the UE 1313 can, for example, determine to switch the flow with the CN 1318 to the WiMAX interface 1313B (which is a suitable interface for the flow with the CN 1318) and receive the new flow from the CN 1320 via the LTE interface 1313A.

The LTE interface 1313A is not a suitable interface for the new flow from the CN 1320. However, the UE 1313 may make this determination in consideration of load balancing, a QoS level difference between flows, and the like. Though not mentioned in this description, the UE 1313 may perform QoS level adjustment for these flows. When the flow with the CN 1318 is switched to the WiMAX interface 1313B, the resulting data message is a message 1326. Meanwhile, a data message of the new flow with the CN 1320 is sent via the LTE interface 1313A, as indicated by a message 1327.

In the case where, instead of simply selecting an interface which is suitable based on a network connection state, the UE 1313 selects an interface based on its own consideration (i.e. selects an interface which is suitable from a viewpoint of the UE 1313), the selected interface is not necessarily an interface which is suitable from a viewpoint of the CN 1320 with which the UE 1313 communicates. When this occurs, there is a possibility that the CN 1320 changes the interface to be used (provided that the CN 1320 is capable of using a plurality of interfaces), or requests the UE 1313 to change the interface to be used. Since such an operation is not always efficient, the UE 1313 may desirably report the determination result to the CN 1320 (a detailed example will be described later).

<Embodiment 6: UE Operation>

A method employed for selecting an ideal interface in the case where the UE communicates with multiple CNs is described in Embodiment 6 of the present invention.

A main feature of an operation of the UE according to the present invention is that the UE selects an ideal interface for communication with the CN, not only by using information received from a network entity but also by performing an independent determination process.

The ideal interface mentioned here achieves route optimization and efficient mobility management, without a decrease in load balancing level between access networks to which the UE is connected or a decrease in quality of power use in the UE.

The assumptions used in Embodiment 1 of the present invention described above are also applied to Embodiment 6 of the present invention. Examples of an additional criterion for use of an ideal interface by the UE include a power state of the UE such as battery power consumption, a congestion state of an access network to which the UE is connected, and a QoS requirement of a flow with a CN.

Suppose a delay and jitter need to be extremely low in a flow 1 belonging to a CN 1 as in VoIP, whilst a certain amount of delay is tolerable but jitter is not tolerable in another flow 2 belonging to a CN 2 as in non-interactive video on demand. In such a case, the UE does not want to sacrifice route optimization of the flow with the CN 1, but may be able to sacrifice route optimization of the flow 2 to some extent.

In another example, in the case where the network entity reports to the UE that the UE has a low power state and also the UE is to use the CMIPv6 interface to communicate with the CN, the UE may not follow the instruction from the network if there is no strict requirement for the flow with the CN, in order to save power consumption due to additional signaling or CMIPv6-related signaling (e.g. a flow of non-interactive video on demand can tolerate a certain amount of delay).

In yet another example, in the case where the CN exists in the internal domain and the UE presumes from the mark embedded by the network entity that the 3G interface is preferably used, the UE may select the WiMAX interface based on a traffic state of the 3G access network and execute CMIPv6 signaling. This determination by the UE is made, for example, when information indicating that the 3G access network is congested is provided and also there is no strict requirement for the flow with the CN (e.g. the flow cannot tolerate a delay but can tolerate a certain amount of jitter). In such a situation, the UE selects an interface different from an interface selected simply based on the information provided from the network, in order to achieve better load balancing.

There is also an instance where the UE takes not only load balancing but also a power state into consideration when determining an ideal interface. In such an instance of using a plurality of parameters when selecting the ideal interface, the parameters for selecting the ideal interface may be weighted. In the case where the UE holds information about a CN requirement such as which access medium is desirable or whether or not a flow with a CN requires RO, the UE needs to prioritize each CN and appropriately perform interface assignment to each CN.

For example, if the UE communicates with six CNs where the UE simply desires to achieve RO and efficient mobility management, the network determines that three CNs are to communicate via the WiMAX interface and the remaining three CNs are to communicate via the 3G interface. Here, in the case where the UE determines that its power state is low (low usable power), the UE may need to switch one CN to the PMIPv6 mechanism to reduce signaling via WiMAX.

In order to select which of the three CNs determined to communicate via the WiMAX interface is to be switched to the 3G interface, the UE needs to check a QoS requirement for the flow of each CN that uses the WiMAX interface. The UE checks the three flows that use the WiMAX interface, to determine which CN has a flow for which a handoff delay is critical. Here, if the UE is capable of prioritizing the flow of each CN, the UE only needs to switch a flow without a strict requirement to the 3G interface or the interface using the PMIPv6 mobility management mechanism. Thus, CN-related interface selection may be performed based on various conditions (e.g. network information, a UE power state, a load balancing state, and another CN communicating with the UE).

Figure 4:
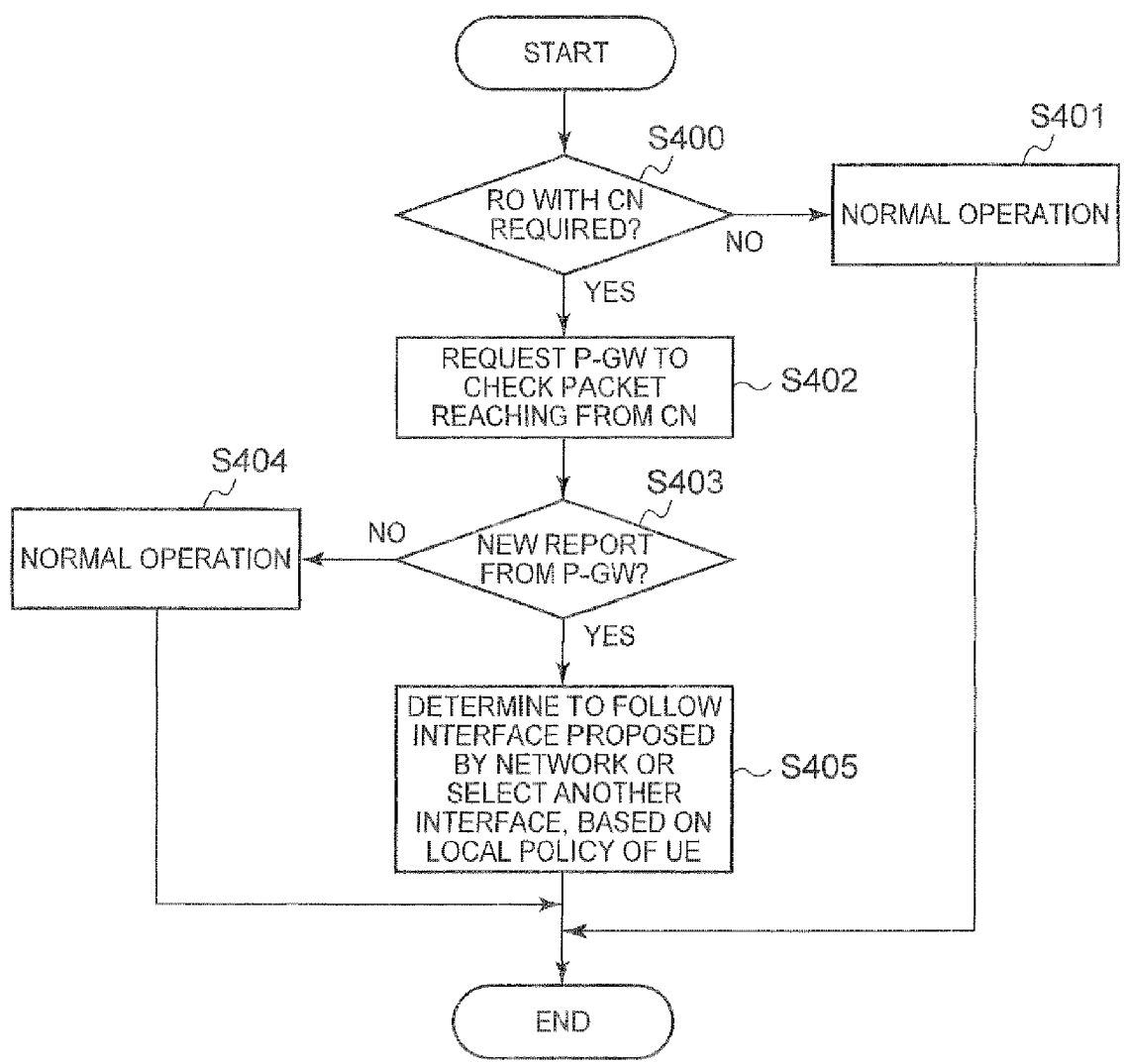
FIG. 4 is a flowchart showing a first example of a process of a UE in an embodiment of the present invention.

The following describes an example of the operation of the UE, with reference to a flowchart shown in FIG. 4. In first step S400, the UE determines whether or not the CN communicating with the UE requires RO. For example, a QoS requirement is referenced to in this determination.

In the case of determining in step S400 that the CN requires RO, the UE goes to below-mentioned step S402.

In the case of determining in step S400 that the CN does not require RO, a normal operation is executed in step S401. The normal operation in step S401 indicates that the UE takes no consideration of an interface appropriate for RO.

In step S402, the UE inserts a home address in the first request message and sends the request message to the P-GW, to request the P-GW to detect (monitor) all CNs. This detection by the P-GW means to specify via which interface a packet from a CN reaches the P-GW. That is, the P-GW specifies whether the packet from the CN reaches via an ingress interface or an egress interface. In the case where the packet from the CN reaches via the ingress interface, the CN exists in a foreign domain. In the case where the packet from the CN reaches via the egress interface, the CN exists in the same domain as the UE. Note that the UE may provide a HoA (or a CoA) or an address of the CN in the detection request in above-mentioned step S402.

After step S402, the UE performs a control process in step S403. In step S403, the UE checks whether or not a new report (e.g. a report that the CN exists in the same domain) is received from the P-GW. This report may be provided in various forms, which will be exemplified later. Important information as to whether to use the PMIPv6 mode or the CMIPv6 mode to achieve RO with the CN is provided by this report.

In the case where the new report is not received from the P-GW in step S403, the UE performs a normal operation such as processing a standard signaling message from the P-GW, in step S404.

In the case where the new report is received in step S403, on the other hand, the UE performs step S405. Several detailed methods described below can be employed in step S405. In step S405, the UE acquires information about an appropriate interface for communicating with the CN, and also performs a process of determining an appropriate interface by applying a local policy in the UE.

The several detailed methods that can be employed in step S405 are described below, though the methods that can be employed in step S405 are not limited to the following several methods.

In step S405, for instance, the UE may classify a CN that requires RO, based on an interface specified (designated) by the network. When, for example, the network reports to the UE that the 3G interface is appropriate, the UE increases a counter set for the 3G interface, by at least one. After such classification, the UE attempts to specify whether or not load balancing between access networks is affected by the information from the network about the ideal interface. In the case where load balancing is affected, the UE may need to select an interface different from the interface proposed from the network.

Though the UE tries to follow the information from the network about the ideal interface while applying various policies, if it is impossible to follow the information from the network, the UE does not select the interface specified by the network.

In the case where all CNs that require RO have very high QoS requirements, the UE may not be able to select an interface different from the interface specified by the network. In such a case, if there is any CN (e.g. a legacy CN) that does not require RO, the UE adjusts a load balancing condition using the CN not requiring RO so that the interface specified by the network can be selected for each CN requiring RO. When there is no legacy CN or CN not requiring RO, the UE may select an interface different from the interface specified by the network.

In the case where there is no legacy CN or CN not requiring RO and also each CN requiring RO has a different QoS requirement, the UE needs to select the interface specified by the network, by switching a CN not requiring high QoS to another interface.

As described above, in the case where the UE determines that a load balancing condition is more important and so a CN cannot be switched to another interface, it is possible for the UE to select an interface different from an interface proposed by the network. After taking the load balancing-related problem into consideration in this way, the UE further executes an additional check. For example, the power state of the UE is evaluated.

The UE checks whether or not the power state of the UE is affected by the determination made as a result of evaluating the load balancing problem. If the power state of the UE is not affected, then the currently selected interface (i.e. the interface selected in consideration of load balancing and the information specified by the network) is put to use.

If the power state of the UE is affected, on the other hand, the UE attempts to switch one or more CNs to the 3G interface while using the CMIPv6 interface for those specified by the network. In the case where such interface switching is impossible, the UE selects an interface so as to satisfy the power problem. Note that, in the case of taking both the power state and the load balancing into consideration, the corresponding processes (parameters) may be weighted.

<Embodiment 7: Operation and Advantageous Effect of the Present Invention in the Case where there is Inter-MAG RO>

An operation and an advantageous effect of the present invention in the case where there is inter-MAG RO and an operation and an advantageous effect of the present invention in the case where a CN has rigid characteristics (i.e. characteristics that cannot be flexibly changed) are described in Embodiment 7 of the present invention.

Figure 5A:
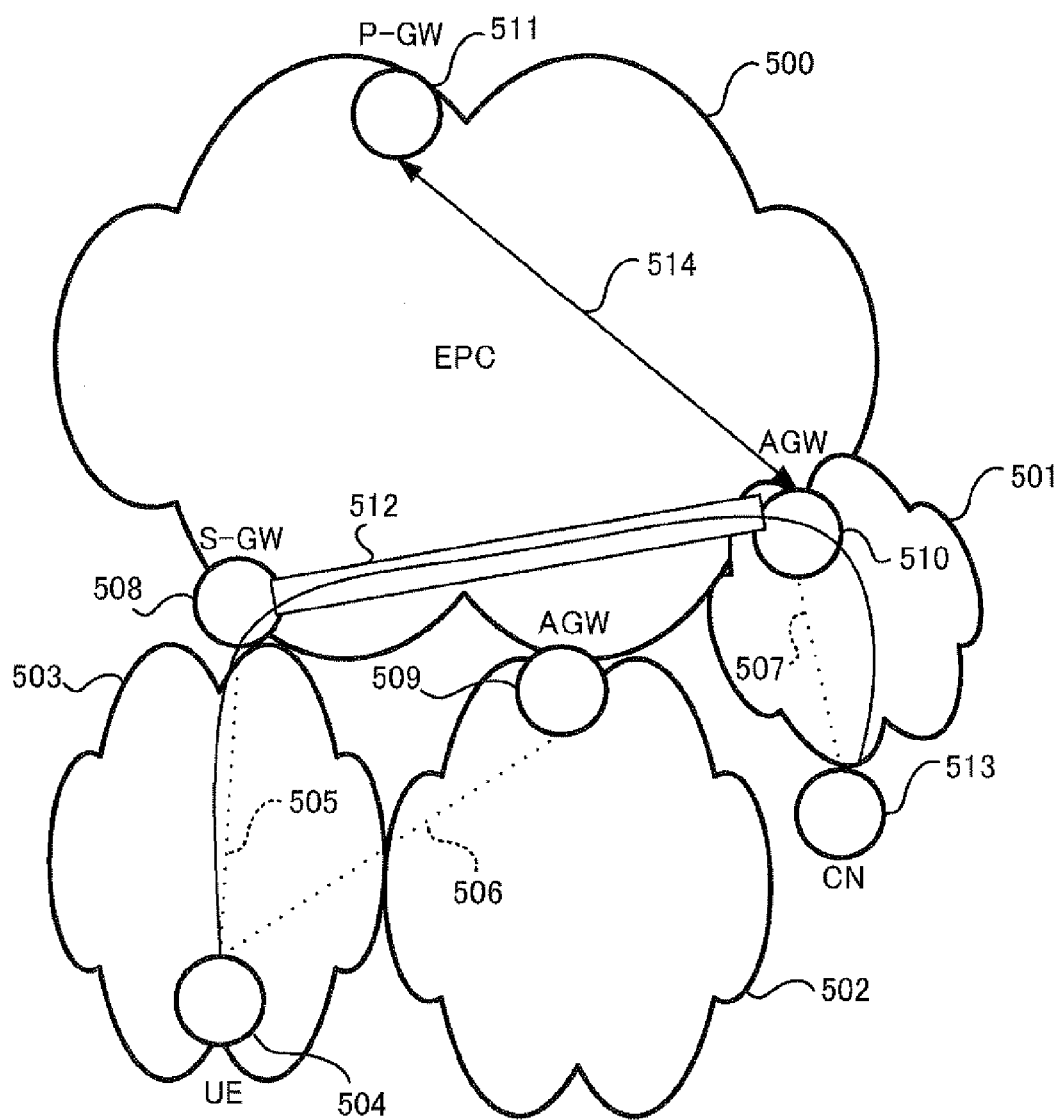
FIG. 5A is a diagram showing a second example of a network structure and a packet flow in an embodiment of the present invention.
Figure 5B:
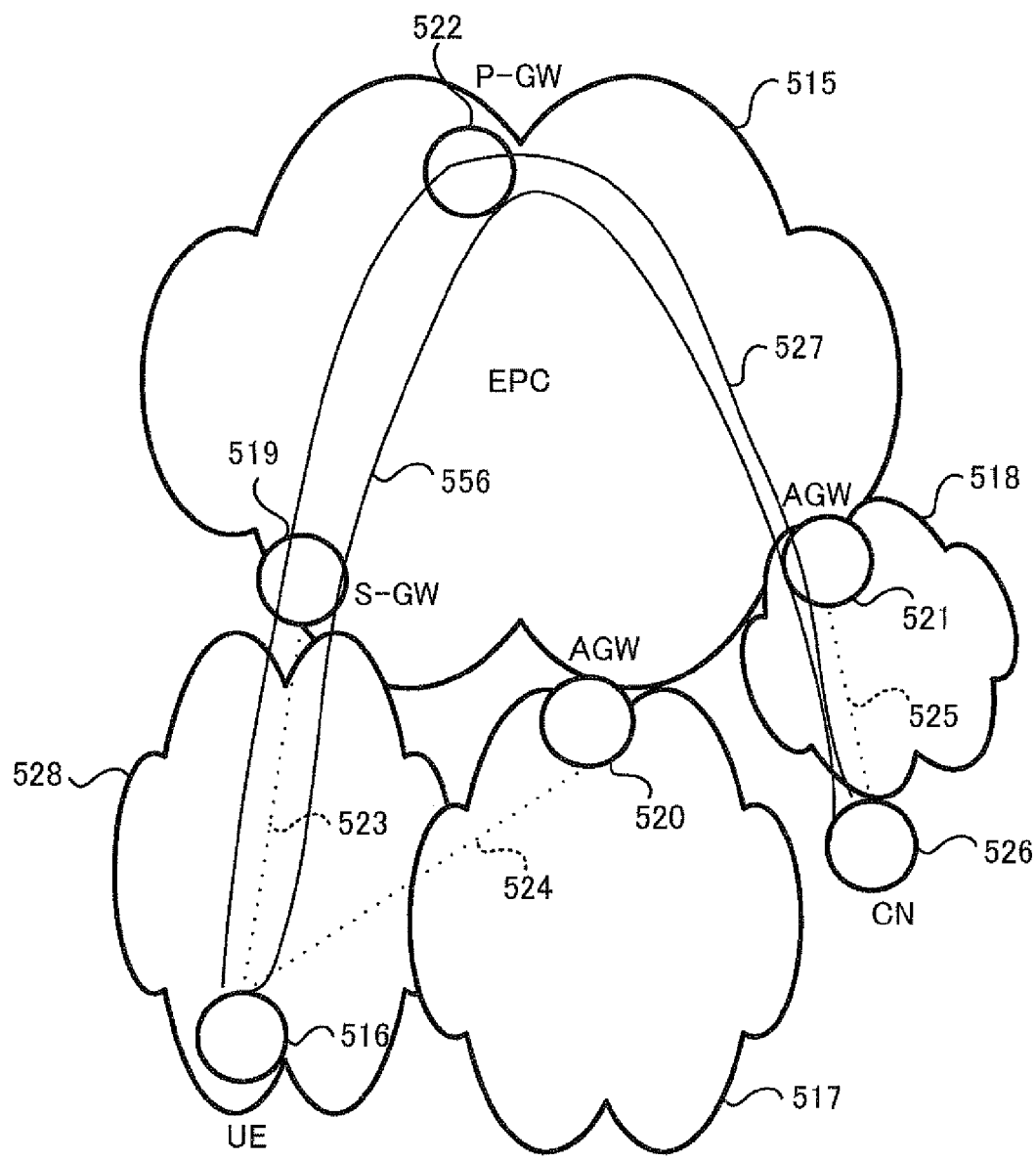
FIG. 5B is a diagram showing a third example of a network structure and a packet flow in an embodiment of the present invention.

The following describes Embodiment 7 of the present invention with reference to FIG. 5A. FIG. 5A shows an operation in the case where there is inter-MAG RO, while FIG. 5B shows an operation in the case where a CN has a rigid mobility management mode that is unchangeable.

FIG. 5A is described first. In FIG. 5A, a UE 504 has two interfaces such as a 3G interface and a WiMAX interface, which are connected to an EPC 500 respectively through access networks 503 and 502. Assumptions for the UE 504 are the same as those described in Embodiment 1 of the present invention, and so their description is omitted. Basically, the UE 504 uses the PMIPv6 mechanism via the 3G interface, and the CMIPv6 mechanism via the WiMAX interface.

A P-GW 511 is a home agent of the UE 504, and a domain 500 is a home domain of the UE 504. The UE 504 performs data communication with a CN 513. The CN 513 uses the PMIPv6 mechanism, and a home domain of the CN 513 may be the domain 500 or another domain. Moreover, there is inter-MAC RO (e.g. RO between a S-GW 508 and an AGW 510) in the domain 500. Signaling 514 indicates that, for example, inter-MAG RO can be established by the P-GW 511. That is, a query as indicated by the signaling 514 is used to specify between which MAGs a tunnel 512 needs to be set up. In the case where the CN 513 belongs to another home domain, the P-GW 511 needs to specify the AGW 510 (e.g. a MAG) through interaction with another P-GW. Inter-MAG RO can also be established without involving the P-GW 511, by use of RR.

It is assumed here that, before the inter-MAG tunnel 512 is set up, a data packet is sent via the P-GW 511. In the case where the CN 513 sends the first data packet to the UE 504, the data packet reaches the UE 504 via an ingress interface of the P-GW 511. In this case, the P-GW 511 knows that there is inter-MAG RO (assuming that the P-GW 511 assists in establishing inter-MAG RO), and does not mark the tunnel packet. Since the data packet is not marked, the UE 504 uses the 3G interface to communicate with the CN 513, according to the operation in the present invention. Note that the 3G interface is an ideal interface when there is inter-MAG RO.

In the case where the P-GW 511 does not assist in inter-MAG RO, on the other hand, there is a possibility that the first data packet is transmitted between the MAGs without passing through the P-GW 511, as a result of which the P-GW 511 cannot add the mark. In such a case, too, the UE 504 can select an ideal interface (i.e. the 3G interface) for communicating with the CN 513, because the first data packet is not marked.

Here, it is important that the operation of the P-GW 511 is different from that described in the above embodiments.

FIG. 5B is described next. The same assumptions as FIG. 5A are applied here, except that a home domain 515 is a home domain of a CN 526. In addition, mobility of the CN 526 is managed by the PMIPv6 mechanism which is a static mobility management mode.

In FIG. 5B, a message 556 indicates the first data packet sent from the CN 526 to a UE 516. This message 556 is tunneled via a P-GW 522. The P-GW 522 specifies that the CN 526 uses the PMIPv6 mechanism, and also specifies that information about the static mobility mode assigned to the CN 526 may be held. In such a case, even when the data packet is transmitted via an ingress interface of the P-GW 522, the P-GW 522 does not mark the data packet.

Upon receiving the data packet of the message 556, the UE 516 recognizes no mark explicitly added to the data packet or no explicitly reported mark. Accordingly, the UE 516 uses the PMIPv6 mechanism, i.e. the 3G interface. Since the CN 526 cannot switch to the CMIPv6 mode, the CN 526 does not use a CMIPv6 interface with the UE 516. Hence, an ideal path attained by the operation according to the present invention is as indicated by a message 527 in FIG. 5B.

The P-GW 522 may provide the UE 516 with information that the CN 526 cannot switch the mobility management mode. As a result, the UE 516 can be kept from requesting the CN 526 to switch the mobility management mode.

<Embodiment 8: Functional Architecture of the UE>

Figure 6:
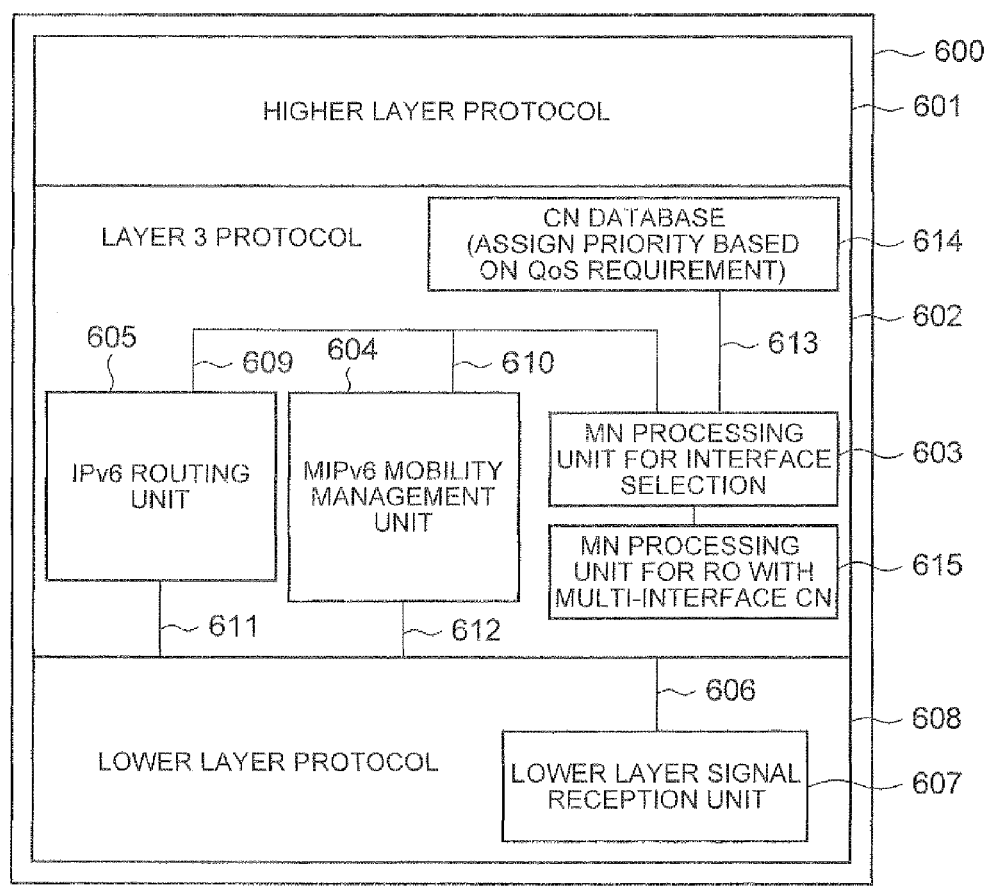
FIG. 6 is a diagram showing an example of a structure of a UE in an embodiment of the present invention.

An example of a functional architecture of the UE for carrying out the present invention is described in Embodiment 8 of the present invention. FIG. 6 shows an example of a functional architecture 600 of a UE having a MIPv6 function necessary for realizing the present invention.

The functional architecture 600 shown in FIG. 6 has three main functional modules that are a lower layer protocol module 608, a layer 3 protocol module 602, and a higher layer protocol module 601.

The lower layer protocol module 608 includes a plurality of lower layer protocol modules directly relating to an interface of the UE. For example, in the case where the UE has n interfaces, the number of lower layer protocol modules is n. The lower layer protocol module 608 implements functions of an entire physical layer and data link layer, such as functions necessary for basic data communication including mechanisms of signal modulation, encoding compression, media access control, and link layer control, and functions necessary for a plurality of interfaces (multi-interface) of the UE.

The lower layer protocol module 608 also includes a lower layer signal reception unit 607. The lower layer signal reception unit 607 supports main signal processing according to the present invention, and has a function of receiving the mark from the S-GW (or the P-GW) as an example. For example, in the case where the mark described in Embodiment 1 is reported from the P-GW to the S-GW, the S-GW can pass the information to the UE using a L2 method. This mark information can be sent by encapsulating a data packet in a L2 tunnel and inserting the mark in the L2 tunnel. In the case where the S-GW connected to the interface that uses the PMIPv6 mechanism is a router of the first hop to the UE, the mark information may be sent to the UE using simple L2 signaling.

The lower layer signal reception unit 607 is capable of receiving the L2 signal, and passing necessary information to the layer 3 protocol module 602 via a signaling interface 606. The information passed to the layer 3 includes information indicating whether or not the mark is received form the P-GW. For example, the mark information is sent to a L3 submodule which is a MN processing unit for selecting an interface (an MN processing unit 603 for interface selection).

The layer 3 protocol module 602 in FIG. 6 is an intermediate layer in the functional architecture 600. The layer 3 protocol module 602 includes, for example, an IPv6 routing unit 605, a MIPv6 mobility management unit 604, the MN processing unit 603 for MN interface selection, a MN processing unit 615 for RO with a multi-interface CN, and a CN database 614.

The IPv6 routing unit 605 is connected to the MM processing unit 603 for interface selection by a signaling interface 609, and the MIPv6 mobility management unit 604 is connected to the MM processing unit 603 for interface selection by a signaling interface 610. Moreover, the IPv6 routing unit 605 is connected to the lower layer protocol module 608 by a signaling interface 611, and the MIPv6 mobility management unit 604 is connected to the lower layer protocol module 608 by a signaling interface 612. The MN processing unit 603 for interface selection is connected to the CN database 614 by an interface 613.

Main functions of the IPv6 routing unit 605 include packet dispatch, address configuration, and neighbor discovery. The MIPv6 mobility management unit 604 is capable of performing mobility management of a mobile node for one or more interfaces, and also capable of processing a MoNAMI6-type binding. The MIPv6 mobility management unit 604 specifies the mark sent from the P-GW (e.g. in the case where the mark is directly sent to the WiMAX interface of the UE), and reports the mark to the MN processing unit 603 for interface selection. The MN processing unit 603 for interface selection recognizes an interface selected by a network, based on the reported information.

Note that the P-GW may insert the mark in a tunnel and tunnel a data packet to the WiMAX interface. For example, in the case where the mark is directly sent from the S-GW or the P-GW to the UE using a L3 message (an explicit message not associated with a data packet) such as an ICMPv6 message, the IPv6 routing unit 605 passes the mark or the message to the MN processing unit 603 for interface selection. In the case where the mark is sent using a mobility header message or a mobility header having a new option, the mark is processed by the MIPv6 mobility management unit 604 and then equally passed to the MN processing unit 603 for interface selection. The UE selects an ideal interface (proper interface) using various criteria, as described with regard to the detailed operation of the UE in interface selection.

Some of main determination processes performed by the MN processing unit 603 for interface selection relate to a process whereby the UE checks whether or not the mark exists. In the case where the mark does not exist in the packet destined for the home address of the UE, the MN processing unit 603 for interface selection recognizes that the 3G interface is specified (designated) by the network. In the case where the mark exists, on the other hand, the MN processing unit 603 for interface selection recognizes that the WiMAX interface is specified (designated) by the network.

In the case where the mark is sent as an independent message without being embedded in a data packet, the message needs to include a parameter about the CN. A detailed message form will be described later. When the interface designated by the network is specified, the MN processing unit 603 for interface selection may use the CN database 614.

The CN database 614 includes all different QoS parameters about CNs. The CN database 614 may include information that enables priorities of flows or CNs to be separated based on QoS requirements.

The MN processing unit 615 for RO with a multi-interface CN has a function of performing a RO process with a CN having a plurality of interfaces. The MN processing unit 615 for RO with a multi-interface CN only performs processing of additional signaling necessary when communicating with the CN having the plurality of interfaces. The MN processing unit 615 for RO with a multi-interface CN mainly has a function of negotiating about which entity is to report a network state to the CN. The MN processing unit 615 for RO with a multi-interface CN also has a function of performing signaling by which the UE requests the CN having the plurality of interfaces to use a specific interface, and a function of sending, for example, a single signaling message indicating the selected interface, the network information, and the request to the CN to use the specific interface.

Note that the functions implemented in the UE as shown in FIG. 6 are merely an example, and it should be obvious to a person skilled in the art that other functional implementation methods are also possible without departing from the scope of the present invention.

<Embodiment 9: Architecture of the LMA/P-GW>

Figure 7:
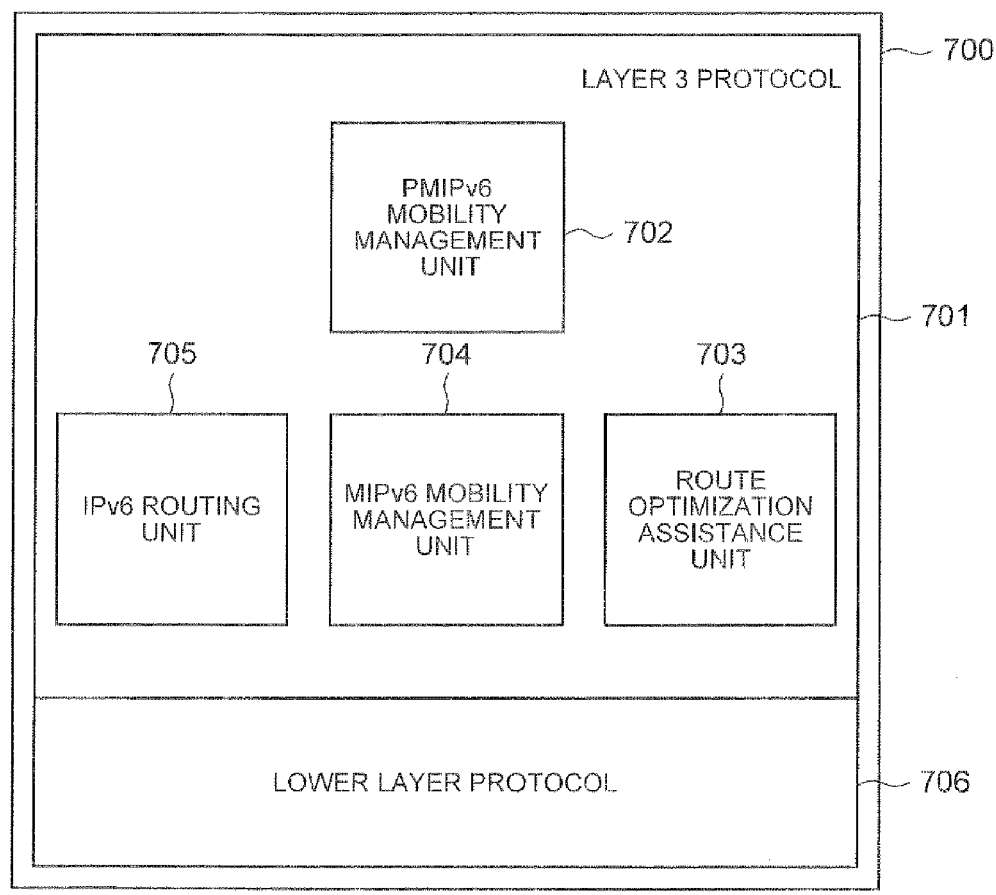
FIG. 7 is a diagram showing an example of a structure of a P-GW in an embodiment of the present invention.

An example of a functional architecture of the P-GW (or the LMA/HA) for carrying out the present invention is described in Embodiment 9 of the present invention. FIG. 7 shows an example of a functional architecture 700 of a P-GW having a MIPv6 function necessary for realizing the present invention.

The functional architecture 700 shown in FIG. 7 has a lower layer protocol module 706 and a layer 3 protocol module 701.

The lower layer protocol module 706 has functions relating to an entire data link layer and functions relating to a bandwidth level.

The layer 3 protocol module 701 includes an Ipv6 routing unit 705, a MIPv6 mobility management unit 704, a route optimization assistance unit 703, and a PMIPv6 mobility management unit 702. Though appropriate interfaces between these modules are not explicitly indicated in FIG. 7, such interfaces actually exist to enable transfer of parameters between the modules.

The IPv6 routing unit 705 has standard IPv6 mechanism functions such as basic routing, address configuration, and neighbor discovery.

The MIPv6 mobility management unit 704 realizes the same function as a MIPv6 home agent for additionally supporting a MoNAMI6 function. The MIPv6 mobility management unit 704 performs, for example, a CMIPv6 binding update, transmission of an ACK signal relating to a binding update, tunneling of a data packet, and maintenance of a binding cache.

The PMIPv6 mobility management unit 702 has a basic LMA function disclosed in documents on PMIPv6 (e.g. Non-patent Document 2).

The route optimization unit 703 has, for examples, the following functions. The route optimization unit 703 has a function of processing a new message sent from the UE. This new message is used to request for detection (monitoring) of a packet sent to a home address or a packet sent from a CN (or a CN group).

The route optimization unit 703 also has a function of detecting whether or not a data packet is delivered via an ingress interface, in the case where there is no inter-MAG tunnel or in the case where a CN is not in a static mobility mode.

The route optimization unit 703 also has a function of explicitly reporting, using an independent message, the mark indicating that the CN exists in the same domain to the UE, or a function of implicitly reporting by inserting the mark in the data packet tunneled to the UE in the case where the data packet is tunneled via the MAG or in the case where the CN exists in the same domain.

The route optimization unit 703 further has a function of, in the case where there is inter-MAG RO or the CN is in a static mobility management mode, not sending the mark even if the first data packet is delivered via the ingress interface of the P-GW.

<Embodiment 10: Type of Message in which the Mark can be Inserted>

Various messages that enable the mark described in Embodiment 1 to be sent to the UE are described in Embodiment 10 of the present invention.

For example, the mark indicating that the CN exists in the same domain can be sent by using an explicit message or by adding the mark to a data packet. In the case of sending the mark added to the data packet, there is an advantage that additional signaling (i.e. an explicit message) is unnecessary. However, there is also a problem that inserting additional information causes an increase in size of the data packet. For instance, a risk that the expanded data packet is destroyed or fragmented on its route arises.

The P-GW is capable of adding the mark information to the data packet tunneled to the S-GW, in the case of detecting that the mark needs to be inserted. The mark is inserted, for example, in a tunnel header as an additional extension header. An example of a resulting packet is a packet 814 shown in FIG. 8.

For instance, the P-GW 316A in FIG. 3A acquires the first packet destined for the home address of the UE. Assuming that the PMIPv6 binding is available in the P-GW, the data packet is tunneled to the S-GW using a tunnel between the S-GW and the P-GW generated through the use of the PMIPv6 binding.

The tunneled data packet has an IPv6 header 815, an authentication header 816 for validating tunneling, and a destination option header 817 that can be referenced to by a tunnel end point. Note that the tunnel end point denotes the MAG or the S-GW in FIG. 3A. The tunneled data packet is embedded following the tunnel headers. This data packet includes a normal IPv6 header 818 and a data packet 819 itself.

The destination option header 817 has a new option indicating the mark. Upon receiving the mark, the S-GW needs to decapsulate the tunnel, and then tunnel the internal data packet to the 3G interface of the UE using L2 tunneling or GTP-type tunneling currently employed in E-UTRAN. This mark can be delivered by tunneling between the S-GW and the UE. It is obvious to a person skilled in the art that there is no need to include the CN address when using the data packet as the packet 814. That is, the CN address is inserted in an IPv6 header 818. Note that the CN address is essential information for the UE to specify which CN is associated with the interface selected by the network.

It is also possible to use another method whereby, after decapsulating the data packet, the S-GW uses a L2 header to send the data packet to the UE by an access-specific mechanism. Such packet transfer may occur in the case where, for example, the UE is directly connected to the S-GW (MAG).

Figure 8:
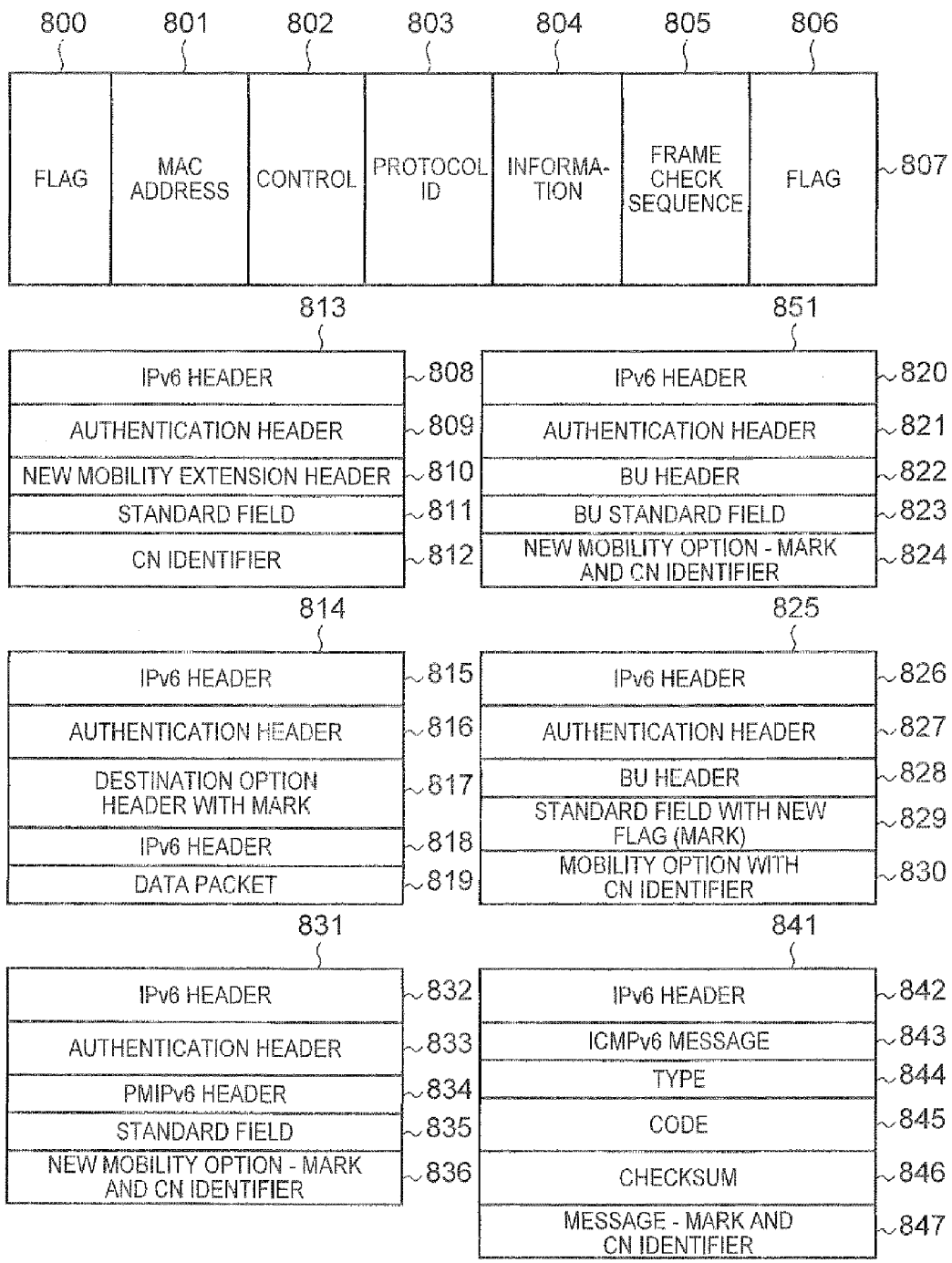
FIG. 8 is a diagram showing an example of a frame structure or a packet structure for transmitting a mark indicating that a CN exists in the same domain, in an embodiment of the present invention.

The L2 header enables transmission of the mark specified by the S-GW, and can be realized by a frame 807 shown in FIG. 8 as an example. The frame 807 is an example of a frame structure of a L2 message mentioned above for carrying mark-related information. In the frame 807, the first field is a flag field 800 indicating the start of the frame. The next field is a media access control address (MAC address) field 801. Source and destination addresses of the L2 header are written in the MAC address field 801. As an example, the source address is a MAC address of an ingress interface of the MAG (S-GW), and the destination address is a MAC address of the UE.

The next field is a control field 802 for identifying the specific type of the frame used. The control field 802 is essential for the receiver to properly processing the L2 frame. The frame type or the message type is basically specified by the control field 802.

The next field is a protocol ID field 803, in which a value relating to a packet generated in a higher layer is written. The next field is an information field 804. The mark information is carried in the information field 804.

A frame check sequence field 805 follows the field 804. The sender and the receiver calculates a value of the frame check sequence field 805. The value is used to verify that the frame is transmitted without tampering. The last field is a flag field 806 used as a frame separator (basically specifying the end of the frame). Note that the structure of the frame 807 is merely an example, and other frame structures different from the structure of the frame 807 are also applicable. The L2 header has a structure specific to a link layer, and the frame 807 uses a typical structure.

in the case where the P-GW uses explicit signaling for reporting the mark, a message 813, 831, or 841 may be adopted.

In the case where the P-GW determines that the mark needs to be reported for a CN relating to the UE, for example the message 813 or 831 is applicable as a signaling message directly sent to the S-GW.

The message 813 is a new signaling message having a new mobility extension header 810. Information specifying the mark is inserted in the new mobility extension header 810. In addition, a CN identifier (CN address or other CN identification information) by which the UE can specify the CN is carried in a CN identifier field 812.

Upon receiving the message 813, the S-GW sends CN information to the UE using an ICMPv6 control message 841. The CN identifier is inserted in the ICMPv6 control message 841. In this case, a new type of ICMPv6 control message may need to be used. The P-GW can also send an ICMPv6 control message in the format of the message 841, directly to the UE. Here, a destination address of the ICMPv6 control message is the home address of the UE, and a source address of the ICMPv6 control message is an address of the P-GW. When reporting the mark by the ICMPv6 control message, the mark may be inserted, or the presence of the CN identifier may be set to denote the report of the mark.

As another method of sending an explicit message, the message 831 using a PMIPv6 type message format may be sent. In such a case, the CN address is embedded using a new mobility option such as an option 836. When the S-GW processes the new mobility option 836, it means that the mark is inherently embedded (i.e. the presence of the new mobility option 836 denotes the mark). However, since the message 831 is only valid until the S-GW, another independent message needs to be sent to the UE to transmit the mark to the UE. For example, the above-mentioned message may be applied to the report of the mark from the S-GW to the UE.

If the CMIPv6 binding is available in the P-GW, another type of message may be used to report the mark. Examples of such a message are messages 851 and 825 shown in FIG. 8. The messages 851 and 825 are both examples of a format of an explicit message. Note that the term "explicit" in this description means to send the mark by an independent message, without being inserted in a data packet.

The messages 851 and 852 both have the care-of address of the UE as their destination. The mark is transmitted using a BU mobility extension header. In the message 851, the CN address is transmitted using a new mobility option 824. Moreover, the mark is specified by this new mobility option 824.

In the message 825, on the other hand, the mark is specified by a flag in a field 829. Besides, the CN identifier is inserted in a standard mobility option 830. It should be obvious that a message explicitly having the mark may be sent by the message 841 that uses the WiMAX interface. Moreover, a data packet of the CN destined for the home address of the UE may be sent to the care-of address of the UE from the P-GW, and the tunnel header in this case may have a destination option header carrying the mark information as in the packet 814.

<Embodiment 11: Another Method in which the P-GW Provides a Prefix List>

Another method for realizing the present invention is described in Embodiment 11 of the present invention. This method is mainly employed to solve a problem in the case where the UE does not have information about the location of the CN and cannot select an ideal interface for achieving RO and efficient mobility management with the CN. In this case, the UE determines to use information provided from the network in which the CN is located, and selects the ideal interface using the information.

One example of the method according to the present invention is that the network marks the packet delivered from the same domain, as described above. As another method, however, a method whereby the UE acquires prefixes possessed in the domain from the P-GW is also applicable. The UE can acquire the prefixes by explicitly requesting the P-GW to provide the prefixes. Based on a prefix list acquired from the P-GW, the UE compares a CN address prefix with the prefix list that can be referenced to in the UE. In the case where an entry matching the prefix of the CN exists, the UE recognizes that the CN exists in the same domain, and selectively uses the CMIPv6 interface (or the WiMAX interface) as described in Embodiment 1. In the case where an entry matching the prefix of the CN does not exist, on the other hand, the UE recognizes that the CN exists in a foreign domain, and uses the PMIPv6 interface (or the 3G interface).

This method has an advantage that a load of the process for detecting the location of the CN (monitoring the packet from the CN) can be reduced in the network entity. That is, most of the process for detecting the location of the CN is carried out by the UE. This method is useful in the case where an operator wants to reduce a processing load on the network entity, and the advantageous effects of the present invention can equally be achieved by this method.

<Embodiment 12: Another Method in which the P-GW of the CN Assists the P-GW of the UES>

Figure 1A:
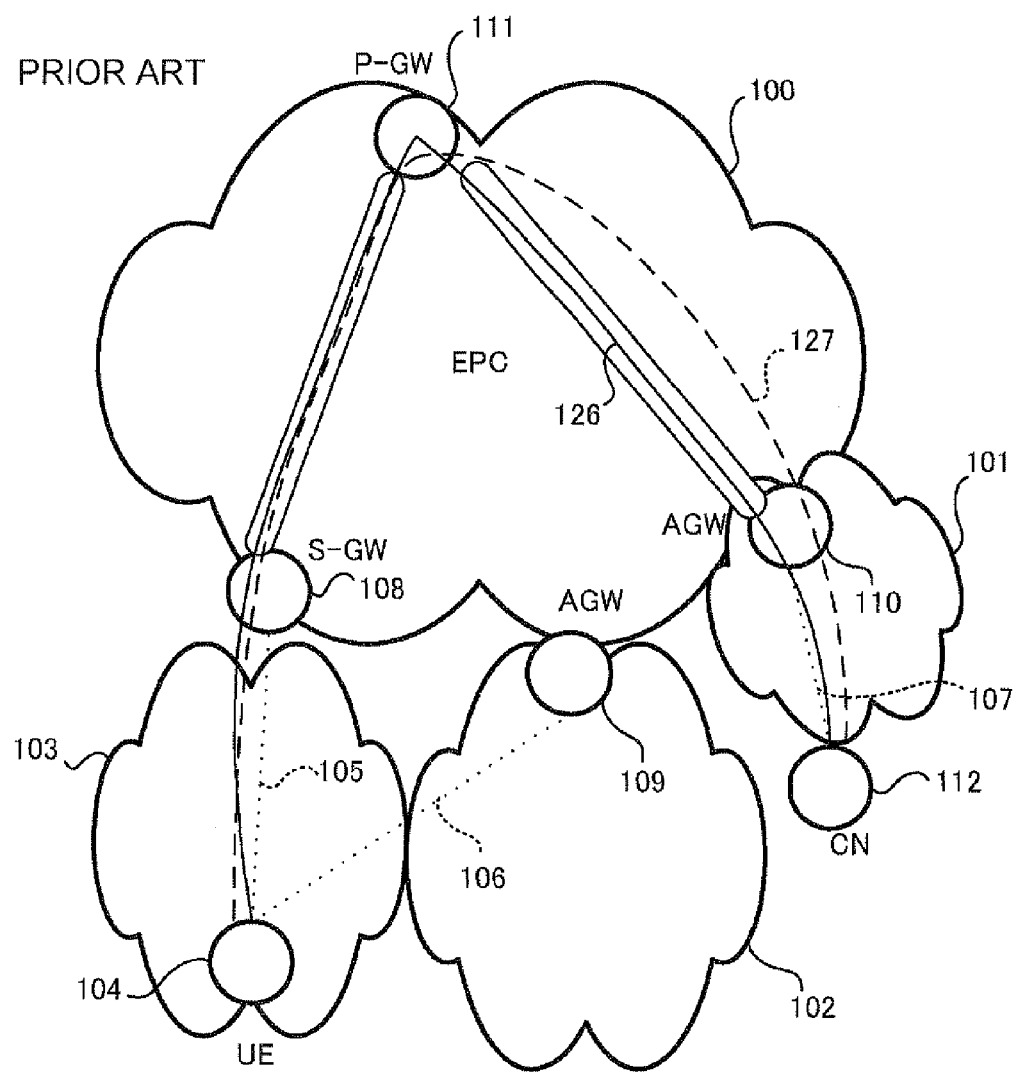
FIG. 1A is a diagram showing a first example of a network structure and a packet flow in the conventional art.
Figure 1B:
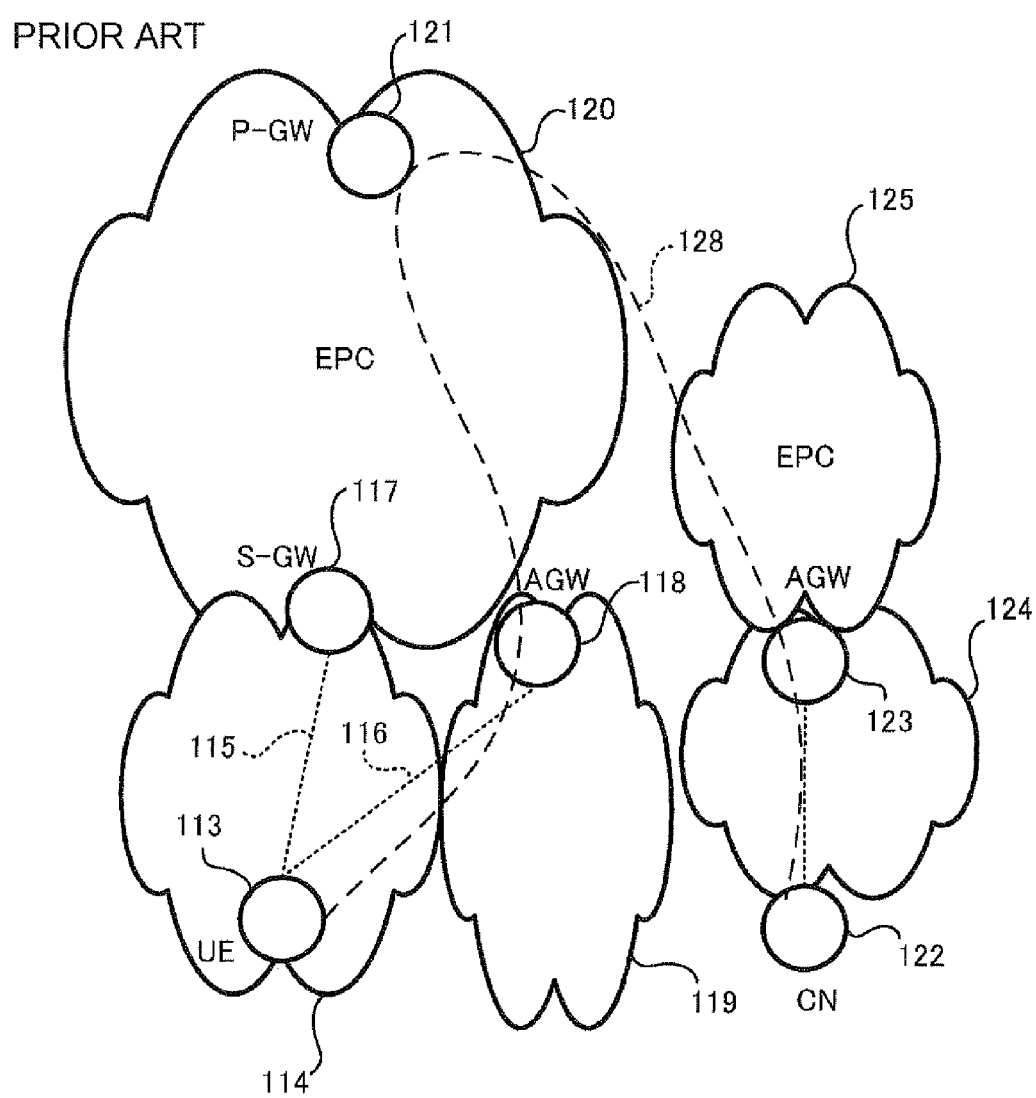
FIG. 1B is a diagram showing a second example of a network structure and a packet flow in the conventional art.
Figure 2B:
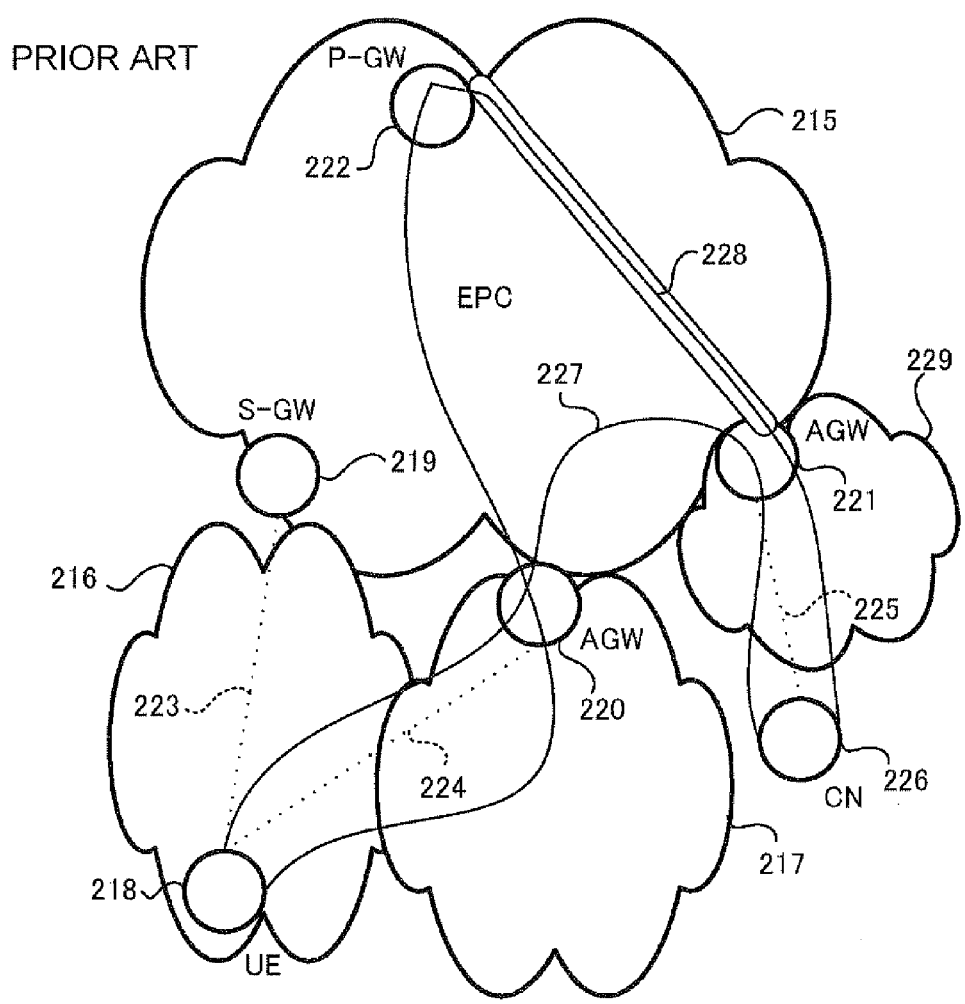
FIG. 2B is a diagram showing a fourth example of a network structure and a packet flow in the conventional art.

Another derivative example for realizing the present invention is described in Embodiment 12 of the present invention. This derivative example is applied only in the case where the CN is located in the foreign domain. The derivative example in Embodiment 12 is described below, with reference to FIG. 1B in which the CN is located in the foreign domain.

In the case where the CN exists in the foreign domain which is the home domain of the CN (e.g. in the case where the domain 125 is the home domain), the P-GW or the home mobility anchor of the CN can tunnel a data packet (a data packet sent from the HoA of the CN to the HoA of the UE) to the home mobility anchor (the P-GW 121) of the UE. Such a tunnel is generated so as to enable the P-GW 121 to recognize that the packet needs to be closely checked to determine whether or not the mark is necessary. The P-GW of the CN has a function of detecting (monitoring) a CN related to the CN 122, and thus specifies the HoA of the UE and inserts the special tunnel.

By monitoring this tunnel (having the P-GW of the CN as its source and the P-GW of the UE as its destination), the P-GW of the UE can specify that the packet does not need to be marked, without searching stored information. Thus, the P-GW of the CN provides support in reducing the processing load of the P-GW of the UE. If there is some kind of cooperation between the P-GWs, the concept according to the present invention can be further supported to implement a mechanism that contributes to a significant reduction in processing load of the network entity.

<Embodiment 13: Extension Method in the Case where the CN Also has a Plurality of Interfaces>

Various scenarios in which the present invention can be carried out and various operations according to the present invention are described in Embodiment 13 of the present invention. Note that various scenarios described in Embodiment 13 of the present invention correspond to the case where the CN also has a plurality of interfaces and can implement the functions according to Embodiment 1.

Figure 9:
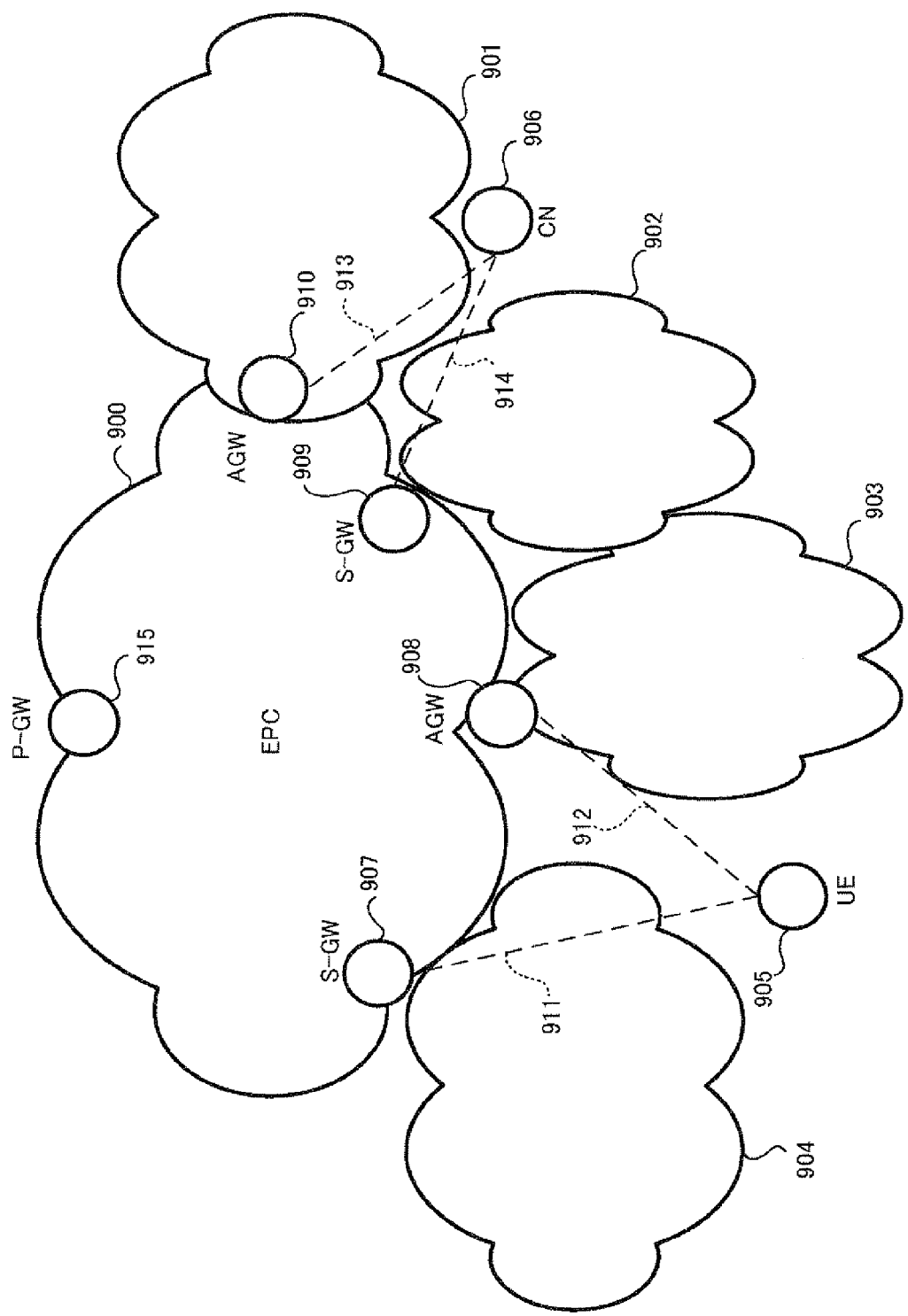
FIG. 9 is a diagram showing a fourth example of a network structure and a packet flow in an embodiment of the present invention.

The following describes a scenario in Embodiment 13 of the present invention, with reference to FIG. 9. A UE 905 has two interfaces. A 3G interface of the UE 905 is connected to a S-GW 907, and a WiMAX interface of the UE 905 is connected to an AGW 908. Mobility of the 3G interface of the UE 905 is managed by the PMIPv6 mechanism, while mobility of the WiMAX interface of the UE 905 is managed by the CMIPv6 mechanism. A P-GW 915 is a home mobility anchor point, or a HA of the UE 905.

The UE 905 communicates with a CN 906. The CN 906 also has a plurality of interfaces (a 3G interface and a WiMAX interface). The 3G interface of the CN 906 is connected to a S-GW 909, and the WiMAX interface of the CN 906 is connected to an AGW 910. The UE 905 and the CN 906 in FIG. 9 are both connected to the same domain 900. A home agent of the CN 907 is the P-GW 915. The CN 906 has a function of requesting the mark and a function of selecting an ideal interface by processing the mark, i.e. the above-mentioned functions according to the present invention.

In such an environment, needless signaling occurs in the case where both the UE 905 and the UE 906 request for detection (monitoring) of the other node. In detail, in the case where the UE 905 requests the P-GW 911 to detect the CN 906 and at the same time the CN 906 requests the P-GW 911 to detect the UE 905, needless signaling occurs. In such a case, it is desirable that one peer node of a given flow executes signaling according to the present invention and provides a result of the signaling to the other peer node.

For example, in the case where the UE 905 and the CN 906 in FIG. 9 both attempt to achieve RO and efficient mobility management, the UE 905 and the CN 906 can first adjust whether the UE 905 or the CN 906 performs detection of an ideal interface. Such adjustment may be made by band signaling, out-of-band signaling, manual configuration, or the like.

After the adjustment (e.g. assuming that the UE 905 performs interface detection), the UE 905 can specify that the CN 906 exists in the same domain from the mark reported from the network, according to the operation described above. The UE 905 accordingly sends a final report that the UE 905 and the CN 906 both exist in the same domain and the CN 906 is to use the CMIPv6 interface, to the CN 906. Such signaling by the UE 905 saves the CN 906 from having to perform an ideal interface selection process on its own, thereby contributing to a reduced processing load and signaling in the CN 906.

In the case where the UE 905 discovers another interface different from the interface specified by the network, the UE 905 may report both the interface selected by the network and the interface selected by the UE, to the CN 906. When the CN 906 has information that the interface specified by the network is more stable, the CN 906 selects the interface specified by the network when selecting its interface. Otherwise, the CN 906 performs interface selection based on the interface selected by the UE 905.

For example, the CN 906 may use the CMIPv6 interface in the case of using the information selected by the network, and use the 3G interface in the case of selecting an interface different from the interface specified by the network based on the interface selected by the UE 905.

Moreover, in the case where the CN 906 predicts that the UE 905 is affected by the interface determination result by the CN 906, the CN 906 may report the interface determination result of the CN 906 to the UE 905.

For instance, in the case where the UE 905 selects an interface different form the interface selected by the network, there is a possibility that the UE 905 requests the CN 906 to select an interface desirable for UE-CN communication. If the corresponding traffic flow does not tolerate jitter, the UE 905 desires the CN 906 to use the PMIPv6 mode, too, in order to reduce a signaling delay that occurs during movement of the peer node in the domain. There is, however, a possibility that the CN 906 uses the MIPv6 mode based on some condition. Thus, the UE 905 may report a preference indicating which interface is to be used by the CN 906 (which interface is desirable to the UE 905) so that the CN 906 determines whether or not to accept the proposal (the preference of the UE 905).

<Embodiment 14: Example where the UE Having the Plurality of Interfaces and the CN Having the Plurality of Interfaces Perform Interface Selection According to the Information Provided from the Network>

An adjustment method by the UE having the plurality of interfaces and the CN having the plurality of interfaces and a method of determining an ideal interface for mutual communication are described in Embodiment 14 of the present invention.

Consider the case where both the UE and the CN determine an interface for UE-CN communication, based only on the information provided from the network. This operation is described below, with reference to a message sequence chart shown in FIG. 10A.

It is assumed that a UE 1000A and a CN 1008A are located in the same management domain, and are about to perform data communication with each other. It is also assumed that both peer nodes desire to specify a location of the other node on routing topology and use an ideal interface, in order to achieve RO and efficient mobility management in their mutual communication.

For example, the UE 1000A has two interfaces that are a LTE interface 1001A and a WiMAX interface 1002A. The LTE interface 1001A of the UE 1000A is connected to a S-GW 1003A, and the WiMAX interface 1002A of the UE 1000A is connected to an AGW 1004A. A P-GW 1005A has a binding registration for the UE 1000A.

For example, the CN 1008A has two interfaces that are a LTE interface 1009A and a WiMAX interface 1010A. The LTE interface 1009A of the CN 1008A is connected to a S-GW 1006A, and the WiMAX interface 1010A of the CN 1008A is connected to an AGW 1007A. The P-GW 1005A has a binding registration for the CN 1008A.

Mobility of the LTE interfaces (the LTE interfaces 1001A and 1009A) of both the UE 1000A and the CN 1008A are managed by the PMIPv6 mechanism, whereas mobility of the WiMAX interfaces (the WiMAX interfaces 1002A and 1010A) of both the UE 1000A and the CN 1008A are managed by the CMIPv6 mechanism.

A method whereby the UE 1000A and the CN 1008A mutually adjust which entity specifies an ideal interface for RO is described here. This negotiation is useful in that multiple nodes are kept from performing independent detection. Negotiating between communication nodes is also useful especially in group communication (in such a situation where a group of CNs performs communication).

The negotiation is indicated by a message 1011A in FIG. 10A. For example, the UE 1000A reports to the CN 1008A that the UE 1000A specifies an ideal interface for communication, by the message 1011A. Upon receiving the message 1011A, the CN 1008A does not request the P-GW 1005A to provide information about the UE 1000A. Such a negotiation message 1011A allows a lot of signaling to be saved.

The UE 1000A then requests the P-GW 1005A to provide information about the CN 1008A. The P-GW 1005A reports to the UE 1000A that the CN 1008A exists in the same domain, by the mark. The P-GW 1005A also reports from which interface of the CN 1008A a packet reaches the P-GW 1005A, to the UE 1000A. Note that the P-GW 1005A can easily specify whether or not the packet from the CN 1008 reaches via the PMIPv6 interface of the CN (e.g. a PMIPv6 packet is tunneled via a MAG).

The information about the CN 1008A is provided to the UE 1000A by a message 1012A. Upon receiving the message 1012A, the UE 1000A starts a determination process of which interface is to be selected. Here, suppose the UE 1000A determines to select the interface specified from the network, and thus determines to communicate with the CN 1008A using the WiMAX interface 10028. The UE 1000A, however, does not have any knowledge about WiMAX access of the CN 1008A. In order to achieve complete RO between the UE 1000A and the CN 1008A, both entities need to use the WiMAX interface in the CMIPv6 mode. Hence, the UE 1000A requests the CN 1008A to use CMIPv6 if the CN 1008A is capable of CMIPv6, by a message 1013. Note that the message 1013 may be used to report that the UE 1000A and the CN 1008A both exist in the same domain.

In the case where there is no negative acknowledgement to the message 1013, it is considered that the CN 1008A determines to use the WiMAX interface 1010A. If the CN 1008A determines not to use the WiMAX interface (or if the CN 1008A has no CMIPv6 interface), on the other hand, it is desirable to send some kind of negative acknowledgement from the CN 1008A to the UE 1000A. In the case where the UE 100A and the CN 1008A both use the WiMAX interface, bidirectional data communication is performed through a path as a result of route optimization as indicated by a message 1014.

<Embodiment 15: Example where the UE Having the Plurality of Interfaces Tries to Follow the Information Provided from the Network but the CN Refuses to Follow, and as a Result the UE Reconsiders Interface Selection>

The case where the interface selection executed by the UE having the plurality of interfaces in order to communicate with the CN having the plurality of interfaces is eventually performed based on the interface selection by the CN is described in Embodiment 15 of the present invention. This operation is described below, with reference to a message sequence chart shown in FIG. 10B.

A UE 1000B and a CN 1008B both exist in the same management domain. The UE 1000B and the CN 1008B are also both connected to a network via their respective interfaces. A LTE interface 1001B of the UE 1000B is connected to a S-GW 1003B, and mobility of the LTE interface 1001B is managed by the PMIPv6 mechanism. A WiMAX interface 1002B of the UE 10008 is connected to an AGW 1004B, and mobility of the WiMAX interface 1002B is managed by the CMIPv6 mechanism.

Likewise, a LTE interface 1009B of the CN 1008B is connected to a S-GW 1006B, and mobility of the LTE interface 1009B is managed by the PMIPv6 mechanism. A WiMAX interface 1010B of the CN 1008B is connected to an AGW 1007B, and mobility of the WiMAX interface 1010B is managed by the CMIPv6 mechanism. A P-GW 1005B is a mobility anchor point of both the UE 1000B and the CN 1008B, as in Embodiment 14 described above.

For example, the UE 1000B reports to the CN 1008A that the UE 1000B specifies an ideal interface for communication, by a message 1015B. That is, the UE 1000B reports to the CN 1008B that the UE 1000B reports information about an appropriate interface for optimized communication to the CN 1008B.

As described in Embodiment 14, the P-GW 1005B reports a location of the CN (whether or not the CN is in the same domain) and an interface (the PMIPv6 interface or the CMIPv6 interface) used by the CN to the UE 1000B, by a message 1016B. The UE 1000B then determines to follow the information provided from the network, and determines to use the WiMAX interface on the ground that the CN 1008B exists in the same domain.

After this interface selection, the UE 1000B sends a message 1017B to the CN 1008B, thereby reporting the use of the CMIPv6 interface (i.e. the WiMAX interface 1002B) to the CN 1008B. Note that the P-GW 1005A also reports to the UE 1000E that the CN 1008B has the plurality of interfaces.

In this embodiment, suppose the CN 1008B determines not to use, for example, the CMIPv6 interface. In this case, the CN 1008B returns a signaling message 1018B to the UE 1000B, thereby reporting the use of the OMIPv6 interface (the LTE interface 1009B) managed by the PMIPv6 mechanism.

Upon receiving the message 1018B, the UE 1000B determines whether or not to use the WiMAX interface 1002B, and performs CMIPv6 signaling or reconsiders the determination.

Since the CN 1008B makes the different determination, the UE 1000B determines to use the LTE interface 1001B for communication with the CN 1008B according to the report from the CN 1008B, to thereby save power. A data path for UE-CN communication in this case is as indicated by a message 1019B, where bidirectional data communication is performed using the LTE interfaces 1001B and 1009B.

It is important here that, even when both peer nodes exist in the same domain, both peer nodes determine to use the LTE interface. Note that each signaling message in Embodiment 15 may be in-band signaling relating to a data message, or an out-of-band signaling not relating to a data message. Besides, such a message may be sent by an arbitrary method.

<Embodiment 16: Example where the UE Having the Plurality of Interfaces does not Follow the Information Provided from the Network about the Appropriate Interface, and Reports Both the UE Selection and the Network Information to the CN>

In Embodiment 16 of the present invention, the UE having the plurality of interfaces performs the interface selection process for communicating with the CN having the plurality of interfaces based on the selection criteria of the UE itself, but the UE also reports the actual state information specified by the network and the interface determined by the UE to the CN. The CN can then determine the appropriate interface based on the reported information. This operation is described below, with reference to a message sequence chart shown in FIG. 11A.

A UE 1100A and a CN 1108A both exist in the same management domain. The UE 1100A and the CN 1108A are also both connected to a network via their respective interfaces. A LTE interface 1101A of the UE 1100A is connected to a S-GW 1103A, and mobility of the LTE interface 1101A is managed by the PMIPv6 mechanism. A WiMAX interface 1102A of the UE 1100A is connected to an AGW 1104A, and mobility of the WiMAX interface 1102A is managed by the CMIPv6 mechanism.

Likewise, a LTE interface 1109A of the CN 1108A is connected to a S-GW 1106A, and mobility of the LTE interface 1109A is managed by the PMIPv6 mechanism. A WiMAX interface 1110A of the CN 1108A is connected to an AGW 1107A, and mobility of the WiMAX interface 1110A is managed by the CMIPv6 mechanism. A P-GW 1105A is a mobility anchor point of both the UE 1100A and the CN 1108A, as in Embodiments 14 and 15 described above.

The UE 1100A sends a message 1111A to the CN 1108A, to negotiate about which entity is to specify the appropriate interface. The message 1111A is the same as that described in detail in Embodiments 14 and 15.

The P-GW 1105A reports to the UE 1100A that the CN 1108A exists in the same domain as the UE 1100A, by a message 1112A. However, the UE 1100A determines to use the LTE interface 1101A, despite the CN 1108A existing in the same domain. The UE 1100A provides the information provided from the network, the information of the interface selected by the UE 1100A, and the like to the CN 1108A, by a message 1113A.

The provision of the above-mentioned information to the CN 1108A by the UE 1100A allows the CN 1108A to recognize the actual network state (i.e. the state in the placement location of the UE 1100A) and the state which the UE 1100A follows (i.e. the interface selected by the UE).

There are both a possibility that the CN 1108A desires to follow the network state (the information provided from the network) and a possibility that the CN 1108A desires to follow the determination pattern of the UE 1100A. In the case where the determination result of the UE 1100A about the appropriate interface keeps changing, there is also a possibility that the CN 1108A desires to follow the actual network state in interface selection, thereby reducing a processing load for interface selection. However, if the CN 1108A determines that it is necessary to recognize the state of the UE 1100A with regard to flow performance, the CN 1108A requires the information about the state of the UE 1100A, for determining the appropriate interface. Accordingly, the CN 1108A needs to recognize both the network state and the selection result of the UE 1100A. Based on these information, the CN 1108A can perform interface selection.

Having determined the appropriate interface, the CN 1108A reports the determination result to the UE 1100A, by a message 1114A. It is important here that the UE 1100A is capable of re-adjusting its interface selection by recognizing the interface determined by the CN 1108A. For example, it is possible to perform such an operation in which the CN 1108A determines to use the PMIPv6 interface and reports it to the UE 1100A by the message 1114A, and the UE 1100A determines that the determination by the CN 1108A is appropriate and follows the determination by the CN 1108A.

<Embodiment 17: Example where the UE Having the Plurality of Interfaces does not Follow the Information Provided from the Network about the Appropriate Interface, but Reports Both the Selection by the UE and the Network Information to the CN and Also Reports the Preference to the CN>

In Embodiment 17 of the present invention, too, the UE having the plurality of interfaces performs interface selection for communicating with the CN having the plurality of interfaces, based on the selection criteria of the UE itself. In Embodiment 17, however, the UE reports the preference of the UE (i.e. the interface that is desirably selected by the CN) to the CN in addition to the actual state information provided from the network and the interface determined by the UE, to enable the CN to select the appropriate interface for the UE. This operation is described below, with reference to a message sequence chart shown in FIG. 11B.

A UE 1100B and a CN 1108B both exist in the same management domain. The UE 1100B and the CN 1108B are also both connected to a network via their respective interfaces. A LTE interface 1101B of the UE 1100B is connected to a S-GW 1103B, and mobility of the LTE interface 1101B is managed by the PMIPv6 mechanism. A WiMAX interface 1102B of the UE 1100B is connected to an AGW 1104B, and mobility of the WiMAX interface 1102B is managed by the CMIPv6 mechanism.

Likewise, a LTE interface 1109B of the CN 1108B is connected to a S-GW 1106B, and mobility of the LTE interface 1109B is managed by the PMIPv6 mechanism. A WiMAX interface 1110B of the CN 1108B is connected to an AGW 1107B, and mobility of the WiMAX interface 1110B is managed by the CMIPv6 mechanism. A P-GW 1105B is a mobility anchor point of both the UE 1100B and the CN 1108B, as in Embodiments 14 to 16 described above.

The UE 1100B sends a message 1116B to the CN 1108B, to negotiate about which entity is to specify the appropriate interface. The message 1116B is the same as that described in detail in Embodiments 14 to 16.

The P-GW 1105B reports to the UE 1100B that the CN 1108B exists in the same domain as the UE 1100B, by a message 1117B. However, the UE 1100B determines to use the LTE interface 1101B, despite the CN 1108B being located in the same domain. The UE 11008 provides, to the CN 1108A, not only the information provided from the network, the information of the interface selected by the UE 1100B, and the like but also the preference of the UE 1100B indicating the suitable interface to be used by the CN 1108B, by a message 1118B.

The message 1118B is used to transmit an important trigger and request the CN 1108B to use the specific interface. In particular, the specific interface which the UE 11008 wants the CN 1108B to use is reported to the CN 1108B, by the preference of the UE 1108B. The CN 1108B sends an acknowledgement indicating whether or not to follow the request to use the specific interface, by a message 1119B. For example, in the case where the CN 1108B reports to follow the request, the UE 1100B and the CN 1108B can both use the same type of interface (e.g. the LTE interface). In Embodiment 17 of the present invention, it is important that the CN 1108B uses the three parameters (the network state, the selection result of the UE 1100B, and the preference of the UE 1100B) in the appropriate interface determination process.

<Embodiment 18>

Figure 12:
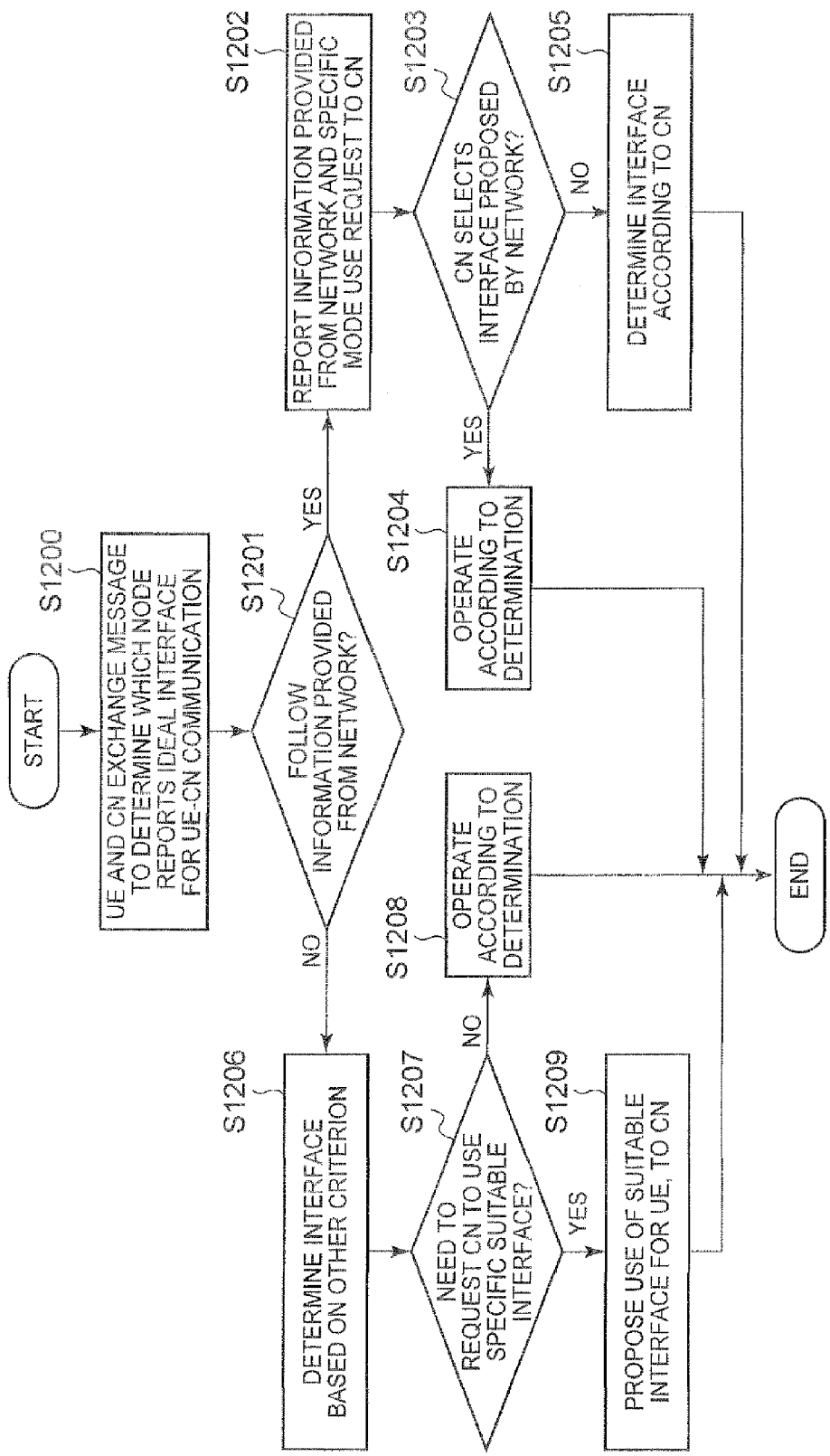
FIG. 12 is a flowchart showing a second example of a process of a UE in an embodiment of the present invention.

In Embodiment 18 of the present invention, an operation of the UE when communicating with the CN having the plurality of interfaces is described with reference to FIG. 12. FIG. 12 is a flowchart showing an overview of the operation of the UE according to the present invention.

First, the UE negotiates about which node is to report the ideal interface, in step S1200. An example where the UE is a node to report the ideal interface is described here. After step S1200, the UE checks whether or not the appropriate interface can be determined using only the information provided from the network (the information from the P-GW), in step S1201.

In the case of determining to follow the information provided from the network in step S1201, the UE reports the information provided from the network and the suitable interface to be selected by the CN to the CN, in step S1202. After step S1202, the UE checks whether or not the CN selects the interface proposed by the UE (i.e. the interface determined according to the information provided from the network), in step S1203.

In the case of determining that the CN selects the proposed interface in step S1203, no further processing is performed, and communication is carried out according to the determination. In the case of determining that the CN does not select the proposed interface in step S1203, the UE reevaluates the determination of the interface selection in step S1205. Here, the UE basically reevaluates the determination of the interface, based on the interface selected by the CN.

In the case of determining not to follow the information provided from the network in step S1201, on the other hand, the UE performs interface selection based on other criteria such as load balancing and a power state in addition to the information provided from the network, in step S1206.

After step S1206, the UE checks whether or not it is necessary to request the CN to use a specific interface, in step S1207. In the case of determining that it is necessary to request the CN to use the specific interface in step S1207, the UE requests the CN to use the specific interface in step S1209. In the case of determining that it is not necessary to request the CN to use the specific interface, no further processing is performed, and communication is carried out according to the determination (or while ignoring the information provided from the network) in step S1209.

<Embodiment 19: Application of the Marking to a HeNB Multi PDN Scenario>

Figure 13:
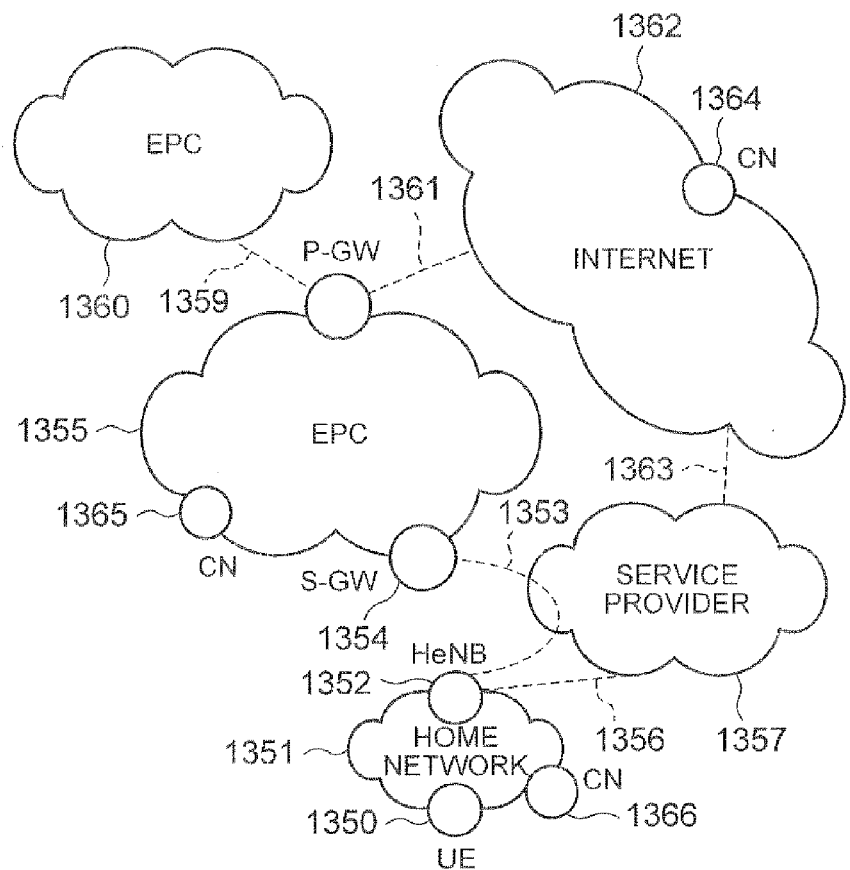
FIG. 13 is a diagram showing another example of a network structure in an embodiment of the present invention.

A situation where the solution method of marking the packet sent to the UE by the P-GW is applicable to the femtocell scenario shown in FIG. 13 is described in Embodiment 19 of the present invention.

For example, the UE 1350 is assigned the IP address (3G.IP.UE1350) by the P-GW 1358. The UE 1350 requests the P-GW 1358 to report to the UE 1350 how the packet is received from the CN 1364. The P-GW 1358 executes the detection mechanism described in the above embodiments, to specify the location of the CN 1364.

Having specified that the location of the CN 1364 is outside the EPC 1355, the P-GW 1358 marks the data packet from the CN 1364 to the UE 1350, to report to the UE 1350 about the CN 1364. This mark allows the UE 1350 to recognize that the CN 1364 does not exist in the EPC 1355. The mark may be transmitted by a L2/L3 message directly sent from the P-GW 1358 to the UE 1350, though the present invention is not limited to such.

Figure 14:
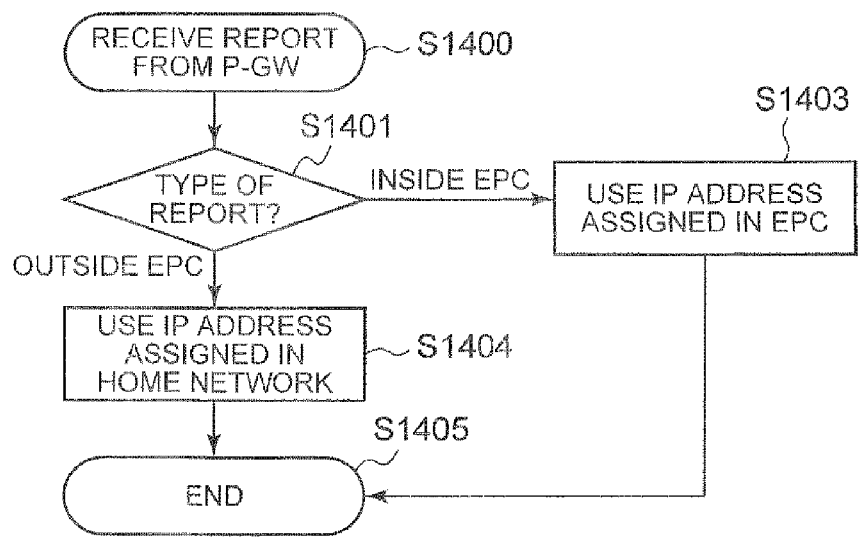
FIG. 14 is a flowchart showing a third example of a process of a UE in an embodiment of the present invention.

The following describes a method whereby the terminal determines which IP address is to be used based on the received report, with reference to a flowchart shown in FIG. 14. Upon receiving the report (step S1400), the UE 1350 checks the type of the report provided from the P-GW 1358 (step S1401).

In the case where the report indicates to the UE 1350 that the packet is received from inside the EPC 1355, the UE 1350 determines to use the IP address (3G.IP.UE1350) assigned for EPC access, in order to further communicate with the sender of the packet (step S1403). After this determination, the processing ends (step S1405).

In the case where the report indicates to the UE 1350 that the packet is received from outside the EPC 1355, the UE 1350 determines to use the IP address (HN.IP.UE1350) assigned for home network access, in order to further communicate with the sender of the packet (step S1404). After this determination, the processing ends (step S1405).

<Embodiment 20: Determination from the UE to the HeNB in the Case where the CN Exists in the EPC>

A method whereby the terminal determines the location of the correspondent node is described in Embodiment 20 of the present invention. In FIG. 13, in the case where the P-GW 1358 reports to the UE 1350 that the correspondent node exists in the EPC 1355, there is a possibility that the UE 1350 has difficulty in determining which IP address (3G.IP.UE1350 or HN.IP.UE1350) is to be used for communication with the correspondent node.

Suppose the CN 1366 is also a subscriber of the EPC 1355, and has an IP address for accessing the EPC via 3G.IP.CN 1366. When the CN 1366 sends a packet destined for the UE 1350, the packet is routed into the EPC 1355 (i.e. the HeNB→1352 the S-GW 1354→the P-GW of the CN 1366→the P-GW 1358). The P-GW 1358 receives the packet, and recognizes that the sender (source) exists in the EPC 1355. The P-GE 1358 inserts the mark in the packet, to enable the UE 1350 to recognize that the packet is received from inside the EPC 1355. Based on this recognition, the UE 1350 determines to use 3G.IP.UE1350 for communicating with the CN 1366.

In actuality, however, HN.IP.UE1350 contributes to a shortest round-trip time between the UE 1350 and the CN 1366, so that the UE 1350 preferably uses HN.IP.UE1350 for communicating with the CN 1366. Therefore, it is desirable that the UE 1350 requests the HeNB 1352 to report the location of the CN 1366 in the EPC 1355 to the UE 1350.

Figure 15:
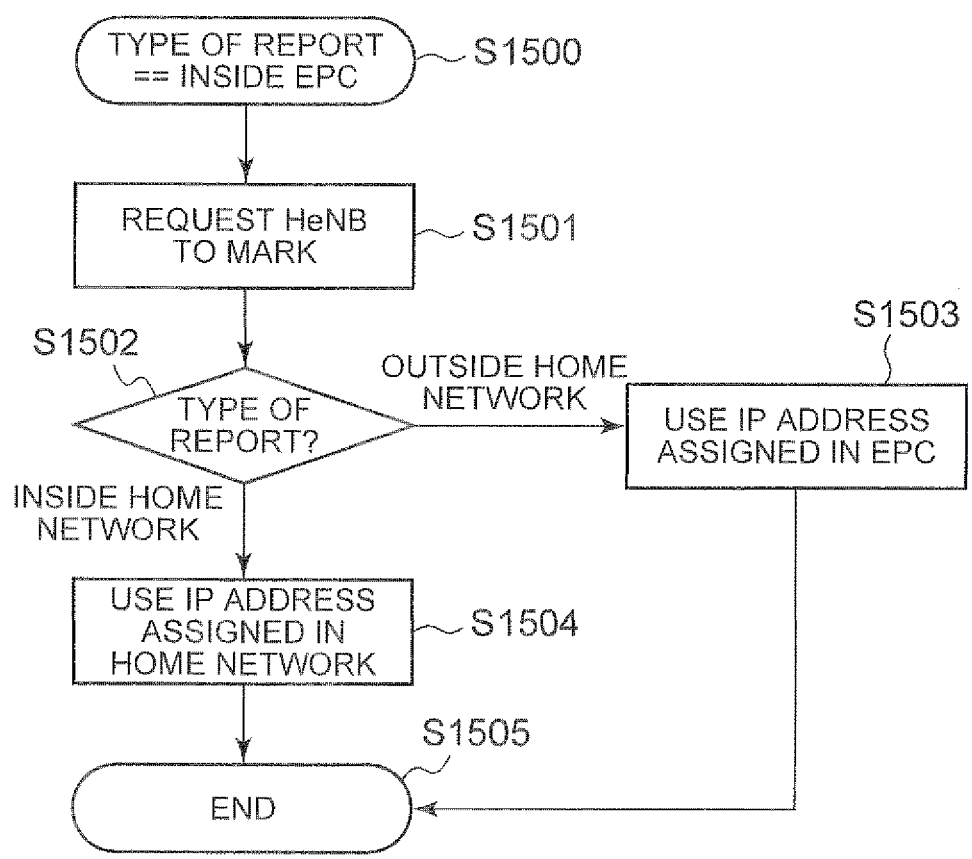
FIG. 15 is a flowchart showing a fourth example of a process of a UE in an embodiment of the present invention.

The following describes a determination method whereby the terminal requests the HeNB to report the location of the correspondent node to the terminal, with reference to a flowchart shown in FIG. 15. When the UE 1350 receives, from the P-GW 1358, the type of report in which the mark indicating the reception of the packet from inside the EPC 1355 is inserted (step S1500), the UE 1350 requests the HeNB 1352 to report to the UE 1350 how the HeNB 1352 receives a similar packet (step S1501).

Upon receiving the similar packet, the HeNB 1352 reports the reception method of the packet to the UE 1350. The UE 1350 receives the report from the HeNB 1352, and checks the type of report (step S1502).

In the case where the report indicates to the UE 1350 that the packet is received in the home network 1351 from outside (outside the home network 1351), the UE 1350 determines to use the IP address (3G.IP.UE1350) assigned for EPC access, in order to further communicate with the sender of the packet (step S1503). After this determination, the processing ends (step S1505).

In the case where the report indicates to the UE 1350 that the packet is received in the home network 1351 from inside (inside the home network 1351), the UE 1350 determines to use the IP address (HN.IP.UE1350) assigned for home network access, in order to further communicate with the sender of the packet (step S1504). After this determination, the processing ends (step S1505).

A specific example of the processing shown in FIG. 15 is described below. In FIG. 13, the UE 1350 and the CN 1366 have a communication session with each other. The CN 1366 sends a packet destined for 3G.IP.UE1350, from 3G.IP.CN 1366. The packet is routed to the P-GW (the P-GW 1358) of the UE 1350, via the HeNB 1352 and the S-GW 1354. The P-GW 1358 recognizes that the received packet is from inside the EPC 1355, and reports to the UE 1350 that the CN 1366 is located in the EPC 1355.

The UE 1350 determines to further detect an accurate location of the CN 1366 in the EPC 1355, and requests the HeNB 1352 to report to the UE 1350 how the HeNB 1352 receives a packet from the CN 1366. Subsequently when the CN 1366 sends another packet to the UE 1350, the packet is first delivered to the HeNB 1352.

Upon receiving, in the home network 1351, the packet sent from the CN 1366 as the sender (source) to the UE 1350, the HeNB 1352 reports to the UE 1350 that the CN 1366 is located in the home network 1351. As a result, the UE 1350 determines to use HN.IP.UE1350 to communicate with the CN 1366, thereby achieving optimized communication with the CN 1366.

Note that the HeNB 1352 receives (intercepts) a packet from the CN 1366 with 3G.IP.CN1366 as its source address, twice. The first interception is performed when the CN 1366 forwards the packet to the HeNB 1352 via a radio bearer. The packet is forwarded to the P-GW of the CN 1366 in the EPC 1355, through the cellular link 1353. The packet is then forwarded to the P-GW 1358 which is the mobility anchor of the UE 1350. The second interception by the HeNB 1352 is performed when the packet is received from inside the EPC 1355 (i.e. from the P-GW in the EPC 1355).

In the present invention, it is desirable that the HeNB 1352 triggers the packet check at the first interception of the packet from the CN 1366 so as to determine whether or not the packet is from the CN 1366 in the home network 1351. When the HeNB 1352 receives the packet at the second interception, the HeNB does not trigger the packet check because the packet reaches through the logical cellular link 1353.

<Embodiment 21: HeNB Apparatus Structure—Check in Application Control Layer>

A functional architecture of an apparatus used in a preferred embodiment of the present invention is described in Embodiment 21 of the present invention.

Figure 16:
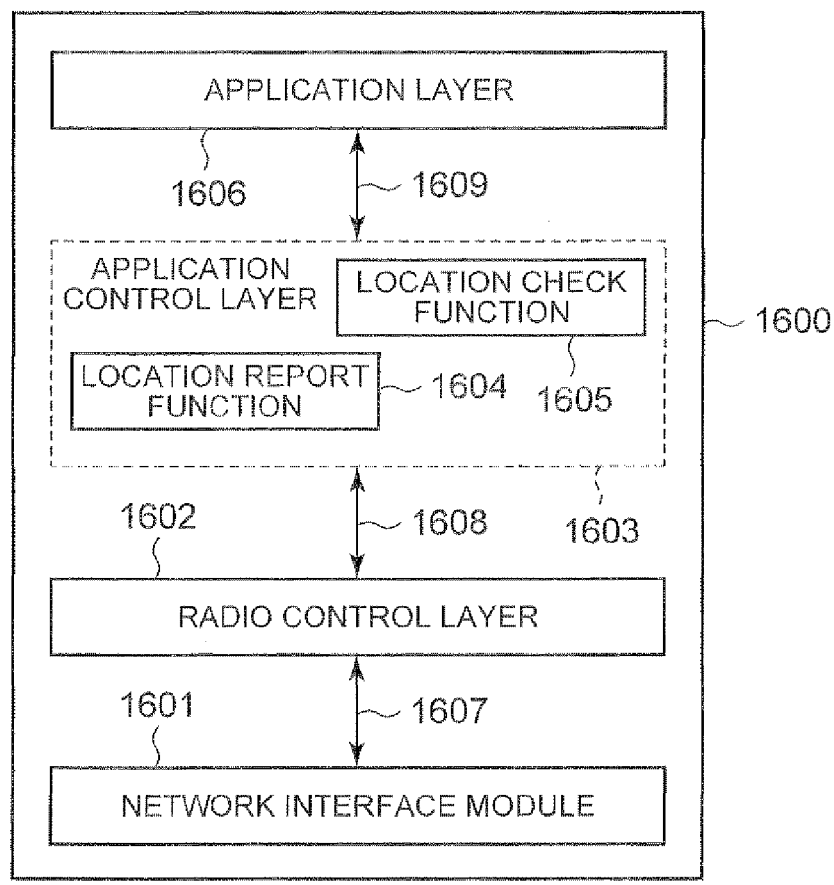
FIG. 16 is a diagram showing an example of a structure of a HeNB in an embodiment of the present invention.

FIG. 16 shows an example of a preferable functional architecture of the HeNB in the present invention. A preferable HeNB functional architecture 1600, shown in FIG. 16 includes a network interface module 1601, a radio control layer 1602, an application control layer 1603, and an application layer 1606.

The network interface module 1601 is a functional block including all hardware and software necessary for a suitable apparatus to communicate with another node via an arbitrary communication medium. In well-known terminology in the related technical field, the network interface module 1601 includes a communication protocol, a driver, firmware, and a communication component of layer 1 (physical layer) and layer 2 (data link layer). It should be obvious for a person skilled in the art that the functional architecture 1600 may include one or more network interface modules 1601. As an example, the HeNB is integrated in a digital subscriber line router (DSL router), and has a cellular radio interface and a digital subscriber line link interface.

The network interface module 1601 can transmit a trigger/packet to the radio control layer 1602, through a signal/data path 1607. For example, the network interface module 1601 forwards a packet to the radio control layer 1602, in order to enable search for determining the location of the correspondent node.

The radio control layer 1602 performs necessary control on the network interface module 1601. For instance, to control the cellular radio interface, the radio control layer 1602 uses an AS (Access Stratum) defined by 3GPP so that a radio link is reliably established between the HeNB and the UE. The radio control layer 1602 also functions as a proxy for passing an application-specific message received in the network interface module 1601, to the application control layer 1603. The radio control layer 1602 can transmit a trigger/packet to the application control layer 1603, through a signal/data path 1608. For example, the radio control layer 1602 forwards a packet received from the network interface module 1601 to the application control layer 1603, in order to enable search for determining the location of the correspondent node.

The application layer 1606 is a functional block including all protocols and programs at higher positions in a network layer of a communication protocol stack. The application layer 1606 includes a transport layer protocol or a session layer protocol, such as TCP (Transmission Control Protocol), SCTP (Stream Control Transport Protocol), UDP (User Datagram Protocol), or a program or software necessary for communication with another node. The application layer 1606 can transmit a trigger/packet to the application control layer 1603, through a signal/data path 1609. In the case where an application requires connection setting (e.g. VoIP), the application layer 1606 triggers the application control layer 1603 to set appropriate connection for a VoIP session.

The application control layer 1603 provides support necessary for setting connection for an application. For example, to allow the UE 1350 to start a VoIP session, the application control layer 1603 uses a NAS (Non-Access Stratum) defined in 3GPP so that a necessary communication path is reliably set up between the UE 1350 and the P-GW 1358.

A location report function 1604 and a location check function 1605 are introduced in the present invention. The location report function 1604 has a function of generating a report message for reporting the specific location of the correspondent node to the UE. The generation of the report message is triggered by the location check function 1605. The location check function 1605 has a function of determining how the HeNB receives a packet from the correspondent node, in order to recognize the location of the correspondent node. Having recognized the location, the location check function 1605 instructs the location report function 1604 to send the report message for reporting the specific location of the correspondent node to the UE. For example, the location check function 1605 is triggered by reception, from the UE, of a request to recognize the location of the particular correspondent node.

The following describes an example for clarifying interaction between various layers of this preferable functional architecture. The network interface module 1601 receives a request to determine the location of the CN 1366, from the UE 1350. This request includes information (e.g. a packet whose sender (source) is the CN 1366) for enabling the HeNB to recognize which packet is to be monitored, and a corresponding IP address (e.g. 3G.IP.UE1350) used by the UE 1350.

The network interface module 1601 forwards the request to the application control layer 1603 through the radio control layer 1602. The application control layer 1603 triggers the location check function 1605, to start checking how a packet whose sender (source) is the CN 1366 is received. The location check function 1605 determines the location of the CN 1366, based on an inter-layer communication method. As an example, when the network interface module 1601 forwards a packet to the application control layer 1603, information indicating, to the application control layer 1603, from which interface the packet is received is embedded in the packet. The application control layer 1603 can determine the location of the CN 1366, based on from which interface the packet is received.

Having determined the location of the CN 1366, the location check function 1605 instructs the location report function 1604 to send the report message to the UE 1350. The report message to the UE 1350 may, for example, have the same format as that shown in FIG. 8.

<Embodiment 22: Type Report Message in the Application Control Layer>

Figure 17:
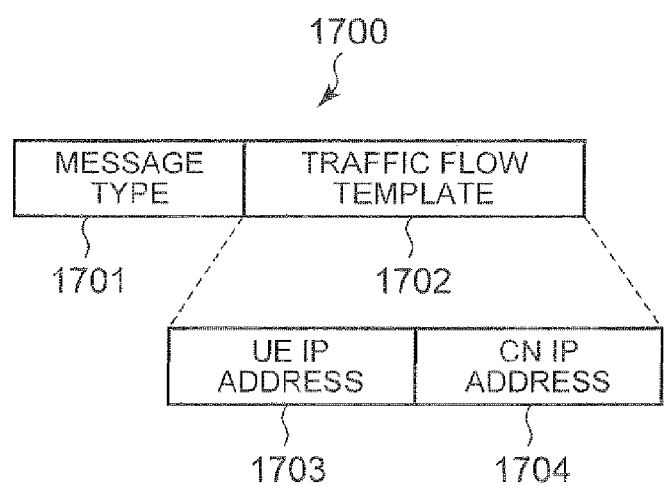
FIG. 17 is a diagram showing an example of a format of a report request message sent from a UE to a HeNB in an embodiment of the present invention.

An example of a format of the report request sent from the terminal is described in Embodiment 22 of the present invention. FIG. 17 shows an example of the format of the report request used in a preferred embodiment of the present invention. The format of the report request has a message type 1701 and a traffic flow template 1702.

The message type 1701 represents a purpose of the message (an application of the message). The message type may, for example, be a bearer resource modification request employed in 3GPP TS24.301, though the present invention is not limited to such. The UE can provide the HeNB with information about the type of packet to be monitored by the HeNB, using the traffic flow template 1702. For instance, the traffic flow template 1702 includes a UE IP address field 1703 and a CN IP address field 1704. The UE IP address field 1703 allows the UE to report a current IP address of the UE to the HeNB. Likewise, the CN IP address field 1704 allows the UE to report a sender (source) whose packet is to be monitored, to the HeNB.

The following describes an example for clarifying the use of the report message described in the embodiment of the present invention. The UE 1350 has two IP addresses (3G.IP.UE1350 and HN.IP.UE1350), while the CN 1366 uses an IP address (3G.IP.CN1366). To request the HeNB 1352 to report the location of the CN 1366 to the UE 1350 in order to determine the location of the CN 1366, the UE 1350 sends a report request 1700 to the HeNB 1352. Here, the UE 1350 designates that the UE 1350 has the IP address (3G.IP.UE1350) of the EPC 1355, in the UE IP address field 1703. The UE 1350 does not need to designate HN.IP.UE1350, because this IP address (HN.IP.UE1350) is assigned by the HeNB 1352 and so the HeNB 1352 already knows the IP address. The UE 1350 equally designates the IP address (3G.IP.CN1366) of the CN 1366, in the CN IP address field 1704.

<Embodiment 23:HeNB Apparatus Structure—Check in Radio Control Layer>

An example of another preferable functional architecture is described in Embodiment 23 of the present invention. In FIG. 16, the location report function 1604 and the location check function 1605 may be implemented not in the application control layer 1603 but in the radio control layer 1602. This structure has an advantage that the radio control layer 1602 does not need to forward an arbitrary packet to the application layer 1603 in order to determine the location of the correspondent node. In this structure, the radio control layer 1902 has a function of recognizing an IP message. The UE reports, to the HeNB, which packet is to be monitored, using the report request shown in FIG. 17. In this case, too, the network interface module 1601 reports, to the location check function 1605, from which interface the packet is received, so that the location check function 1605 can determine the location of the correspondent node.

<Embodiment 24: HeNB Apparatus Structure—Check in Application Layer>

An example of yet another preferable functional architecture is described in Embodiment 24 of the present invention. In FIG. 16, the location report function 1604 and the location check function 1605 may be implemented not in the application control layer 1603 but in the application layer 1606. This structure has an advantage that there is no need to change a control layer (the radio control layer 1602 and the application control layer 1603) so as to support the present invention. This means that a legacy terminal can adopt the present invention by installing the application in the terminal, without affecting various control layers. In this case, too, the network interface module 1601 reports, to the location check function 1605, from which interface the packet is received, so that the location check function 1605 can determine the location of the correspondent node.

<Embodiment 25: HeNB Report to the UE Using a Radio Control Plane>

A method whereby the HeNB uses a radio control plane message to report the location of the correspondent node to the UE is described in Embodiment 25 of the present invention. The HeNB is capable of reporting to the UE how the HeNB receives the packet from the correspondent node, using the radio control plane message. A typical example for realizing this message is an extension of a DL information transfer message described in 3GPP TS36.331, though the present invention is not limited to such. For instance, a new information element is added to the DL information transfer message, to report to the UE how the HeNB receives the packet from the correspondent node.

<Embodiment 26: HeNB Report to the UE Using an Application Layer>

A method whereby the HeNB uses the data packet from the correspondent node to report the location of the correspondent node to the UE is described in Embodiment 26 of the present invention. The HeNB is capable of adding the packet reception method to the data packet from the correspondent node. The HeNB then forwards the marked data packet to the UE, to report to the UE how the HeNB receives the packet from the correspondent node. This method has an advantage that there is no need to change the radio control layer so as to support the present invention.

<Embodiment 27: HeNB Report to the UE Using an Application Control Plane>

A method whereby the HeNB uses an application control plane message to report the location of the correspondent node to the UE is described in Embodiment 27 of the present invention. The HeNB is capable of reporting, to the UE, the method of receiving the packet from the correspondent node, using the application control plane message. A typical example for realizing this message is an extension of an EPS bearer context modification message described in 3GPP TS24.301, though the present invention is not limited to such. For instance, a new information element is included in a protocol configuration option element, to report to the UE how the HeNB receives the packet from the correspondent node. An advantage of the method of reporting using the application control plane lies in that the application layer may not be able to transmit the report under a certain circumstance. For example, there is an instance where the CN 1366 encapsulates the data packet to the P-GW of the CN 1366. Since the packet is encapsulated between the CN 1366 and the P-GW, the HeNB cannot add the mark (tag) to the encapsulated packet. If the HeNB adds the tag to outside the encapsulated packet, the P-GW removes the capsule when the data packet reaches the P-GW, as a result of which the tag is removed, too. The method of reporting using the application control plane is effective in such a case.

<Embodiment 28: Application to a Single Interface (Non-3G) Having a Plurality of Mobility Protocols>

Embodiment 28 of the present invention describes that the method whereby the P-GW marks the packet sent to the UE is also applicable to a UE with a single interface operating a plurality of mobility protocols in non-3GPP access.

Figure 18:
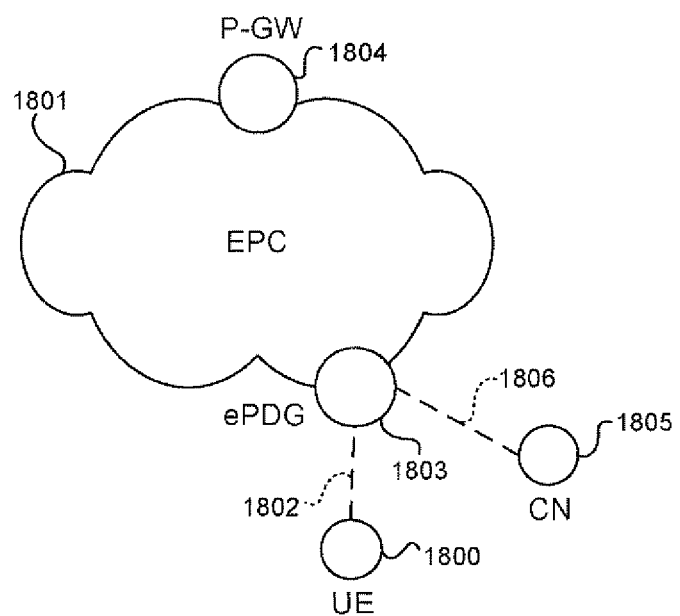
FIG. 18 is a diagram showing yet another example of a network structure in an embodiment of the present invention.

FIG. 18 is a diagram showing a network that includes a terminal with a single interface operating a plurality of mobility protocols to which the present invention is applied. In FIG. 18, a UE 1800 accesses an EPC 1801 through the use of single radio access alone. The UE 1800 establishes a secure connection 1802 with an ePDG 1803, to access the EPC 1801. In the secure connection 1802, the UE 1800 operates two types of mobility management protocols.

The first mobility protocol is PMIP, where the ePDG 1803 sends a PBU (Proxy Binding Update) to a P-GW 1804. In PMIP, the ePDG 1803 updates (reports) the movement of the UE 1800 to the P-GW 1804 of the UE 1800.

The second mobility protocol is CMIP, where the UE 1800 sends a BU (Binding Update) to the P-GW 1804. In CMIP, the UE 1800 updates (reports) that the UE 1800 is still active in the EPC 1801, to the P-GW 1804.

A CN 1805 is also connected to the ePDG 1803 through a secure connection 1806. The UE 1800 receives, from the P-GW 1804, the report message reporting to the UE 1800 that the CN 1805 is located in the EPC 1801, according to the present invention. Moreover, the UE 1800 can request the ePDG 1803 to monitor the packet of the CN 1805, and also request to report to the UE 1800 whether or not the CN 1805 is connected to the same ePDG (i.e. the ePDG 1803).

A specific example of the above-mentioned steps is described below. The UE 1800 establishes the connection 1802 with the ePDG 1803, using a WLAN interface. In the connection 1802 with the ePDG 1803, the UE 1800 activates both PMIP and CMIP, and acquires two IP addresses (PMIP.IP.UE1350 and CMIP.IP.UE1350).

The CN 1805 sends a packet to the UE 1800, and the P-GW 1804 receives the packet. The P-GW 1804 reports to the UE 1800 that the CN 1805 is located in the EPC 1801. The UE 1800 then requests the ePDG 1803 to check the method whereby the ePDG 1803 receives the packet of the CN 1805. Upon receiving a packet from the CN 1805 through the connection 1806, the ePDG 1803 reports to the UE 1800 that the CN 1805 is connected to the ePDG 1803.

For example, the ePDG 1803 can report to the UE 1800 by using a protocol configuration option or by sending an IKE (Internet Key Exchange) report message, though the present invention is not limited to such. Having recognized that the CN 1805 is connected to the ePDG 1803, the UE 1800 uses IP.CMIP.UE1800 to establish a path for route optimized communication with the CN 1805.

Note that the ePDG 1803 can intercept a packet from the CN 1805 twice. The first interception is performed when the CN 1805 forwards the packet to the ePDG 1803 through the radio link connection 1806. The packet is forwarded in the EPC 1355, and reaches the P-GW 1803 which is the mobility anchor of the UE 1800. The second interception by the ePDG 1803 is performed when this packet is received from inside the EPC 1801 (i.e. from the P-GW in the EPC 1801). In the present invention, it is desirable that the packet check is triggered in the ePDG 1803 so as to determine whether or not the packet is from the CN 1805 connected to the ePDG 1803. When the ePDG 1803 receives the packet at the second interception, the packet check is not triggered because the packet reaches from the EPC 1801.

<Embodiment 29: Single PDN HeNB Scenario>

Embodiment 29 of the present invention describes that the method whereby the P-GW marks the packet sent to the UE is also applicable in the case where the HeNB does not implement a P-GW function.

It is assumed here that the P-GW in the EPC assigns a plurality of IP addresses to the UE for different types of access. For example, in FIG. 13, the P-GW 1358 assigns 3G.IP.UE1350 to the UE 1350 to access the EPC 1355, and also assigns HN.IP.UE1350 to the UE 1350 to access the home network 1351.

The HeNB 1352 executes filter-based routing, based on a source address of a received packet. For example, upon receiving a packet whose source IP address is 3G.IP.UE1350, the HeNB 1352 forwards the packet to the EPC 1355 through the connection 1353. Upon receiving a packet whose source IP address is HN.IP.UE1350, the HeNB 1352 forwards the packet through the connection 1356 if a destination address is not the home network 1351, or directly forwards the packet to the home network 1351. In such a situation, by setting a filter rule in the HeNB 1352 so as to report the location of the correspondent node to the UE 1350, the present invention can be applied to the UE 1350.

A specific example of the above-mentioned steps is described below. Upon receiving, from the P-GW 1358, the report message that the CN 1366 is located in the EPC 1355, the UE 1350 sends a filter rule request to instruct the HeNB 1352 to monitor the packet from the CN 1366 destined for the UE 1350. Upon receiving a packet from the CN 1366, the HeNB 1352 in which the filter rule is set reports to the UE 1350 that the packet is received from inside the home network 1351. As a result, the UE 1350 recognizes that the CN 1366 exists in the home network 1351, and uses HN.IP.UE1350 to communicate with the CN 1366, thereby attaining an optimized path. A method whereby both the UE and the HeNB implement the filter rule can be achieved, for example, by supporting the mobile IPv6 protocol having a flow filtering extension.

Note that the HeNB 1352 intercepts a packet from the CN 1366 with 3G.IP.CN1366 as its source address, twice. The first interception is performed when the CN 1366 forwards the packet to the HeNB 1352 via a radio bearer. The packet is forwarded to the P-GW of the CN 1366 in the EPC 1355, through the cellular link 1353. The packet is then forwarded to the P-GW 1358 which is the mobility anchor of the UE 1350. The second interception by the HeNB 1352 is performed when the packet is received from inside the EPC 1355 (i.e. from the P-GW in the EPC 1355). In the present invention, it is desirable that the packet check is triggered in the HeNB 1352 at the first interception of the packet from the CN 1366 so as to determine whether or not the packet is from the CN 1366 in the is home network. At the second interception of the packet, the packet check is not triggered in the HeNB 1352 because the packet reaches through the logical cellular link 1353.

<Embodiment 30: Multiple PDN eNB SIPTO (Selective IP Traffic Offloading) Scenario>

Embodiment 30 of the present invention describes that the method whereby the P-GW marks the packet sent to the UE is also applicable in the case where the UE is connected to an eNB (also referred to as a macro base station or a macrocell).

Suppose, in FIG. 13, the HeNB 1352 is replaced with an eNB, where the home network 1351 is a macrocell managed by the eNB. Here, the eNB implements a P-GW function, and assigns a local breakout address to the UE 1350. The UE 1350 can request one or both of the P-GW 1358 and the eNB to report the location of the correspondent node to the UE 1350, according to the present invention.

A specific example of the above-mentioned steps is described below. The UE 1350 acquires an IP address (3G.IP.UE1350) for access to the EPC 1355, from the P-GW 1358. The UE 1350 also acquires an IP address (eNB.I-P.UE1350) for access in the macrocell managed by the eNB, from the eNB. When the P-GW 1358 reports to the UE 1350 that the CN 1366 is located in the EPC 1355, the UE 1350 requests the eNB to monitor how a packet from the address of the CN 1366 to 3G.IP.UE1350 is received. Upon receiving a packet form inside the macrocell, the eNB reports to the UE 1350 that the CN 1366 is located in the macrocell. As a result, the UE 1350 uses eNB.IP.UE1350 to communicate with the CN 1366, thereby attaining an optimized path.

Note that the eNB intercepts a packet from the CN 1366 with 3.IP.CN1366 as its source address, twice. The first interception is performed when the CN 1366 forwards the packet to the eNB via a radio bearer. The packet is forwarded in the EPC 1355, and received by the P-GW 1358 which is the mobility anchor of the UE 1350. The second interception by the eNB is performed when the packet is received from inside the EPC 1355 (i.e. from the P-GW in the EPC 1355). In the present invention, it is desirable that the packet check is triggered in the eNB at the first interception of the packet from the CN 1366 so as to determine whether or not the packet is from the CN 1366 in the home network. At the second interception of the packet, the packet check is not triggered in the eNB because the packet reaches from inside the EPC 1355.

<Embodiment 31: Single PDN eNB SIPTO Scenario>

Embodiment 31 of the present invention describes that the method whereby the P-GW marks the packet sent to the UE is also applicable in the case where the UE is connected to a macrocell eNB.

Suppose, in FIG. 13, the HeNB 1352 is replaced with an eNB, where the home network 1351 is a macrocell managed by the eNB. Here, the eNB does not implement a P-GW function, and the P-GW in the EPC 1355 assigns a local breakout IP address to the UE 1350. The UE 1350 can request one or both of the P-GW 1358 and the eNB to report the location of the correspondent node to the UE 1350, according to the present invention. In the case of making the request to the eNB, the UE employs the above-mentioned filter-based method.

A specific example of the above-mentioned steps is described below. The UE 1350 acquires an IP address (3G.IP.UE1350) for access to the EPC 1355, from the P-GW 1358. The UE 1350 also acquires another IP address (eNB.I-P.UE1350) for access in the macrocell managed by the eNB, from the P-GW 1358. When the P-GW 1358 reports to the UE 1350 that the CN 1366 is located in the EPC 1355, the UE 1350 sends a filter rule request, to request the eNB to monitor how a packet from the address of the CN 1366 to 3G.IP.UE1350 is received. Upon receiving a packet form inside the macrocell, the eNB reports to the UE 1350 that the CN 1366 is located in the macrocell. As a result, the UE 1350 uses eNB.IP.UE1350 to communicate with the CN 1366, thereby attaining an optimized path.

Note that the eNB intercepts a packet from the CN 1366 with 3G.IP.CN1366 as its source address, twice. The first interception is performed when the CN 1366 forwards the packet to the eNB via a radio bearer of the eNB. The packet is forwarded in the EPC 1355, and received by the P-GW 1358 which is the mobility anchor of the UE 1350. The second interception by the eNB is performed when the packet is received from inside the EPC 1355 (i.e. from the P-GW in the EPC 1355). In the present invention, it is desirable that the packet check is triggered in the eNB at the first interception of the packet from the CN 1366 so as to determine whether or not the packet is from the CN 1366. At the second interception of the packet, the packet check is not triggered in the eNB because the packet reaches from inside the EPC 1355.

<Embodiment 32: eNB Group Scenario—Multiple PDN>

Embodiment 32 of the present invention describes that the method whereby the P-GW marks the packet sent to the UE is also applicable in the case where the UE is connected to a macrocell eNB and an IP address assigned for local breakout can be held in an eNB group.

Suppose, in FIG. 13, the HeNB 1352 is replaced with an eNB, where the home network 1351 is a macrocell managed by the eNB. Here, the eNB implements a P-GW function, and assigns a local breakout IP address to the UE 1350. The UE 1350 can request one or both of the P-GW 1358 and the eNB to report the location of the correspondent node to the UE 1350, according to the present invention. Moreover, even when the UE 1350 moves within an eNB group, the IP address assigned to the UE 1350 for local breakout is still usable. For example, suppose the local breakout IP address (eNB1.IP.UE1350) is assigned to the UE 1350 by an eNB 1. When the UE 1350 moves to an eNB 2, the UE 1350 can keep using eNB1.IP.UE1350 even after connected to the eNB 2, in the case where the eNB 2 is related to the eNB 1 (e.g. the eNB 2 is in the same eNB group as the eNB 1). Data can be transferred by both eNBs (the above-mentioned eNB 1 and eNB 2) generating a data tunnel via a X2 interface, thereby enabling the IP address of the UE 1350 to be held.

<Embodiment 33: eNB Group Scenario—Single PDN>

Embodiment 33 of the present invention describes that the method whereby the P-GW marks the packet sent to the UE is also applicable in the case where the UE is connected to a macrocell eNB (not implementing a P-GW function) and an IP address assigned for local breakout can be held in an eNB group.

Suppose, in FIG. 13, the HeNB 1352 is replaced with an eNB, where the home network 1351 is a macrocell managed by the eNB. Here, the eNB does not implement a P-GW function, and assigns a local breakout IP address to the UE 1350. The UE 1350 can request one or both of the P-GW 1358 and the eNB to report the location of the correspondent node to the UE 1350, according to the present invention. In the case of making the request to the eNB, the UE employs the above-mentioned filter-based method. Moreover, even when the UE 1350 moves within an eNB group, the IP address assigned to the UE 1350 for local breakout is still usable. For example, suppose the local breakout IP address (eNB1.IP.UE1350) is assigned to the UE 1350 by the eNB 1. When the UE 1350 moves to the eNB 2, the UE 1350 can keep using eNB1.IP.UE1350 even after connected to the eNB 2, in the case where the eNB 2 is related to the eNB 1 (e.g. the eNB 2 is in the same eNB group as the eNB 1). Data can be transferred by both eNBs (the above-mentioned eNB 1 and eNB 2) generating a data tunnel via a X2 interface, thereby enabling the IP address of the UE 1350 to be held.

<Embodiment 34: ANDSF (Access Network Discovery Selection Function) Assists in UE Determination—Policy Restriction>

Embodiment 34 of the present invention is described below. To attain an optimal communication path to the correspondent node, an ANDSF (Access Network Discovery Selection Function) server can assist the UE so that the UE can determine which IP address of the UE is to be used. Here, the ANDSF server can send a policy to the UE. The policy influences the determination by the UE as to which IP address is to be used by the UE for the correspondent node.

In FIG. 13, suppose an ANDSF server with which the UE 1350 performs secure communication exists in the EPC 1355. The UE 1350 is located in the EPC 1355, and has a communication session with the CN 1366 using 3G.IP.UE1350. The UE 1350 acquires, from the ANDSF server, a policy that the UE 1350 is not allowed to execute local breakout while the UE 1350 is in the home network 1351, based on a subscriber policy of the UE 1350. When the UE 1350 moves to the home network 1351, the UE 1350 does not request the local breakout IP address from the home network 1351 even in the case where the P-GW 1358 reports to the UE 1350 that the CN 1366 exists in the EPC 1355. Hence, while the UE 1350 is in the home network 1351, the UE 1350 keeps using 3G.IP.UE1350 to communicate with the CN 1366.

The above-mentioned method is also applicable to a scenario where the UE operates a plurality of mobility protocols in non-3GPP access. For example, in FIG. 18, the ANDSF server reports (by a policy) to the UE 1800 that the UE 1800 is not allowed to execute local breakout while the UE 1800 is in non-3GPP access (e.g. while the UE 1800 is connected to the ePDG 1803). Accordingly, the UE 1800 does not request the local breakout IP address from the ePDG 1803, and keeps using 3.IP.UE1800 to communicate with the CN 1805, while the UE 1800 is in non-3GPP access.

The above-mentioned method is also applicable to a scenario where the UE exists in a macrocell eNB and a local breakout IP address is assigned in a macrocell. For instance, the ANDSF server reports (by a policy) to the UE that the UE is not allowed to execute local breakout while the UE is in the macrocell. Accordingly, the UE does not request the local breakout IP address, and keeps using the IP address assigned for EPC access to communicate with the correspondent node, while the UE is in the macrocell.

<Embodiment 35: ANDSF Assists in UE Determination—Policy Restriction>

In Embodiment 35 of the present invention, an ANDSF server can assist the UE in determining which communication session with the correspondent node is to be optimized. Here, the ANDSF server sends a policy to the UE. The policy influences the determination by the UE as to which IP address is to be used by the UE for each correspondent node.

In FIG. 13, suppose an ANDSF server with which the UE 1350 performs secure communication exists in the EPC 1355. The UE 1350 is located in the EPC 1355, and has communication sessions with the CNs 1364 and 1365 using 3G.IP.UE1350. The UE 1350 acquires, from the ANDSF server, a policy that the UE 1350 is allowed to execute local breakout only for the session with the CN 1366 while the UE 1350 is in the home network 1351. When the UE 1350 moves to the home network 1351, the UE 1350 does not request the HeNB 1352 to monitor the packet from the CN 1365 even in the case where the P-GW 1358 reports to the UE 1350 that the CN 1365 exists in the EPC 1355. Hence, while the UE 1350 is in the home network 1351, the UE 1350 keeps using 3G.IP.UE1350 to communicate with the CN 1365. On the other hand, in the case where the HeNB 1352 reports to the UE 1350 that the CN 1366 exists in the home network 1351, the UE 1350 uses HN.IP.UE1350 to communicate with the CN 1366.

The above-mentioned method is also applicable to a scenario where the UE operates a plurality of mobility protocols in non-3GPP access. For example, in FIG. 18, the ANDSF server can report (by a policy) to the UE 1800 that the UE 1800 is not allowed to execute local breakout in the session with the CN 1805 while the UE 1800 is in non-3GPP access (e.g. while the UE 1800 is connected to the ePDG 1803). Accordingly, the UE 1800 does not request the local breakout IP address from the ePDG 1803, and keeps using 3G.IP.UE1800 to communicate with the CN 1805, while the UE 1800 is in non-3GPP access.

The above-mentioned method is also applicable to a scenario where the UE exists in a macrocell eNB and a local breakout IP address is assigned in a macrocell. For instance, the ANDSF server can report (by a policy) to the UE that the UE is allowed to execute local breakout in a session with a specific correspondent node while the UE is in the macrocell. Accordingly, the UE first determines the location of the correspondent node. In the case where a local breakout route is considered as optimal, the UE requests the local breakout IP address for communicating with the correspondent node while the UE is in the macrocell.

21 Embodiment 35: RR Message Marking—Cache>

Embodiment 35 of the present invention describes that the method whereby the P-GW marks the packet sent to the UE is also applicable when the UE executes a mobile IPv6 route optimization process. A packet marked by the P-GW here is, for example, a packet related to the mobile IPv6 route optimization process (e.g. care-of-address test).

FIG. 19 is a sequence chart showing an example where the marking method by the P-GW is applied to the mobile IPv6 route optimization process. In FIG. 19, a UE 1900 is connected to an ePDG 1901, and operates two types of mobility management protocols. The first mobility protocol is PMIP, where the ePDG 1901 sends a PBU to a P-GW 1902. In PMIP, the ePDG 1901 updates (reports) information about the movement of the UE 1900, to the P-GW 1902. The second mobility protocol is CMIP, where the UE 1900 sends a BU to the P-GW 1902. In CMIP, the UE 1900 updates (reports) to the P-GW 1902 that the UE 1900 is still active in the EPC.

A UE 1903 is connected to an ePDG 1904, and operates two types of mobility management protocols. The first mobility protocol is PMIP, where the ePDG 1904 sends a PBU to the P-GW 1902. In PMIP, the ePDG 1904 updates (reports) information about the movement of the UE 1903, to the P-GW 1902. The second mobility protocol is CMIP, where the UE 1903 sends a BU to the P-GW 1902. In CMIP, the UE 1903 updates (reports) to the P-GW 1902 that the UE 1903 is still active in the EPC. It is assumed here that the next hop of the ePDG 1901 and the ePDG 1904 is the P-GW 1902 by default.

The UE 1900 determines to start optimized communication with the UE 1903, and executes the mobile IPv6 route optimization process. The UE 1900 sends a care-of address test init (CoTi) message to the UE 1903 (step S1905). The ePDG 1901 which is the next hop of the UE 1900 passes the CoTi message to the P-GW 1902 which is the next hop of the ePDG 1901 (step S1906). The P-GW 1902 passes the CoTi message to the ePDG 1904 (step S1907). The ePDG 1904 passes the CoTi message to the UE 1903 (step S1908).

In response to the CoTi message, the UE 1903 sends a care-of address test (CoT) message to the UE 1900 (step S1909). The ePDG 1904 which is the next hop of the UE 1903 passes the CoT message to the P-GW 1902 which is the next hop of the ePDG 1904 (step S1910). Since the P-GW 1902 is instructed to report the location of the UE 1903 to the UE 1900, the P-GW 1902 inserts the report in the CoT message, and passes the CoT message to the ePDG 1901 (step S1911). The ePDG 1901 passes the CoT message with the report, to the UE 1900 (step S1912). From this report, the UE 1900 recognizes that the packet from the UE 1903 passes through the ePDG 1901 even in the case where mobile IPv6 route optimization is adopted. That is, the UE 1900 does not benefit from mobile IPv6 route optimization. Instead, the UE 1900 uses an IP address assigned for PMIP, to communicate with the UE 1903. The use of PMIP allows the UE 1900 to reduce a load of updating the mobility of the UE 1900 to the P-GW 1902.

Here, the UE 1900 not only determines to use PMIP, but also caches the determination result in a volatile memory in the UE 1900. By doing so, in the case where the UE 1900 subsequently receives, from the P-GW 1902, the report that the packet from the UE 1903 passes through the P-GW 1902, the UE 1900 does not initiate mobile IPv6 route optimization. Caching the determination result has an advantage that the UE 1900 can be saved from the need to perform mobile IPv6 route optimization and acquire the same result as the previous trial (i.e. the result that PMIP is to be used because the packet from the UE 1903 passes through the P-GW 1902).

<Embodiment 36: RR Message Marking—Cache Lifetime>

In Embodiment 36 of the present invention, the method of caching the result of mobile IPv6 route optimization in the UE may be performed in such a manner that the cached result is valid only within a finite time.

As an example, the UE 1900 caches the result of mobile IPv6 route optimization only for 10 minutes. After 10 minutes, the UE 1900 retries mobile IPv6 route optimization, to determine whether or not the UE 1900 can establish an optimized route to the UE 1903. As another example, when detecting that the UE 1903 changes its IP address, the UE 1900 retries mobile IPv6 route optimization, to determine whether or not the UE 1900 can establish an optimized route to the UE 1903. A method whereby the UE 1900 detects the change of the IP address is, for example, a method in which the UE 1903 updates its IP address to the UE 1900 according to mobility, though the present invention is not limited to such. Caching the determination result not for an infinite time but for a finite time has an advantage that, in the case where the UE 1903 moves to another location at which the UE 1900 can set up an optimized route to the UE 1903, the optimized route is reliably set up by retrial according to an early report by the UE 1900.

<Embodiment 37: Where to Set the Filter Rule of Flow Filtering is Determined Using the Mark from the P-GW>

In Embodiment 37 of the present invention, the UE may determine which network entity assists the UE by flow filtering, according to the method whereby the P-GW marks the packet sent to the UE.

For example, in FIG. 18, the UE 1800 receives a report that the CN 1805 is directly connected to the ePDG 1803, from the ePDG 1803. The UE 1800 accordingly sets a filtering rule in the ePDG 1803 rather than setting it in the P-GW 1804, in order to filter a flow from the CN 1805. An advantage of this method lies in that, by setting the filtering rule in the ePDG 1803, a packet is turned at the ePDG 1803 to thereby save a round-trip time required to travel between the P-GW 1804 and the ePDG 1803.

Though the present invention is described by way of embodiments which are believed to be most practical and preferred embodiments, derivative examples are also possible without departing from the scope of the present invention. For instance, the 3G interface and the WiMAX interface are used in all of the embodiments described above, but the present invention is not limited to the 3G interface and the WiMAX interface, and equally applicable in the case where the UE has a different type of access technology and connects to the network using a different type of interface. Moreover, though PMIPv6 is used as the network-based mobility management protocol in the above embodiments, this is not a limit for the present invention, and GTP may be used instead. Furthermore, though IPv6 is assumed to be the version of the IP protocol employed, this is not a limit for the present invention, and IPv4 may be used instead.

The present invention is not limited to selection from physically different interfaces, but is also applicable to logical interface selection in the case where different protocols are used even when the same physical interface is used (shared) (the result of selection differs due to a factor such as a difference in tunneling structure in the network). In an example of sharing the physical interface, the UE may have a plurality of logical interfaces for carrying out the present invention. For instance, one radio unit is shared by a plurality of connection modes, where one connection mode is switched to another at a speed at which the change poses no problem in terms of network interface, and a logical link is maintained in layer 2, so that the UE can operate in the same way as when the UE is connected to the network from a network unit via a plurality of interfaces.

Regarding the mark indicating the route or state of connection with the correspondent, the instruction according to the presence/absence of the specific mark is merely an example, and the logic of the presence/absence of the mark may be reversed, or more states may be distinguished using a plurality of marks. The meaning of such a mark itself is changeable in carrying out the present invention.

The UE (mobile terminal) may be composed of a plurality of communication devices. For example, the UE may be an electronic computer such as a personal computer equipped with an external or embedded 3GPP communication device module or non-3GPP communication device module. The present invention achieves the same advantageous effects in these various types of mobile terminals.

Though the above-mentioned scenarios all relate to the 3GPP architecture, the present invention is applicable to every technology in which different types of access networks are present and there is a restriction to use an arbitrary mobility management mechanism through an arbitrary access technology type.

Though the environment of local mobility management is assumed in the above embodiments, the present invention may also be applied to a mobile network (or a hierarchical mobile network) formed by a mobile router (MR) (and its subordinate node).

As an example, in NEMO (Network Mobility) which is one of the mobile network configuration methods, a MR performs movement registration of a mobile network (and terminal) in a HA (Home Agent), thereby providing mobility support for the mobile terminal. The MAG in this description can be applied to correspond to the MR. In this case, it is possible to regard the LMA as corresponding to the HA of the MR. Further, in the case where a network operator providing a network that employs PMIP uses MAG-LMA tunneling in PMIP in multiple stages according to a roaming relation and the like, a hierarchical mobile network applies.

The present invention is also applicable to an overlay network environment. For instance, the mobility support for the mobile terminal by the MAG can be applied to correspond to a pHA (Proxy HA). In this case, it is possible to regard another home agent that receives registration information from a home agent at a starting point (which can take various forms such as being with reference to some point in time (relative) or being a state of registration in a network operator (definitive)) of movement of the mobile node or a home agent at a connection destination of the mobile node, as corresponding to a LMA.

Each functional block used in the description of the above embodiments of the present invention is typically implemented as LSI (Large Scale Integration) which is an integrated circuit. Each of the functional blocks may separately be implemented on one chip, or all or part of the functional blocks may be implemented on one chip. Though LSI is mentioned as the integrated circuit here, the integrated circuit may be called any of an IC (Integrated Circuit), system LSI, super LSI, or ultra LSI depending on the degree of integration.

Moreover, the integrated circuit method is not limited to LSI, and may be realized by a dedicated circuit or a general-purpose processor. A FPGA (Field Programmable Gate Array) that can be programmed after LSI manufacturing or a reconfigurable processor capable of reconfiguring connections and settings of circuit cells inside LSI may also be used.

Furthermore, when an integrated circuit technology that replaces LSI emerges from advancement of semiconductor technologies or other derivative technologies, such a technology can be used for the functional block integration. For instance, biotechnology may potentially be adapted in this way.

Industrial Applicability

The communication system, the mobile terminal, the network node, and the base station apparatus according to the present invention have the advantageous effect that a UE having a plurality of interfaces each of which uses a different mobility management mechanism can select an appropriate interface or a UE having a plurality of addresses can select an appropriate address, and as a result communicate with a CN using an optimal route. Therefore, the communication system, the mobile terminal, the network node, and the base station apparatus according to the present invention are applicable to a field of communication technology in a packet exchange-type data communication network system (especially a network system in which a network-based local mobility management protocol such as PMIP is implemented) and a mobile terminal in which a client-based mobility management protocol is implemented.

The invention claimed is:

1. A communication system comprising: a mobile terminal connectable to a network-based mobility management domain, and having a plurality of communication routes to a correspondent node with which the mobile terminal communicates; and a network node for performing location management of a terminal connected to the network-based mobility management domain,
wherein the network node is configured to monitor a packet sent from the correspondent node to the mobile terminal and, in the case of detecting the packet sent from the correspondent node to the mobile terminal, determine whether~the correspondent node is connected to the same or a different network-based mobility management domain as the mobile terminal, and report a result of the determination to the mobile terminal, and
wherein the mobile terminal is configured to select a communication route used for communicating with the correspondent node, based on the result of the determination,
wherein the network node is configured to hold binding information of the mobile terminal for network-based mobility management and binding information of the mobile terminal for client-based mobility management by the mobile terminal, and determine whether or not the correspondent node is connected to the same network-based mobility management domain by referencing to both binding information.

2. The communication system according to claim 1, wherein the network node is configured to report, to the mobile terminal, the result of the determination that the correspondent node is connected to the same network-based mobility management domain, in the case of determining that the correspondent node is connected to the same network-based mobility management domain.

3. The communication system according to claim 1, wherein the network node is configured to report, to the mobile terminal, the result of the determination that the correspondent node is not connected to the same network-based mobility management domain, in the case of determining that the correspondent node is not connected to the same network-based mobility management domain.

4. The communication system according to claim 1, wherein the network node is configured to report, to the mobile terminal, the result of the determination that the correspondent node is connected to the same network-based mobility management domain, in the case of detecting that the packet sent from the correspondent node to the mobile terminal reaches from inside the network-based mobility management domain and is forwarded to inside the network-based mobility management domain.

5. The communication system according to claim 1, wherein the network node is configured to report the result of the determination by embedding the result of the determination in a data packet sent to the mobile terminal.

6. The communication system according to claim 1, wherein the mobile terminal is configured to send, to the network node, a request to detect the packet sent from the correspondent node to the mobile terminal, and the network node is configured to start monitoring the packet in the case of receiving the request to detect the packet.

7. The communication system according to claim 6, wherein the mobile terminal and the correspondent node are configured to determine, by a negotiation, whether the mobile terminal or the correspondent node is to make the request to detect the packet, in the cas(where the correspondent node has a plurality of communication routes to the mobile terminal and is capable of sending a request to detect a packet sent from the mobile terminal to the correspondent node.

8. The communication system according to claim 1, wherein the mobile terminal has a plurality of interfaces or a plurality of addresses, and is configured to select the communication route by selecting one of the plurality of interfaces or one of the plurality of addresses.

9. A mobile terminal connectable to a network-based mobility management domain in which a network node for performing location management of a terminal connected to the network-based mobility management domain is located, and having a plurality of communication routes to a correspondent node with which the mobile terminal communicates, the mobile terminal comprising: a reception unit configured to receive a result of determination of whether the correspondent node is connected to the same or a different network-based mobility management domain as the mobile terminal, in the case where the network node monitors a packet sent from the correspondent node to the mobile terminal and detects the packet sent from the correspondent node to the mobile terminal; and
a communication route selection unit configured to select a communication route used for communicating with the correspondent node, based on the result of the determination,
wherein the network node is configured to hold binding information of the mobile terminal for network-based mobility management and binding information of the mobile terminal for client-based mobility management by the mobile terminal, and determine whether or not the correspondent node is connected to the same network-based mobility management domain by referencing to both binding information.

10. The mobile terminal according to claim 9, comprising a packet detection request unit configured to send, to the network node, a request to detect the packet sent from the correspondent node to the mobile terminal, to cause the network node to start monitoring the packet sent from the correspondent node to the mobile terminal.

11. The mobile terminal according to claim 10, comprising a negotiation unit configured to determine, by a negotiation with the correspondent node, whether the mobile terminal or the correspondent node is to make the request to detect the packet, in the case where the correspondent node has a plurality of communication routes to the mobile terminal and is capable of sending a request to detect a packet sent from the mobile terminal to the correspondent node.

12. The mobile terminal according to claim 11, comprising a selection result sending and receiving unit configured to, in the case where the mobile terminal makes the request to detect the packet as a result of the negotiation and selects the communication route used for communicating with the correspondent node based on the result of the determination, report information about a communication route to be selected by the correspondent node to the correspondent node, and receive an acceptance from the correspondent node.

13. The mobile terminal according to claim 12, wherein the selection result sending and receiving unit is configured to report the result of the determination to the correspondent node, together with the information about the communication route to be selected by the correspondent node.

14. The mobile terminal according to claim 11, comprising a selection result sending and receiving unit configured to, in the case where the correspondent node makes the request to detect the packet as a result of the negotiation and selects a communication route used for communicating with the correspondent node based on the result of the determination, receive information about a communication route to be selected by the mobile terminal from the correspondent node, and send an acceptance to the correspondent node.

15. The mobile terminal according to claim 14, wherein the selection result sending and receiving unit is configured to receive, from the correspondent node, a result of determination by a network node corresponding to the correspondent node, together with the information about the communication route to be selected by the mobile terminal.

16. The mobile terminal according to claim 9 having a plurality of interfaces or a plurality of addresses, wherein the communication route selection unit is configured to select the communication route by selecting one of the plurality of interfaces or one of the plurality of addresses.

17. The mobile terminal according to claim 9, wherein the communication route selection unit includes:
a second packet detection request unit configured to send, to a base station apparatus to which the mobile terminal is connected, a request to detect the packet sent from the correspondent node to the mobile terminal, to cause the base station apparatus to start monitoring the packet sent from the correspondent node to the mobile terminal; and
a second reception unit configured to receive a second determination result which is a result of determination of whether or not the correspondent node is connected to the same base station apparatus, in the case where the base station apparatus monitors the packet sent from the correspondent node, with which the mobile terminal communicates, to the mobile terminal, and detects the packet sent from the correspondent node to the mobile terminal, and
wherein the communication route selection unit is configured to send the request to detect the packet to the base station apparatus in the case where the result of the determination that the correspondent node is connected to the same network-based mobility management domain is received from the network node, and the communication route selection unit is configured to select the communication route used for communicating with the correspondent node, based on the second determination result received by the second reception unit.

18. The mobile terminal according to claim 9, comprising a policy acquisition unit configured to acquire a policy for the selection of the communication route, wherein the communication route selection unit is configured to select the communication route used for communicating with the correspondent node, based on the policy acquired by the policy acquisition unit in addition to the result of the determination.

19. A network node for performing location management of a terminal connected to a network-based mobility management domain, the network node comprising:
a packet monitoring unit configured to, for a mobile terminal connectable to the network-based mobility management domain and having a plurality of communication routes to a correspondent node with which the mobile terminal communicates, monitor a packet sent from the correspondent node, with which the mobile terminal communicates, to the mobile terminal;
a determination unit configured to determine whether the correspondent node is connected to the same or a different network-based mobility management domain as the mobile terminal, in the case of detecting the packet sent from the correspondent node to the mobile terminal; and
a reporting unit configured to report a result of the determination by the determination unit, to the mobile terminal,
wherein the network node is configured to hold binding information of the mobile terminal for network-based mobility management and binding information of the mobile terminal for client-based mobility management by the mobile terminal, and determine whether or not the correspondent node is connected to the same network-based mobility management domain by referencing to both binding information.

20. A base station apparatus for performing wireless connection with a mobile terminal, the base station apparatus comprising:
a packet monitoring unit configured to, for a mobile terminal connected to the base station apparatus and having a plurality of communication routes to a correspondent node with which the mobile terminal communicates, monitor a packet sent from the correspondent node, with which the mobile terminal communicates, to the mobile terminal;
a determination unit configured to determine whether the correspondent node is connected to the same or a different base station apparatus as the mobile terminal, in the case of detecting the packet sent from the correspondent node to the mobile terminal; and a reporting unit configured to report a result of the determination by the determination unit, to the mobile terminal,
wherein the network node is configured to hold binding information of the mobile terminal for network-based mobility management and binding information of the mobile terminal for client-based mobility management by the mobile terminal, and determine whether or not the correspondent node is connected to the same network-based mobility management domain by referencing to both binding information.

* * * * *